United States Patent
Ong et al.

(10) Patent No.: US 9,443,483 B2
(45) Date of Patent: Sep. 13, 2016

(54) LIQUID CRYSTAL DISPLAYS HAVING PIXELS WITH EMBEDDED FRINGE FIELD AMPLIFIERS

(75) Inventors: Hiap L. Ong, Warren, NJ (US); Juishu Chou, Taipei (TW)

(73) Assignee: Hiap L. Ong and Kyoritsu Optronics, Co., Ltd. (TW)

( * ) Notice: Subject to any disclaimer, the term of this patent is extended or adjusted under 35 U.S.C. 154(b) by 0 days.

(21) Appl. No.: 13/341,823

(22) Filed: Dec. 30, 2011

(65) Prior Publication Data
US 2012/0236243 A1    Sep. 20, 2012

(51) Int. Cl.
G02F 1/1335    (2006.01)
G09G 3/36      (2006.01)
G02F 1/1337    (2006.01)
G02F 1/139     (2006.01)

(52) U.S. Cl.
CPC ....... G09G 3/3614 (2013.01); G02F 1/133707 (2013.01); *G02F 1/1393* (2013.01); *G02F 2201/123* (2013.01); *G09G 3/3648* (2013.01); *G09G 2300/0434* (2013.01); *G09G 2300/0439* (2013.01); *G09G 2300/0452* (2013.01); *G09G 2300/0491* (2013.01); *G09G 2320/028* (2013.01); *G09G 2320/0242* (2013.01)

(58) Field of Classification Search
CPC .............. G09G 3/36; G01F 1/134363; G01F 1/133555; G01F 1/133553; G01F 1/134309; G01F 1/134336; G01F 1/134339; G01F 1/134327; G01F 1/133514; G01F 1/141
USPC ....... 349/114, 129, 139, 143, 144, 108, 106, 349/191, 41, 43, 37, 141, 113
See application file for complete search history.

(56) References Cited

U.S. PATENT DOCUMENTS

| | | | |
|---|---|---|---|
| 6,801,274 B2 * | 10/2004 | Suzuki | 349/106 |
| 7,663,708 B2 * | 2/2010 | Wang et al. | 349/37 |
| 7,746,335 B2 * | 6/2010 | Hsu | 345/209 |
| 7,973,897 B2 * | 7/2011 | Wang et al. | 349/139 |
| 8,068,201 B2 * | 11/2011 | Kawashima et al. | 349/130 |
| 8,089,590 B2 * | 1/2012 | Lu | G02F 1/133707 349/114 |
| 8,421,968 B2 * | 4/2013 | Ino | 349/114 |
| 8,582,067 B2 * | 11/2013 | Wang et al. | 349/141 |
| 2009/0323002 A1 * | 12/2009 | Wang et al. | 349/139 |
| 2010/0045903 A1 * | 2/2010 | Aruga et al. | 349/96 |

* cited by examiner

*Primary Examiner* — Thoi Duong
(74) *Attorney, Agent, or Firm* — Silicon Valley Patent Group, LLC.; Edward S. Mao

(57) ABSTRACT

A multi-domain liquid crystal display is disclosed. The display includes embedded fringe field amplifiers behind the color dots of the display. Specifically, the embedded fringe field amplifiers have a polarity that is different from the polarity of the color dot, that is located in front of the embedded fringe field amplifier. This difference in polarity enhances the fringe fields of the color dot or in some situations may create additional fringe fields. The enhanced fringe fields or additional fringe fiends enhances the performance of the display.

27 Claims, 37 Drawing Sheets

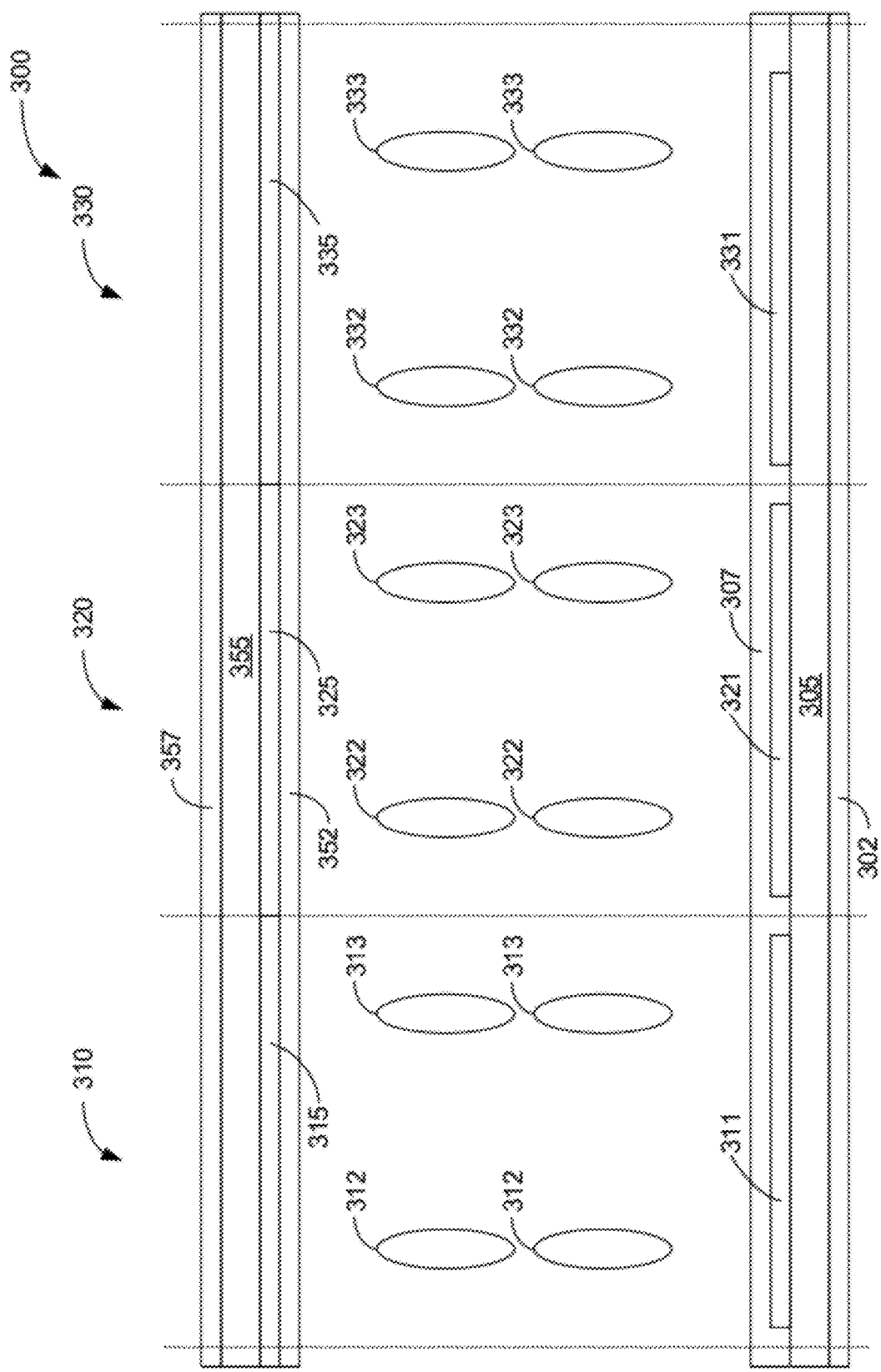

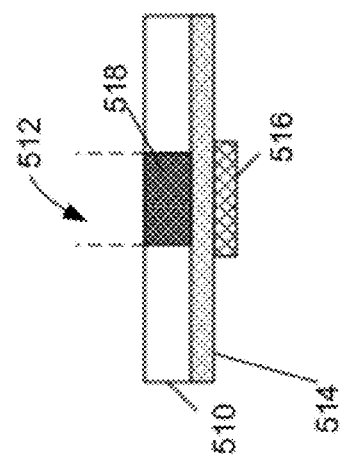
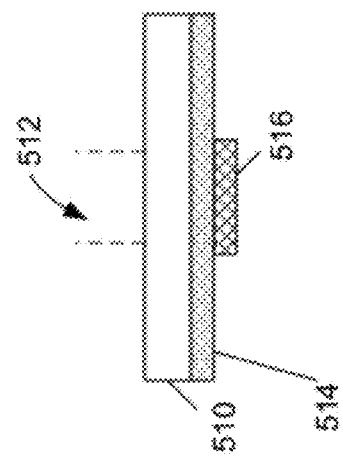
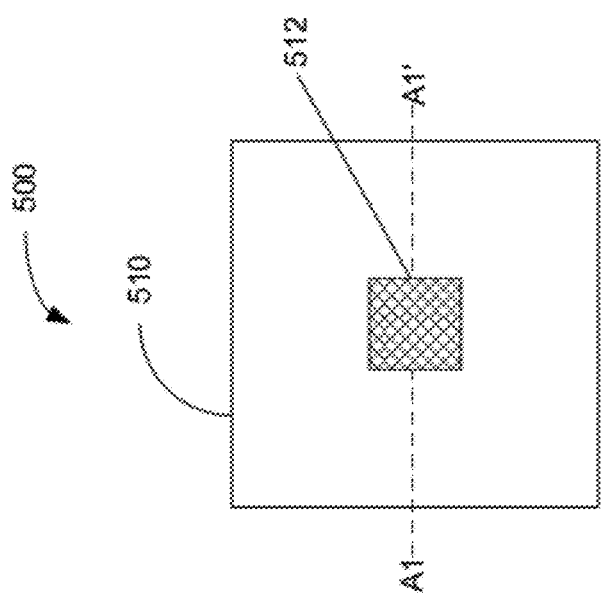

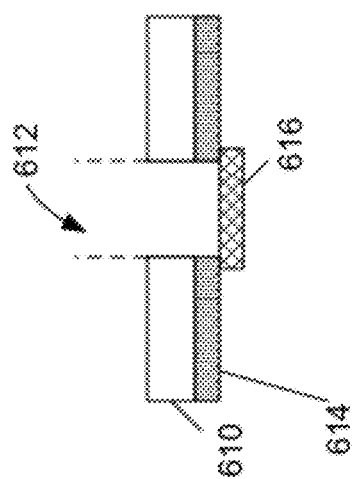
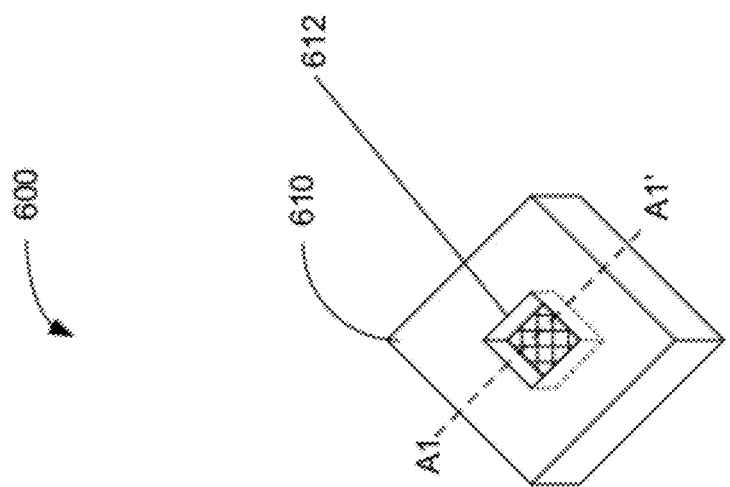

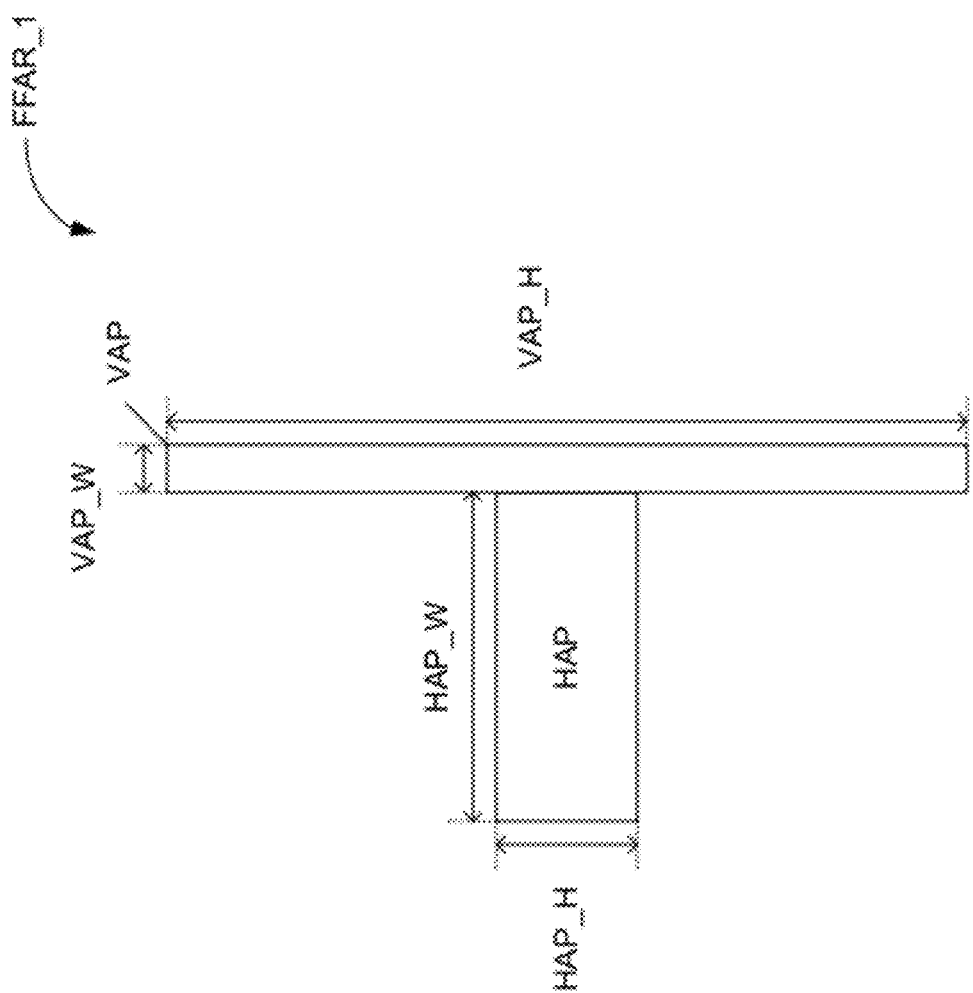

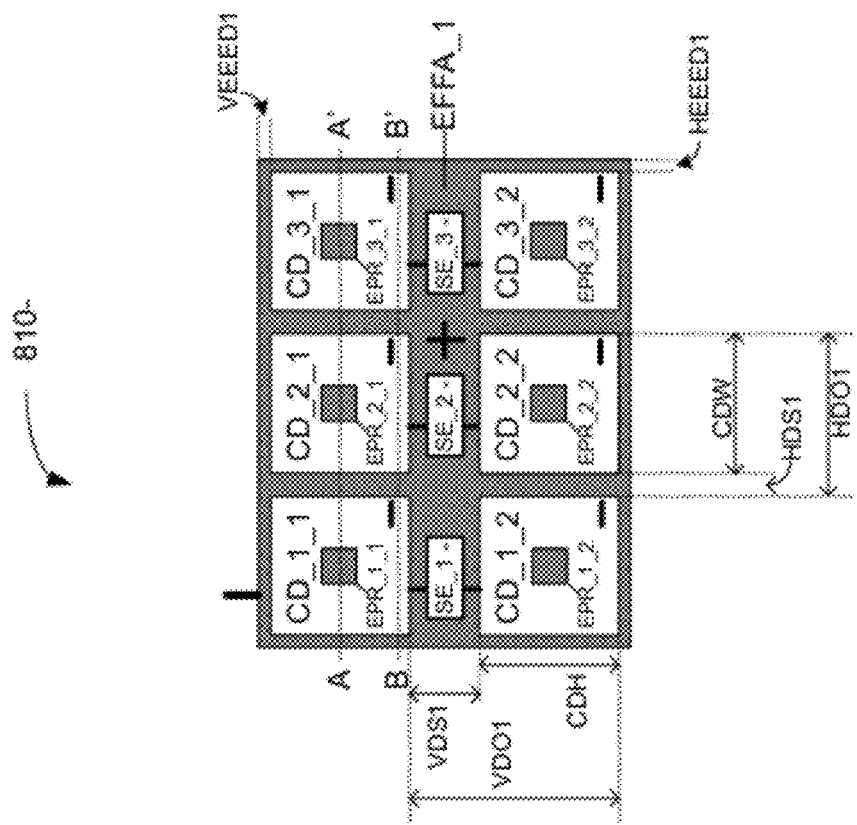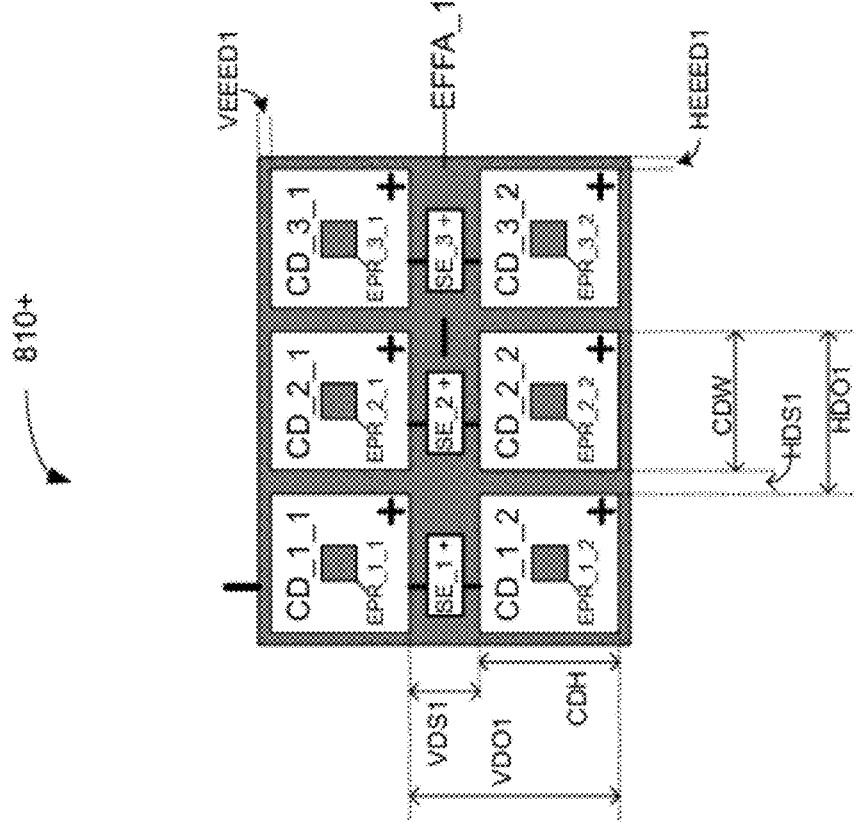

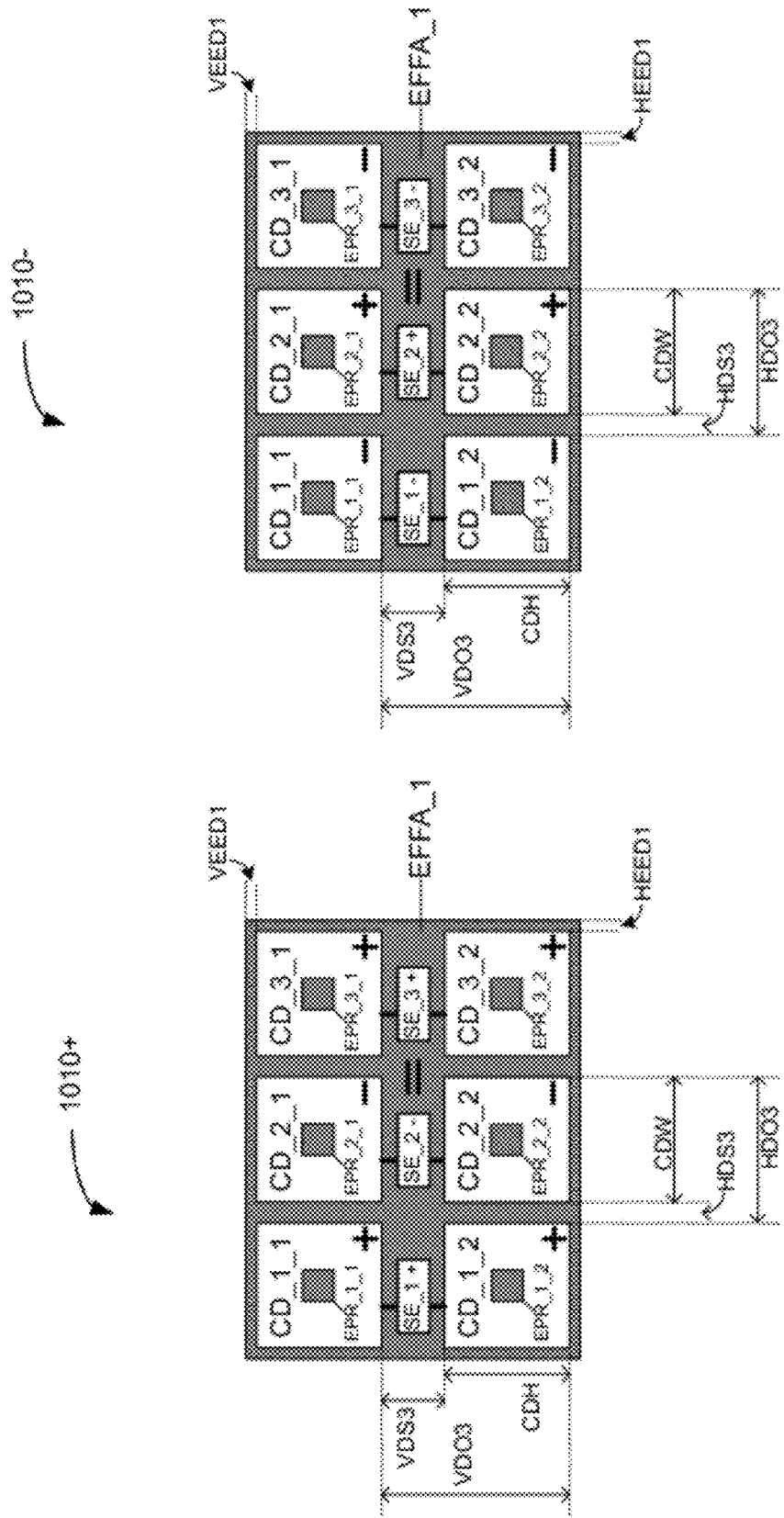

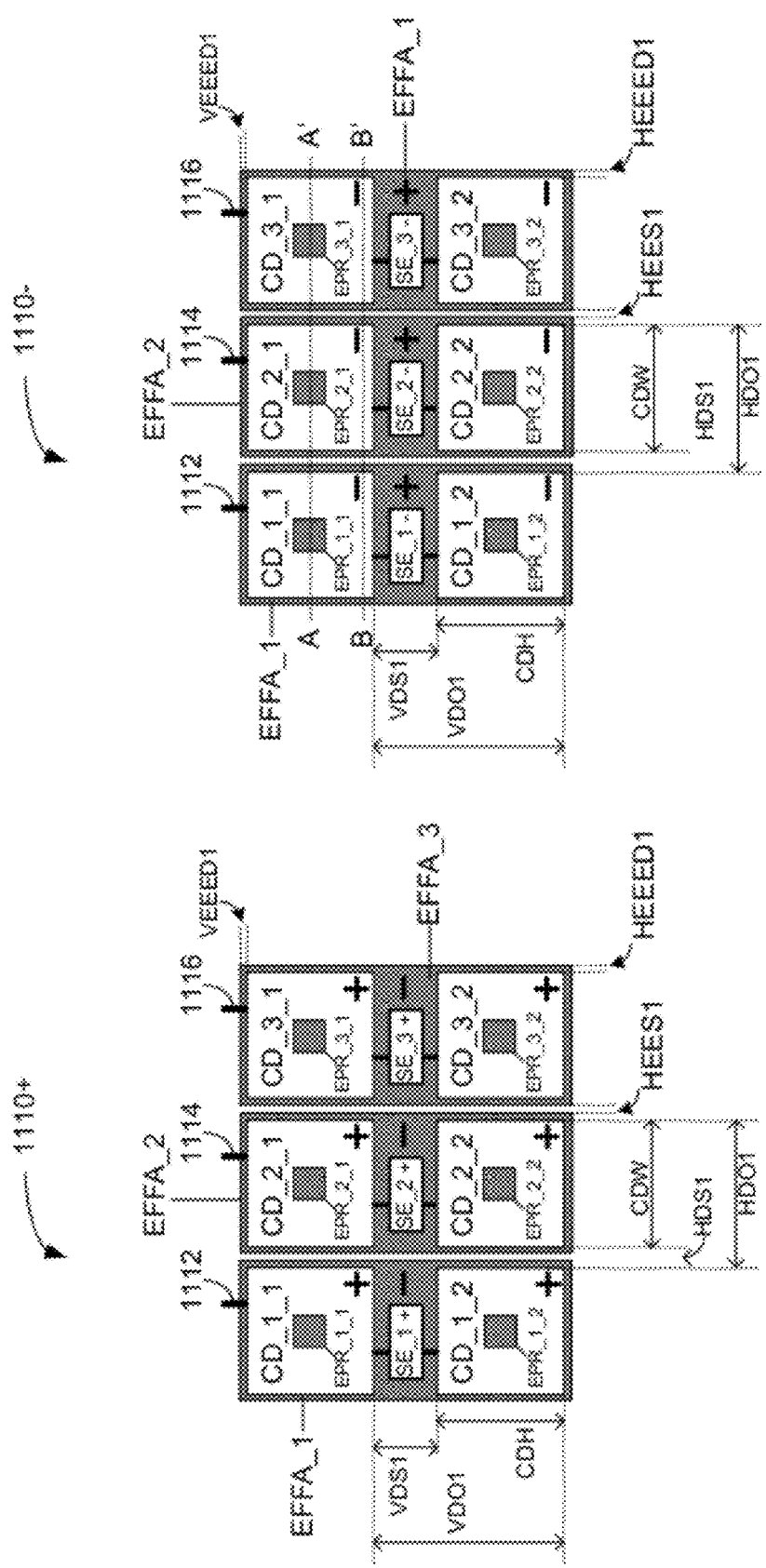

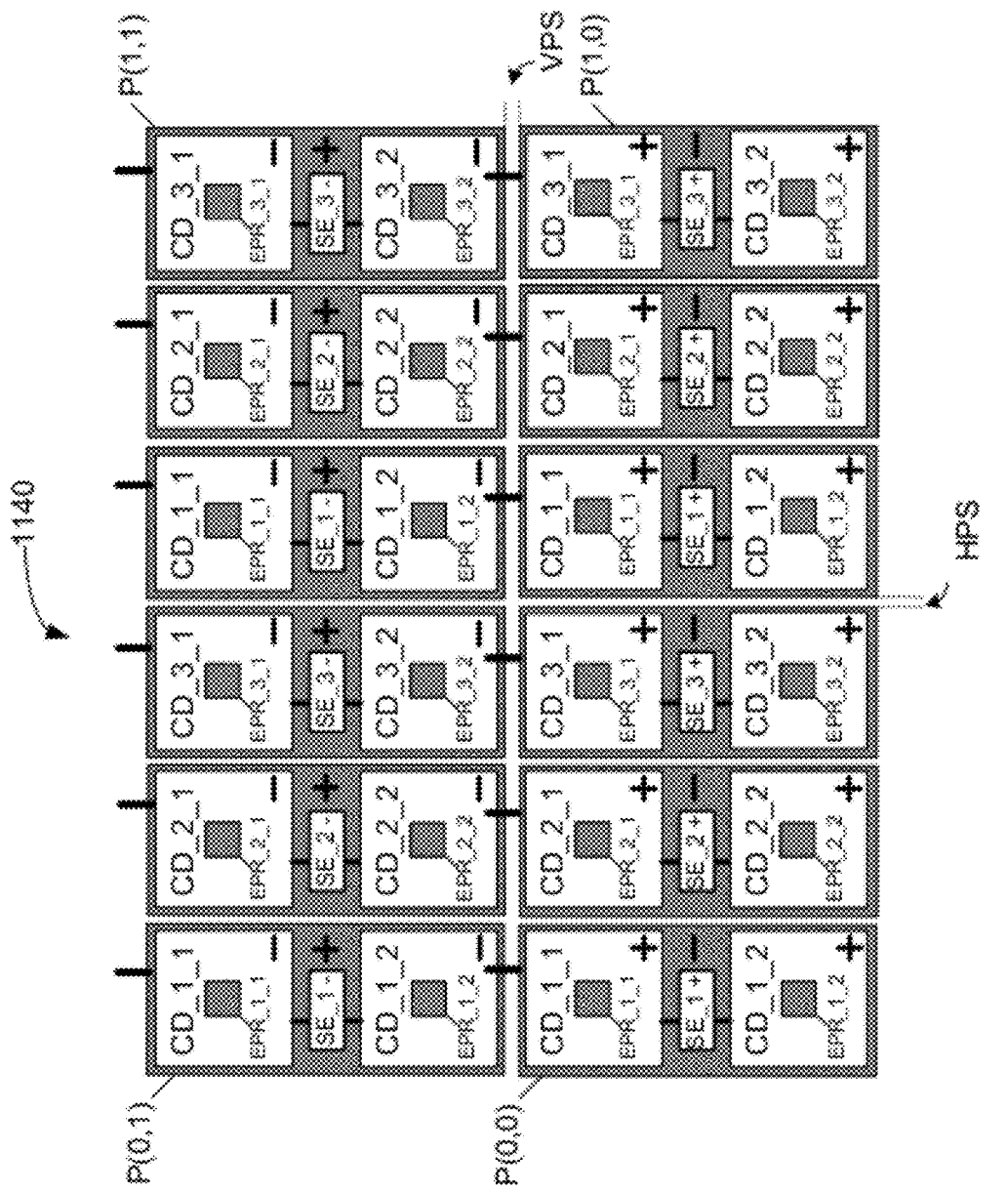

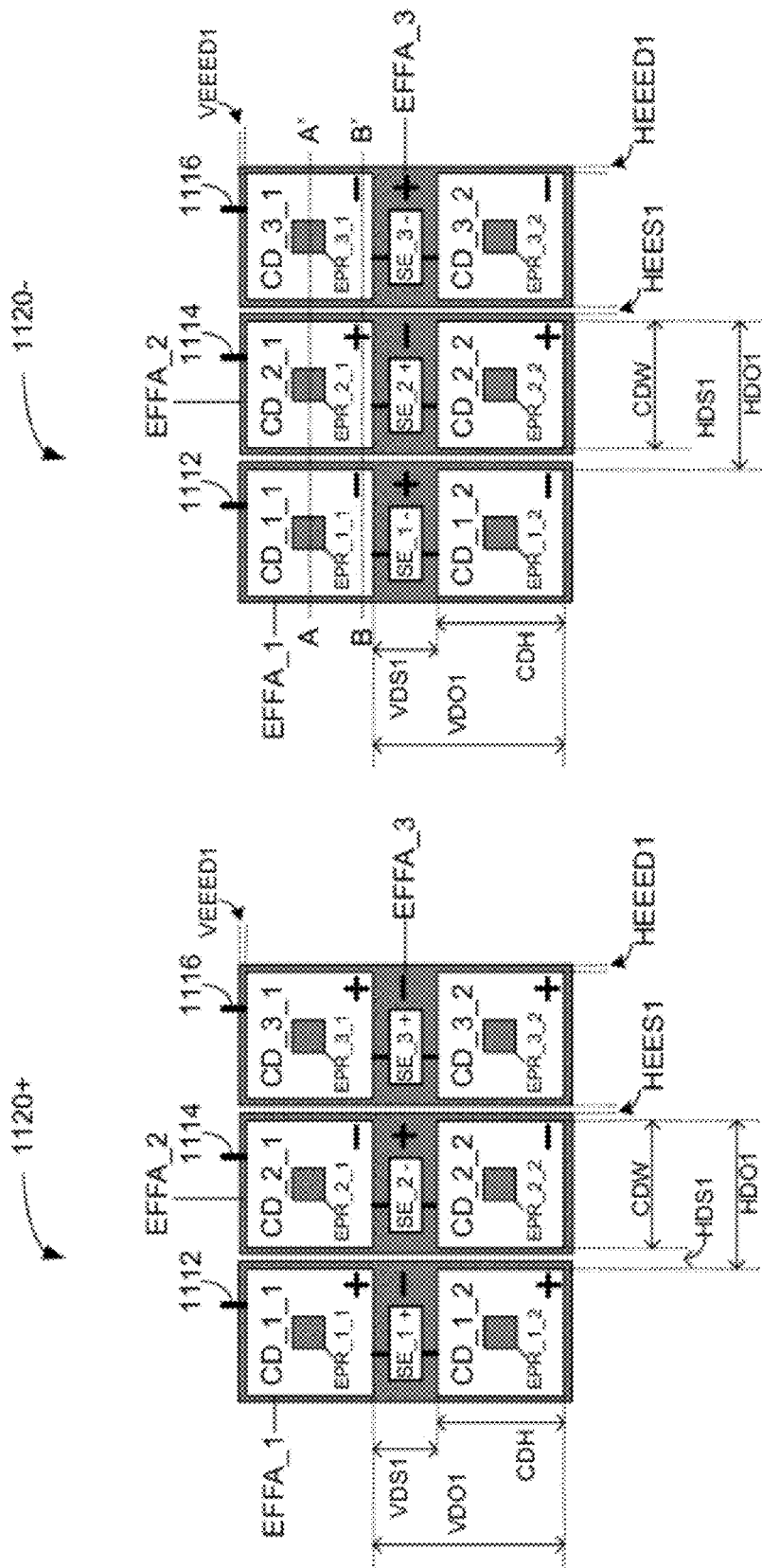

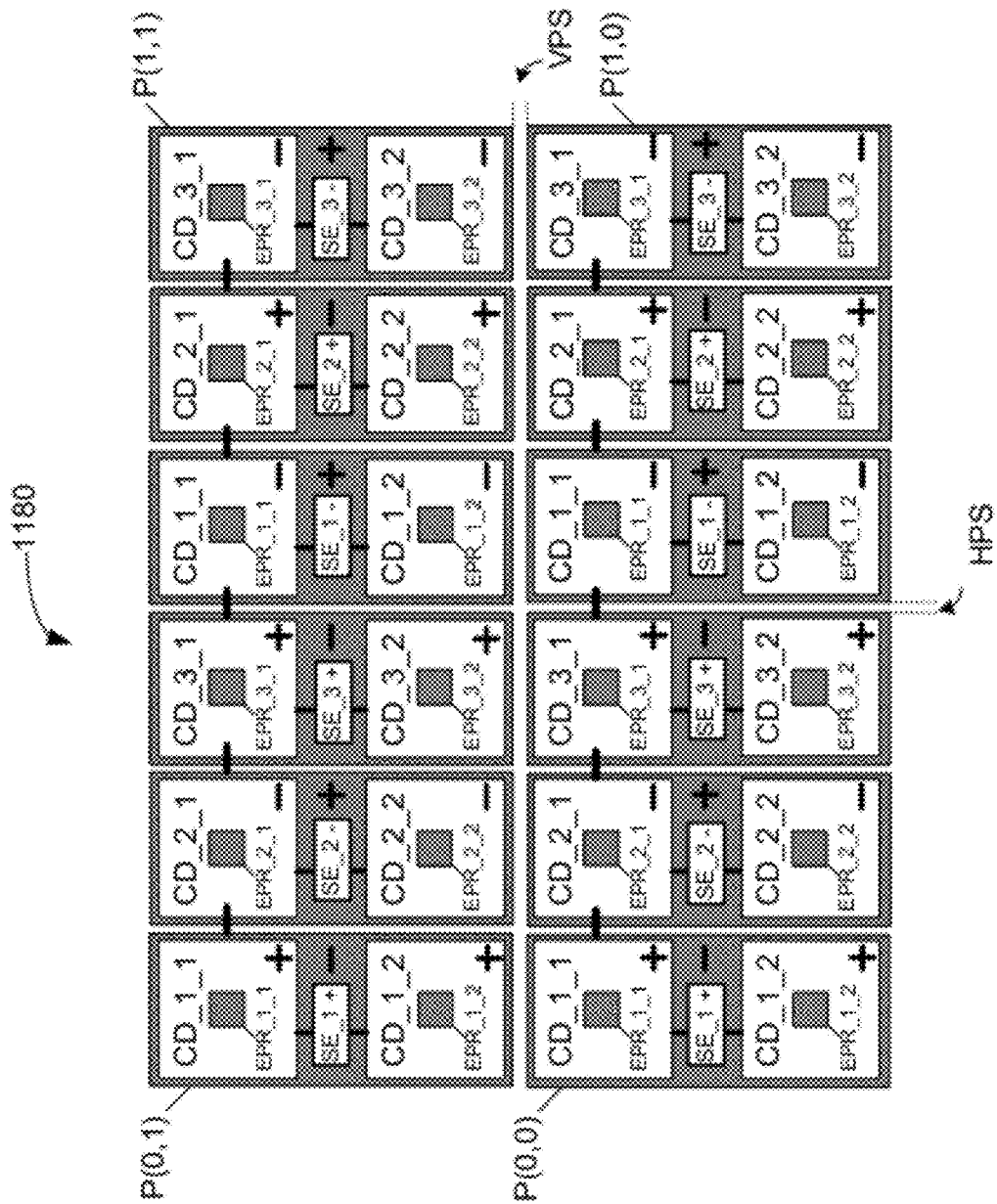

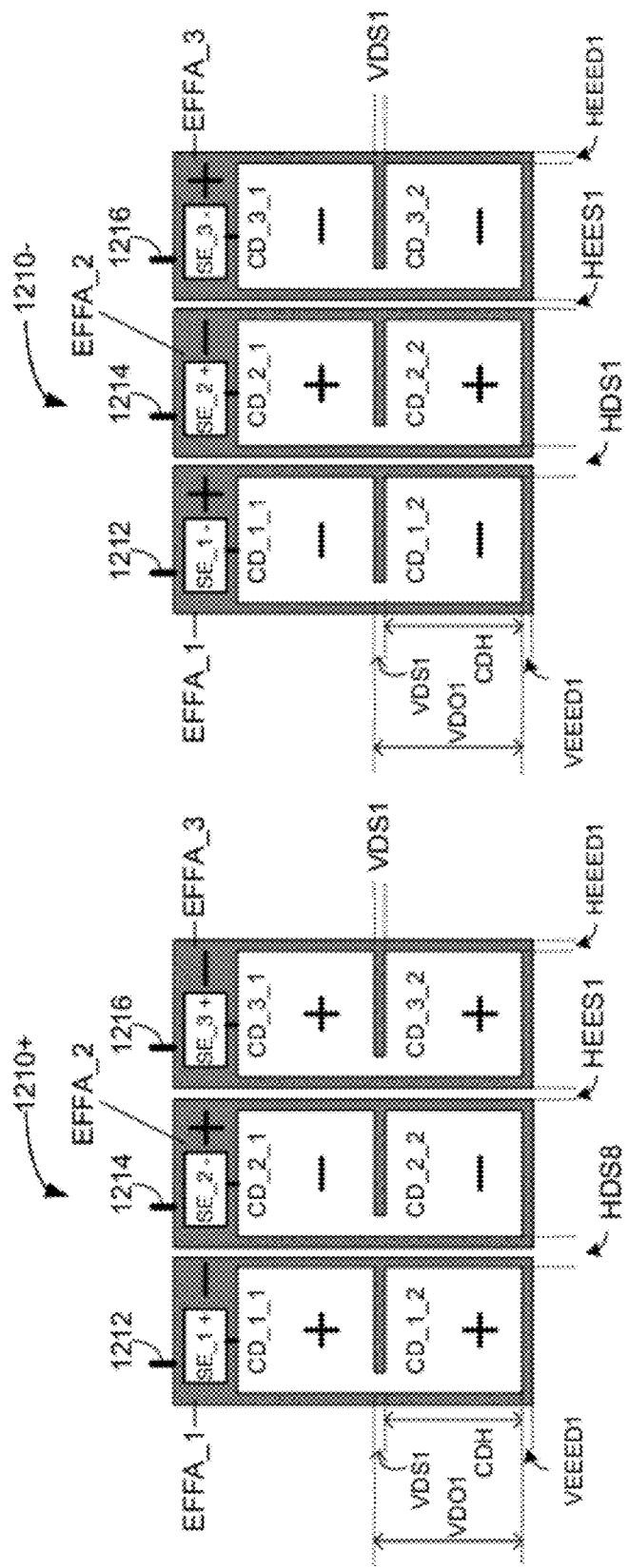

LIQUID CRYSTAL DISPLAYS HAVING PIXELS WITH EMBEDDED FRINGE FIELD AMPLIFIERS

RELATED APPLICATIONS

The present application is a Continuation-In-Part of and claims the benefit of U.S. Utility patent application Ser. No. 12/721,536 entitled "Liquid Crystal Displays Having Color Dots with Embedded Polarity Regions" by Hiap L. Ong, filed Mar. 10, 2010, which is incorporated herein in its entirety by reference. U.S. Utility patent application Ser. No. 12/721,536, is also a Continuation-In-Part of and claimed the benefit of U.S. Utility patent application Ser. No. 12/573,085 entitled "Pixels having Fringe Field Amplifying Regions for Multi-Domain Vertical Alignment Liquid Crystal Displays" by Hiap L. Ong, filed Oct. 2, 2009, which is incorporated herein in its entirety by reference. U.S. Utility patent application Ser. No. 12/573,085, is also a Continuation-In-Part of and claimed the benefit of U.S. Utility patent application Ser. No. 11/751,454 (Publication serial number US 2008/0002072 A1), entitled "Pixels Using Associated Dot Polarity for Multi-Domain Vertical Alignment Liquid Crystal Displays" by Hiap L. Ong, filed May 21, 2007, which is incorporated herein in its entirety by reference. 12/721,536, is also a Continuation-In-Part of and claims the benefit of U.S. Utility patent application Ser. No. 11/751,387 (Publication serial number US 2009/00262271 A1), entitled "Large Pixel Multi-Domain Vertical Alignment Liquid Crystal Display Using Fringe Fields" by Hiap L. Ong, filed May 21, 2007, and is incorporated herein in its entirety by reference. U.S. Utility patent application Ser. No. 12/751,387 is a continuation-in-part of U.S. Utility patent application Ser. No. 11/227,595 (now issued as U.S. Pat. No. 7,630,033), entitled "Large Pixel multi-domain vertical alignment liquid crystal display using fringe fields" by Hiap L. Ong, filed Sep. 15, 2005, and is incorporated herein in its entirety by reference.

U.S. Utility patent application Ser. No. 12/721,536, is a Continuation-In-Part of and claims the benefit of U.S. Utility patent application Ser. No. 12/492,098 (Publication serial number US 2009/00262271 A1), entitled "Large Pixel Multi-Domain Vertical Alignment Liquid Crystal Display Using Fringe Fields" by Hiap L. Ong, filed Jun. 25, 2009, and is incorporated herein in its entirety by reference. U.S. Utility patent application Ser. No. 12/492,098 is a divisional of U.S. Utility patent application Ser. No. 11/227,595 (now issued as U.S. Pat. No. 7,630,033), entitled "Large Pixel multi-domain vertical alignment liquid crystal display using fringe fields" by Hiap L. Ong, filed Sep. 15, 2005, and is incorporated herein in its entirety by reference.

BACKGROUND OF THE INVENTION

1. Field of the Invention

The present invention relates to liquid crystal displays (LCDs). More specifically, the present invention multi-domain vertical alignment LCDs, which can be manufactured with smooth substrates.

2. Discussion of Related Art

Liquid crystal displays (LCDs), which were first used for simple monochrome displays, such as calculators and digital watches, have become the dominant display technology. LCDs are used routinely in place of cathode ray tubes (CRTs) for both computer displays and television displays. Various drawbacks of LCDs have been overcome to improve the quality of LCDs. For example, active matrix displays, which have largely replaced passive matrix displays, reduce ghosting and improve resolution, color gradation, viewing angle, contrast ratios, and response time as compared to passive matrix displays.

However, the primary drawback of conventional twisted nematic LCDs is the viewing angle is very narrow and the contrast ratio is low. Even the viewing angle of active matrixes is much smaller than the viewing angle for CRT. Specifically, while a viewer directly in front of an LCD receives a high quality image, other viewers to the side of the LCD would not receive a high quality image. Multi-domain vertical alignment liquid crystal displays (MVA LCDs) were developed to improve the viewing angle and contrast ratio of LCDs. FIGS. 1($a$)-1($c$) illustrate the basic functionality of a pixel of a vertical alignment LCD 100. For clarity, the LCD of FIG. 1 uses only a single domain. Furthermore, for clarity, the LCDs of FIGS. 1($a$)-1($c$) (and FIG. 2) described in terms of gray scale operation. Furthermore, FIGS. 1($a$)-1($c$) is simplified to clarity and omits many processing layers. For example, between substrate 110 and electrode 120, actual displays would likely include various metal layers used for electrical connections as well as passivation layers (i.e. insulating layers) that separate the metal layers.

LCD 100 has a first polarizer 105, a first substrate 110, a first electrode 120, a first alignment layer 125, liquid crystals 130, a second alignment layer 140, a second electrode 145, a second substrate 150, and a second polarizer 155. Generally, first substrate 110 and second substrate 150 are made of a transparent glass. First electrode 120 and second electrode 145 are made of a transparent conductive material such as ITO (Indium Tin Oxide). First alignment layer 125 and second alignment layer 140, which are typically made of a polyimide (PI) layer, align liquid crystals 130 vertically in a resting state. In operation, a light source (not shown) sends light from beneath first polarizer 105, which is attached to first substrate 110. First polarizer 105 is generally polarized in a first direction and second polarizer 155, which is attached to second substrate 150, is polarized perpendicularly to first polarizer 105. Thus, light from the light source would not pass through both first polarizer 105 and second polarizer 155 unless the light polarization were to be rotated by 90 degrees between first polarizer 105 and second polarizer 155. For clarity, very few liquid crystals are shown. In actual displays, liquid crystals are rod like molecules, which are approximately 5 angstroms in diameter and 20-25 angstroms in length. Thus, there are over 12 million liquid crystal molecules in a pixel that is 120 μm width by 360 μm length by 3 μm height. Although not shown, many liquid crystal displays (particularly active matrix LCDs) include a passivation layer on bottom of first electrode 120. The passivation layer serves as an insulating layer between the first electrode 120 and devices and conductors that may be formed on the substrate. The passivation layer is commonly formed using silicon nitrides.

In FIG. 1($a$), liquid crystals 130 are vertically aligned. In the vertical alignment, liquid crystals 130 would not rotate light polarization from the light source. Thus, light from the light source would not pass through LCD 100 and gives a completely optical black state and a very high contrast ratio for all color and all cell gap. Consequently MVA LCDs provide a big improvement on the contrast ratio over the conventional low contrast twisted nematic LCDs. However, as illustrated in FIG. 1($b$), when an electric field is applied between first electrode 120 and second electrode 145, liquid crystals 130 reorientate to a tilted position. Liquid crystals in the tilted position rotate the polarization of the polarized light coming through first polarizer 105 by ninety degrees so that the light can then pass through second polarizer 155. The amount of tilting, which controls the amount of light passing through the LCD (i.e., brightness of the pixel), is proportional to the strength of the electric field. Generally, a single thin-film-transistor (TFT) is used for each pixel. However for color displays, a separate TFT is used for each color component (typically, Red, Green, and Blue)

However, the light passing through LCD 120 is not uniform to viewers at different viewing angles. As illustrated in FIG. 1(c), a viewer 172 that is left of center would see a bright pixel because the broad (light rotating) side of liquid crystals 130 face viewer 172. A viewer 174 that is centered on the pixel would see a gray pixel because the broad side of liquid crystals 130 is only partially facing viewer 174. A viewer 176 that is right of center would see a dark pixel because the broad side of liquid crystals 130 is barely facing viewer 176.

Multi-domain vertical alignment liquid crystal displays (MVA LCDs) were developed to improve the viewing angle problems of single-domain vertical alignment LCDs. FIG. 2 illustrates a pixel of a multi-domain vertical alignment liquid crystal display (MVA LCD) 200. MVA LCD 200 includes a first polarizer 205, a first substrate 210, a first electrode 220, a first alignment layer 225, liquid crystals 235, liquid crystals 237, protrusions 260s, a second alignment layer 240, a second electrode 245, a second substrate 250, and a second polarizer 255. Liquid crystals 235 form the first domain of the pixel and liquid crystals 237 form the second domain of the pixel. When an electric field is applied between first electrode 220 and second electrode 245, protrusions 260 cause liquid crystals 235 to tilt in a different direction than liquid crystals 237. Thus, a viewer 272 that is left of center would see the left domain (liquid crystals 235) as black and the right domain (liquid crystals 237) as white. A viewer 274 that is centered would see both domains as gray. A viewer 276 that is right of center would see the left domain as white and the right domain as black. However, because the individual pixels are small, all three viewers would perceive the pixel as being gray. As explained above, the amount of tilting of the liquid crystals is controlled by the strength of the electric field between electrodes 220 and 245. The level of grayness perceived by the viewer directly related to the amount of tilting of the liquid crystals. MVA LCDs can also be extended to use four domains so that the LC orientation in a pixel is divided into 4 major domains to provide wide symmetrical viewing angles both vertically and horizontally.

Thus, multi-domain vertical alignment liquid crystal displays, provide wide symmetrical viewing angles, however, the cost of manufacturing MVA LCDs are very high due to the difficulty of adding protrusions to the top and bottom substrates and the difficulty of properly aligning the protrusions on the top and bottom substrates. Specifically, a protrusion on the bottom substrate must be located at the center of two protrusions on the top substrate; any misalignment between the top and bottom substrates will reduce the product yield. Other techniques of using physical features to the substrates, such as ITO slits, which have been used in place of or in combination with the protrusions, are also very expensive to manufacture. Furthermore, the protrusions and ITO slits inhibit light transmission and thus reduce the brightness and contrast ratio of the MVA LCDs.

However, MVA LCDs have been developed that do not require the use of physical features (such as protrusions or ITO slits) on the substrate. Specifically, these MVA LCDs use fringe fields to create multiple-domains. Without the requirement of physical features the difficulty of aligning the physical features of the top and bottom substrate is eliminated. Thus, MVA LCDs using fringe fields have higher yield and are less expensive to manufacture than MVA LCDs that use physical features on the substrates.

FIGS. 3(a) and 3(b) illustrate the basic concept used to create a multi-domain vertical alignment liquid crystal display (MVA LCD) 300 without resorting to physical features on the substrates. Specifically FIG. 3 shows pixels 310, 320, and 330 in between a first substrate 305 and a second substrate 355. A first polarizer 302 is attached to first substrate 305 and a second polarizer 357 is attached to second substrate 355. Pixel 310 includes a first electrode 311, liquid crystals 312, liquid crystals 313 and a second electrode 315. Pixel 320 includes a first electrode 321, liquid crystals 322, liquid crystals 323 and a second electrode 325. Similarly, pixel 330 includes a first electrode 331, liquid crystals 332, liquid crystals 333 and a second electrode 335. Although not shown, many liquid crystal displays include a passivation layer on top of electrodes 311, 321, and 331. The electrodes are typically constructed using a transparent conductive material such as ITO. Furthermore, a first alignment layer 307 covers the electrodes on first substrate 305. Similarly a second alignment layer 352 covers the electrodes on second substrate 355. Both LC alignment layers 307 and 352 provide a vertical LC alignment. As explained in more detail below, electrodes 315, 325, and 335 are held at a common voltage V_Com. Therefore, to ease manufacturing, electrodes 315, 325, and 335 are created as a single structure (as shown in FIGS. 3(a) and 3(b)). MVA LCD 300 operates pixels 310, 320, and 330 using alternating polarities. For example, if the polarities of pixels 310 and 330 are positive then the polarity of pixel 320 would be negative. Conversely, if the polarities of pixel 310 and 330 are negative then the polarity of pixel 320 would be positive. Generally, the polarity of each pixel would switch between frames, but the pattern of alternating polarities is maintained in each frame. In FIG. 3(a), pixels 310, 320, and 330 are in the "OFF" state, i.e. with the electric field between the first and second electrodes turned off. In the "OFF" state some residual electric field may be present between the first and second electrode. However, the residual electric field is generally too small to tilt the liquid crystals.

In FIG. 3(b), pixels 310, 320, and 330 are in the "ON" state. 3(b) uses "+" and "−" to denote the voltage polarity of the electrodes. Thus, electrodes 311, and 331 have positive voltage polarity and electrodes 321 has negative voltage polarity. Substrate 355 and electrodes 315, 325, and 335 are kept at common voltage V_com. The voltage polarity is defined with respect to the V_com voltage, where a positive polarity is obtained for voltages higher than V_com, and a negative polarity is obtained for voltage smaller than V_com. Electric field 327 (illustrated using field lines) between electrodes 321 and 325 causes liquid crystals 322 and liquid crystals 323 to tilt. In general, without protrusions or other features the tilting direction of the liquid crystals is not fixed for liquid crystals with a vertical LC alignment layers at 307 and 352. However, the fringe field at the edges of the pixel can influence the tilting direction of the liquid crystals. For example, electric field 327 between electrode 321 and electrode 325 is vertical around the center of pixel 320 but is tilted to the left in the left part of the pixel, and tiled to the right in the right part of the pixel. Thus, the fringe field between electrode 321 and electrode 325 cause liquid crystals 323 to tilt to the right to form one domain and cause liquid crystals 322 to tilt to the left to from a second domain. Thus, pixel 320 is a multi-domain pixel with a wide symmetrical viewing angle Similarly, the electric field (not shown) between electrode 311 and electrode 315 would have fringe fields that cause liquid crystals 313 to reorientate and tilt to the right in the right side in pixel 312 and cause liquid crystals 312 to tilt to the left in the left side in pixel 310. Similarly, the electric field (not shown) between electrode 331 and electrode 335 would have fringe fields that cause liquid crystals 333 to tilt to the right in the right side in pixel 330 and cause liquid crystals 332 to tilt to the left in the left side in pixel 330.

Alternating polarity of adjacent pixels amplifies the fringe field effect in each pixel. Therefore, by repeating the alternating polarity pattern between rows of pixels (or columns of pixels), a multi domain vertical alignment LCD is achieved without physical features. Furthermore, an alternating polarity checkerboard pattern can be used to create four domains in each pixel.

However, fringe field effects are relatively small and weak, in general. Consequently, as pixels become larger, the fringe fields at the edge of the pixels would not reach all the liquid crystals within a pixel. Thus, in large pixels the direction of tilting for the liquid crystals not near the edge of the pixels would exhibit random behavior and would not produce a multi-domain pixel. Generally, fringe field effects of pixels would not be effective to control liquid crystal tilt when the pixels become larger than 40-60 µm. Therefore, for large pixel LCDs pixel division methods are used to achieve multi-domain pixels. Specifically, for color LCDs, pixels are divided into color components. Each color component is controlled by a separate switching element, such as a thin-film transistor (TFT). Generally, the color components are red, green, and blue. The color components of a pixel are further divided into color dots.

The polarity of each pixel switches between each successive frame of video to prevent image quality degradation, which may result from twisting the liquid crystals in the same direction in every frame. However, the dot polarity pattern switching may cause other image quality issues such as flicker if all the switching elements are of the same polarity. To minimize flicker, the switching elements (e.g. are transistors) are arranged in a switching element driving scheme that include positive and negative polarities. Furthermore, to minimize cross talk the positive and negative polarities of the switching elements should be arranged in a uniform pattern, which provides a more uniform power distribution. The three main switching element driving schemes are switching element point inversion driving scheme, switching element row inversion driving scheme, and switching element column inversion driving scheme. In the switching element point inversion driving scheme, the switching elements form a checkerboard pattern of alternating polarities. In the switching element row inversion driving scheme, the switching elements on each row have the same polarity; however, each switching element in one row has the opposite polarity as compared to the polarity of switching elements in adjacent rows. In the switching element column inversion driving scheme, the switching elements on each column have the same polarity; however, a switching element in one column has the opposite polarity as compared to the polarity of switching elements in adjacent columns. While the switching element point inversion driving scheme provides the most uniform power distribution, the complexity and additional costs and power consumption of switching element point inversion driving scheme over switching element row inversion driving scheme or switching element column inversion driving scheme may not be cost effective. Thus, most LCD displays for low cost or low voltage applications are manufactured using switching element row inversion driving scheme while switching element point inversion driving scheme is usually reserved for high performance applications.

Pixels may include various key components arranged to achieve high quality low cost display units. For example, pixel can include color components, color dots, fringe field amplifying regions (FFAR), switching elements, device component areas, and associated dots. Displays using these various components are described in U.S. Pat. No. 7,630,033 entitled "Large Pixel Multi-Domain Vertical Alignment Liquid Crystal Display Using Fringe Fields", U.S. patent application Ser. No. 11/751,454 entitled "Pixels Using Associated Dot Polarity for Multi-Domain Vertical Alignment Liquid Crystal Displays", U.S. patent application Ser. No. 12/018,675 entitled "Pixels Having Polarity Extension Regions For Multi-Domain Vertical Alignment Liquid Crystal Displays", and U.S. patent application Ser. No. 12/573,085 entitled "Pixels Having Fringe Field Amplifying Regions For Multi-Domain Vertical Alignment Liquid Crystal Displays", which are incorporated herein by reference.

Device component area encompasses the area occupied by the switching elements and/or storage capacitor as well as the area that was used to manufacture the switching elements and/or storage capacitors. For clarity, a different device component area is defined for each switching element.

Associated dots and fringe field amplifying regions are polarized areas that are not part of the color components. Associated dots cover the device component areas. Generally, the associated dots are manufactured by depositing an passivation layer over the switching element and/or storage capacitors. Followed by depositing an electrically conductive layer to form the associated dot. The associated dots are electrically connected to specific switching element and or other polarized components (such as color dots). The storage capacitors are electrically connected to specific switching element and color dot electrodes to compensate and offset the capacitance change on the liquid crystal cells during the switching-on and switching-off processes of the liquid crystal cells. Consequently, the storage capacitors are used to reduce the cross-talk effects during the switching-on and switching-off processes of the liquid crystal cells. A patterning mask is used when it is necessary to form the patterned electrode for the associated dots. A black matrix layer is added to form a light shield for the color dots, switching element, DCA, and associated dot. In general, the black matrix layer is black however some displays use different color to achieve a desired color pattern or shading. A color layer is added to give desired color for the color dot. Generally, the color layer is achieved by depositing a color filter layer on the corresponding ITO glass substrate. Specifically, a patterned color filter layer is deposited between second substrate 355 and second electrodes 315, 325, and 335 with pattern corresponding to the color for the color dot and associated dots. However, some displays may also place a patterned color filter layer on top or underneath the switching element, the electrode layer of the color dots, associated dots, or DCA on the first substrate 305.

In some displays, the associated dot is an area independent of the switching elements. Furthermore, displays have additional associated dots not directly related to the switching elements. Generally, the associated dot includes an active electrode layer such as ITO or other conductive layer, and is connected to a nearby color dot or powered in some other manner. For opaque associated dots, a black matrix layer can be added on the bottom of the conductive layer to form the opaque area. The black matrix can be fabricated on the ITO glass substrate side to simplify the fabrication process. The additional associated dots improve the effective use of display area to improve the aperture ratio and to form the multiple liquid crystal domains within the color dots. Some displays also use associate dots to improve color performance. For example, careful placement of associated dots can allow the color of nearby color dots to be modified from the usual color pattern.

Fringe field amplifying regions are more versatile than associated dots. Specifically, fringe field amplifying regions may have non-rectangular shapes, although generally, the overall shape of the fringe field amplifying regions can be divided into a set of rectangular shapes. Furthermore, fringe field amplifying regions extend along more than one side of a color dot. In addition, fringe field amplifying regions may be used in place of associated dots in some displays. Specifically, in these displays the fringe field amplifying region cover the device component areas but also extend along more than one side of color dots adjacent to the device component areas.

In general, the color dots, device component areas, and associated dots are arranged in a grid pattern and are separated from adjacent neighbors by a horizontal dot spacing HDS and a vertical dot spacing VDS. When fringe field amplifying regions are used in place of associated dots, part of the fringe field amplifying regions would also fit in the grid pattern. In some displays multiple vertical dot spacings and multiple horizontal dot spacings may be used. Each color dot, associated dot, and device component area has two adjacent neighbors (e.g. color dots, associated dots, or device component areas) in a first dimension (e.g. vertical) and two adjacent neighbors in a second dimension (e.g. horizontal). Furthermore, two adjacent neighbors can be aligned or shifted. Each color dot has a color dot height CDH and a color dot width CDW. Similarly, each associated dot has an associated dot height ADH and an associated dot width ADW. Furthermore, each device component area has device component area height DCAH and a device component area width DCAW. In some displays, color dots, associated dots and device component areas are the same size. However in many displays color dots, associated dots and device component areas could be of different size or shapes. For example in many displays associated dots have a smaller height than color dots.

With the popularity of higher performance portable devices, there is an increasing need for higher pixel density in LCD displays because portable devices are typically held much closer to a user's eyes than LCD screens used for Televisions or computer monitors. However, high pixel density requires smaller pixels, which may lead to lower brightness because the size of many device components within the LCD can not reduce as much as the size reduction of the pixel. In addition spacing between various device components in the pixels or color dots becomes a larger percentage of the surface area of the display. Furthermore, many mobile devices incorporate touch screens for user input. Touch screen devices may subject an LCD panel to touch mura effects due to physical disturbance of the liquid crystals. Touch mura effects refer to irregular patterns or regions causing uneven screen uniformity. Physical disturbance of the liquid crystals may be caused by shaking, vibration, and pressure on the display. In particular, vertically aligned liquid crystal displays are very susceptible to touch mura effects caused by pressure on the display. Specifically, pressure on a vertically aligned liquid crystal display may flatten the liquid crystals thickness locally and cause a disturbance effect on the display. Hence there is a need for a method or system to minimize the spacing between various components to improve the optical transmission and a need for a method or system to reduce touch mura effects in a vertically aligned liquid crystal display.

SUMMARY

Accordingly, the present invention provides a vertically aligned liquid crystal display with higher pixel density and reduced touch mura effects. Specifically, embodiments of the present invention use novel pixel designs that have color dots with embedded polarity regions (EPR) which amplifies fringe fields that can enhance MVA operation and also more quickly restore the liquid crystals to their proper positions. Furthermore, embodiments of the present invention include embedded fringe field amplifiers that amplify fringe fields without requiring extensive area so that a high optical transmission can be obtained. In addition, embodiments of the present invention have increased optical transmission so that higher brightness can be obtained while electrical power consumption of the backlight unit can be reduced.

For example, in accordance with some embodiments of the present invention, a pixel includes a first color component, a first switching element and an embedded fringe field amplifier. The first color component has a first first-component color dot that is coupled to the first switching element. The first embedded fringe field amplifier is located behind the first first-component color dot. More specifically, a first edge and a second edge of the first first-component color dot are in front of the first embedded fringe field amplifier. The pixel also includes a second color component having a first second-component color dot that is coupled to a second switching element. The first second-component color dot has a first edge and a second edge that is in front of the first embedded fringe field amplifier. In other embodiments of the present invention, the first embedded fringe field amplifier is used for the first color component and a second embedded fringe field amplifier is used with the second color component. Specifically, the second embedded fringe field amplifier is located behind the first second-component color dot. At least a first edge and a second edge of the first second component color dot are in front of the second embedded fringe field amplifier.

In still other embodiments of the present invention, embedded fringe field amplifiers include vertical embedded portions and horizontal embedded portions. For example in some embodiments of the present invention, a pixel includes first color component having a first first-component color dot, a first switching element coupled to the first first-component color dot, and a first embedded fringe field amplifier having a first vertical embedded portion and a first horizontal embedded portion. The first vertical embedded portion is located behind a first edge of the first first-component color dot and the first horizontal embedded portion is located behind a second edge of the first first-component color dot. The first embedded fringe field amplifier may include additional horizontal embedded portions and additional vertical embedded portions. For example, in one embodiment of the present invention, the first embedded fringe field amplifier also includes a second vertical embedded portion located behind a third edge of the first first-component color dot and a second horizontal embedded portion located behind a fourth edge of the first first-component color dot.

The present invention will be more fully understood in view of the following description and drawings.

BRIEF DESCRIPTION OF THE DRAWINGS

FIGS. 3(a)-3(b) illustrate a multi-domain vertical alignment liquid crystal display in accordance with one embodiment of the present invention.

FIGS. 5(a)-5(c) illustrate a color dot in accordance with one embodiment of the present invention.

FIGS. 6(a)-6(b) illustrate a color dot in accordance with one embodiment of the present invention.

FIGS. 7(a)-7(c) illustrate a pixel design in accordance with one embodiment of the present invention.

FIG. 7(f) illustrates a portion of a display in accordance with one embodiment of the present invention.

FIGS. 8(a)-8(c) illustrate a pixel design in accordance with one embodiment of the present invention.

FIGS. 10(a)-10(b) illustrate a pixel design in accordance with one embodiment of the present invention.

FIGS. 11(a)-11(c) illustrate a pixel design in accordance with one embodiment of the present invention.

FIG. 11(d) illustrates a portion of a display in accordance with one embodiment of the present invention.

FIGS. 11(e)-11(f) illustrate a pixel design in accordance with one embodiment of the present invention.

FIG. 11(h) illustrates a portion of a display in accordance with one embodiment of the present invention.

FIGS. 12(a)-12(b) illustrate a pixel design in accordance with one embodiment of the present invention.

DETAILED DESCRIPTION

As explained above, conventional vertically aligned LCDs have limited optical transmission and are very susceptible to touch mura effects caused by physical disturbances to the liquid crystals. However, vertically aligned LCDs in accordance with the principles of the present invention use embedded fringe field amplifiers that allow higher aperture ratio to increase optical transmission. In addition the embedded fringe field amplifiers enhance MVA operations and decrease touch mura effects by enhancing lateral fringe fields that help to enhance the MVA operation and also help to restore the liquid crystals to their proper orientation after a physical disturbance. Thus, vertically aligned LCDs in accordance with the present invention have improved optical transmission and can quickly resolve touch mura effects caused by physical disturbance of the liquid crystals.

Figure 4A:
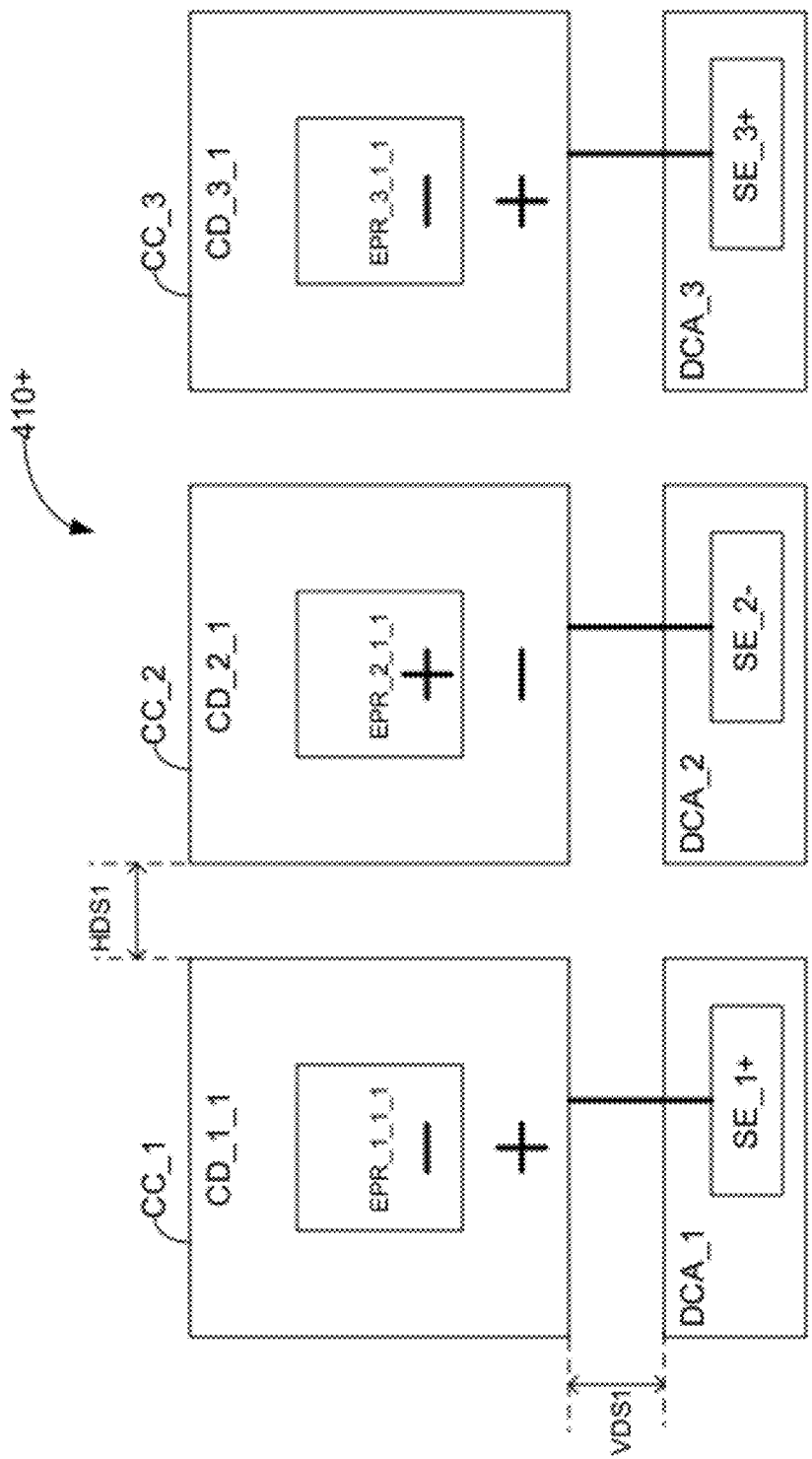
FIGS. 4(a)-4(b) illustrate a pixel design in accordance with one embodiment of the present invention.
Figure 4B:
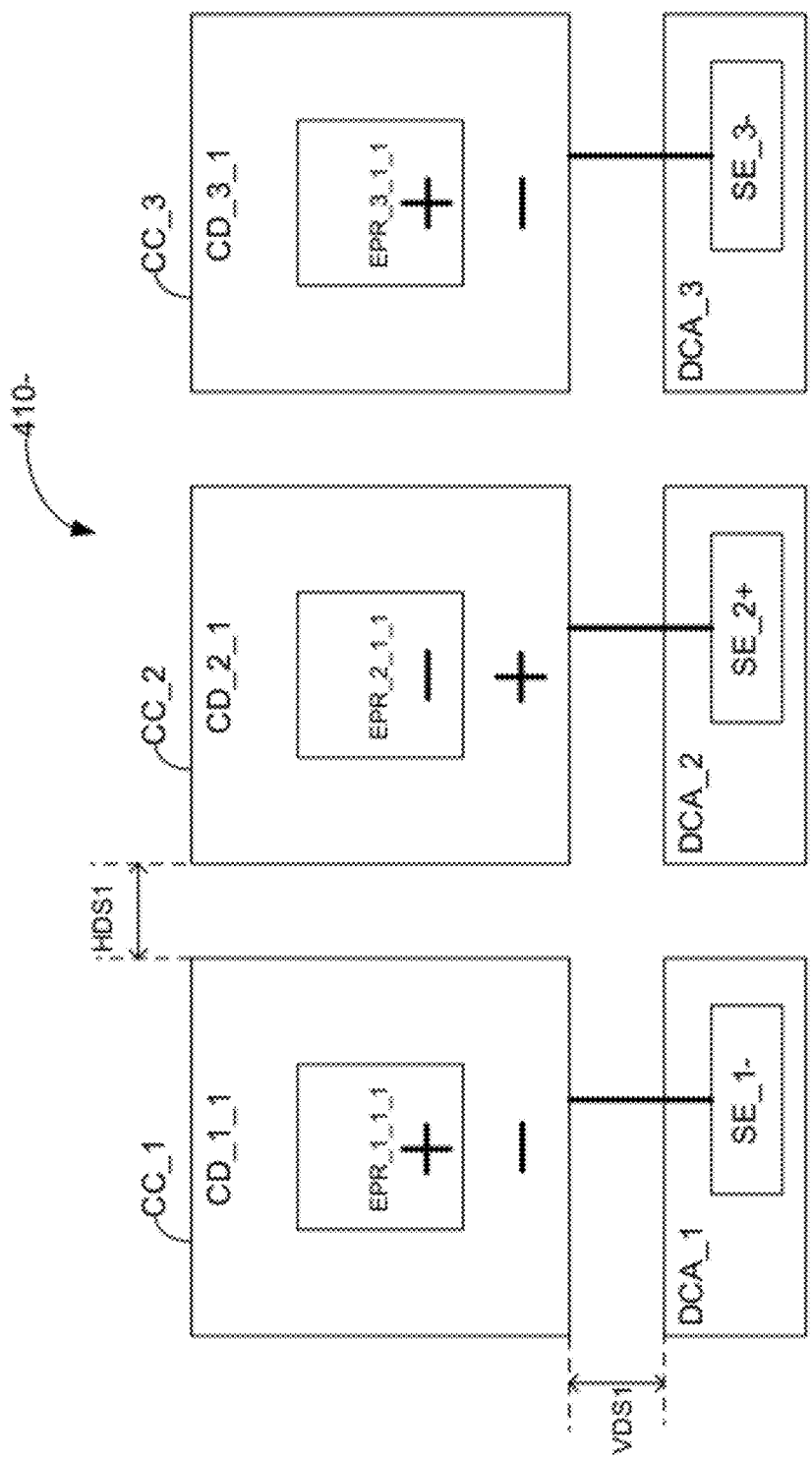

FIGS. 4(a) and 4(b) show different dot polarity patterns of a pixel design 410 (labeled 410+ and 410− as described below) in accordance with one embodiment of the present invention. In actual operation a pixel will switch between a first dot polarity pattern and a second dot polarity pattern between each image frame. For clarity, the dot polarity pattern, in which the first color dot of the first color component has a positive polarity, is referred to as the positive dot polarity pattern. Conversely, the dot polarity pattern in which the first color dot of the first color component has a negative polarity is referred to as the negative dot polarity pattern. Specifically, in FIG. 4(a), pixel design 410 has a positive dot polarity pattern (and is thus labeled 410+) and in FIG. 4(b), pixel design 410 has a negative dot polarity pattern (and is thus labeled 410−). Furthermore, the polarity of each polarized component in the various pixel designs are indicated with "+" for positive polarity or "−" for negative polarity.

Pixel design 410 has three color components CC_1, CC_2 and CC_3. Each of the three color components includes one color dots. For clarity, the color dots are referenced as CD_X_Y, where X is a color component (from 1 to 3 in FIGS. 4(a)-4(b)) and Y is a dot number (In FIGS. 4(a)-4(b) Y is always 1). Pixel design 410 also includes a switching element for each color component (referenced as SE_1, SE_2, and SE_3) and a device component area for each color component (referenced as DCA_1, DCA_2, and DCA_3). Switching elements SE_1, SE_2, and SE_3 are arranged in a row. Device component areas DCA_1, DCA_2, and DCA_3 surround switching elements SE_1, SE_2, and SE_3, respectively.

First color component CC_1 of pixel design 410 has one color dots CD_1_1. Color dots CD_1_1 is horizontally aligned with device component area DCA_1 and vertically separated from device component area DCA_1 by a vertical dot spacing VDS1. Switching element SE_1 is coupled to the electrodes of color dot CD_1_1 to control the polarity of color dot CD_1_1. Color dot CD_1_1 includes an embedded polarity region EPR_1_1_1. For clarity, the embedded polarity regions are referenced as EPR_X_Y_Z, where X is a color component, Y is a dot number, and Z enumerates the embedded polarity regions within a color dot. Embedded polarity regions can have different shapes. For example, in pixel design 410 embedded polarity regions have a rectangular shape. However other embodiments may have square shapes, circular shapes, polygonal shapes (such as squares and hexagons), or even other irregular shapes.

In general polarity refers to the direction of polarity usually denoted as positive or negative. More precisely, polarity also includes a magnitude of polarity. Embedded polarity regions may have the same direction of polarity (i.e. positive or negative) as the color dot but have a different magnitude of polarity. Furthermore, embedded polarity regions may have different polarity (i.e. "direction of polarity") than the color dot (e.g. positive polarity for color dot polarity with negative polarity for embedded polarity regions). In addition, embedded polarity regions can have neutral polarity. Different embodiments of the present invention use different novel techniques or combination of novel techniques to create the embedded polarity regions within the color dots. These techniques are described in detail below. In the embodiment of FIGS. 4(a) and 4(b), color dots have opposite polarity with the embedded polarity region within the color dot.

Second color component CC_2 of pixel design 410 has one color dots CD_2_1. Color dots CD_2_1 is horizontally aligned with device component area DCA_2 and vertically separated from device component area DCA_2 by vertical dot spacing VDS1. Color dot CD_2_1 is vertically aligned with color CD_1_1 and horizontally separated from color dot CD_1_1 by a horizontal dot spacing HDS1. Switching element SE_2 is coupled to the electrodes of color dot CD_2_1 to control the polarity of color dot CD_2_1. Color dot CD_2_1 includes an embedded polarity region EPR_2_1_1.

Third color component CC_3 of pixel design 410 has one color dots CD_3_1. Color dots CD_3_1 is horizontally aligned with device component area DCA_3 and vertically separated from device component area DCA_3 by vertical dot spacing VDS1. Color dot CD_3_1 is vertically aligned with color CD_2_1 and horizontally separated from color dot CD_2_1 by a horizontal dot spacing HDS1. Switching element SE_3 is coupled to the electrodes of color dot CD_3_1 to control the polarity of color dot CD_3_1. Color dot CD_3_1 includes an embedded polarity region EPR_3_1_1.

The polarities of the color dots, embedded polarity regions, and switching elements are shown using "+" and "−" signs. Thus, in FIG. 4(a), which shows the positive dot polarity pattern of pixel design 410+, switching elements SE_1 and SE_3; color dots CD_1_1 and CD_3_1, and embedded polarity region EPR_2_1_1 have positive polarity. However, switching element SE_2; color dot CD_2_1, and embedded polarity region2 EPR_1_1_1 and EPR_3_1_1 have negative polarity.

FIGS. 5(a) and 5(b) illustrate a color dot 500 in accordance with one embodiment of the present invention. Color dot 500 includes a square shaped electrode 510 with a square shaped embedded polarity region 512. FIG. 5(b) is a cross sectional view of color dot 500 along the A1-A1' cut of FIG. 5(a). As shown in FIG. 5(b), embedded polarity region 512 is created by an embedded electrode 516 underneath electrode 510. Embedded electrode 516 is separated from electrode 510 by a passivation layer 514. Embedded electrode 516 is electrified to generate an electric field through electrode 510. In most embodiments of the present invention electrode 510 and embedded electrode 516 have opposite polarity directions. For example, when electrode 510 has positive polarity, embedded electrode 516 would have a negative polarity. However, in some embodiments of the present invention embedded electrode is held at a common voltage V_com. The interaction of the electric field generated by electrode 510 and embedded electrode 516 creates lateral forces that can enhance MVA operation and also more quickly reorient liquid crystals to their proper position after a physical disturbance.

FIG. 5(c) illustrates another technique to create embedded polarity regions which can be combined with the embedded electrode. Specifically, in FIG. 5(c), a changed conductivity region 518 is created in electrode 510 within embedded polarity region 512. In one embodiment of the present invention, the changed conductivity regions are heavily doped to reduce the conductivity of the changed conductivity regions. In other embodiments of the present invention, the changed conductivity regions can be formed by etching portions of conductor 510 and filling the regions with a less conductive material, such as electroactive polymers (such as polyacetylene, polythiophene, polypyrrole (PPY), polyaniline (PANI), and polystyrene), silicon-germanium and aluminum gallium arsenide, or a non-conductive material, such as silicon dioxide. Due to the different conductivity in the changed conductivity regions, the electric fields in the embedded polarity regions differ from the electric fields around the rest of electrode 510.

In the embodiment of FIG. 5(c), changed conductivity region 518 is made non-conductive so that the electric field in embedded polarity region 512 is predominantly controlled by embedded electrode 516. The interaction of the electric field generated by electrode 510 and embedded electrode 516 creates lateral forces that can enhance MVA operation and also more quickly reorient liquid crystals to their proper position after a physical disturbance.

FIGS. 6(a)-6(b) illustrate portions of a color dot 600 in accordance with another embodiment of the present invention. Color dot 600 includes a square shaped electrode 610 with a square shaped embedded polarity region 612. However, electrode 610 does not extend into embedded polarity region 612. In the embodiment of FIG. 6(a), electrode 610 is etched to create a void in embedded polarity region 612. In other embodiments of the present invention, electrodes are formed with the voids.

FIG. 6(b) is a cross sectional view of color dot 600 along the A1-A1' cut of FIG. 6(a). As shown in FIG. 6(b), embedded polarity region 612 is created by an embedded electrode 616 underneath electrode 610. Embedded electrode 616 is separated from electrode 610 by a passivation layer 614. In the embodiment of FIG. 6(b) passivation layer 614 is etched to create a void in embedded polarity region 610. In other embodiments, of the present invention, passivation layer 614 does not include voids. Embedded electrode 616 is electrified to generate an electric field through the void in electrode 610. In most embodiments of the present invention electrode 610 and embedded electrode 616 have opposite polarity directions. For example, when electrode 610 has positive polarity, embedded electrode 616 would have a negative polarity. The interaction of the electric field generated by electrode 610 and embedded electrode 616 creates lateral forces that can enhance MVA operation and also more quickly reorient liquid crystals to their proper position after a physical disturbance.

As explained above, multiple domains can be created using intrinsic fringe fields. However, intrinsic fringe fields are only applicable on small color dots. Thus, for larger displays pixels are created with color components having many color dots. Each color component is controlled by a separate switching element such as a thin-film transistor (TFT). Generally, the color components are red, green, and blue. In accordance with the present invention, the color components of a pixel are further divided into color dots.

Figure 7B:
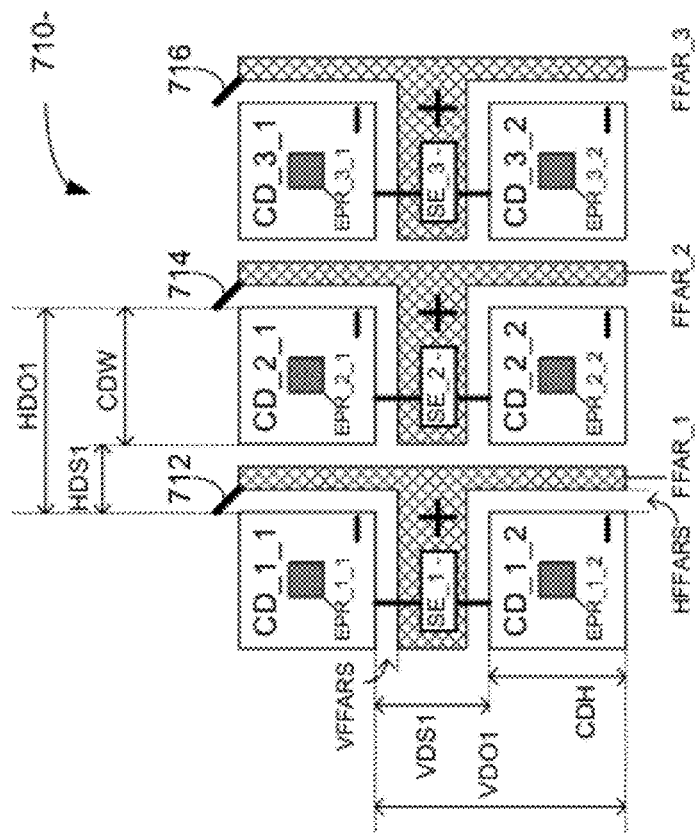
Figure 7A:
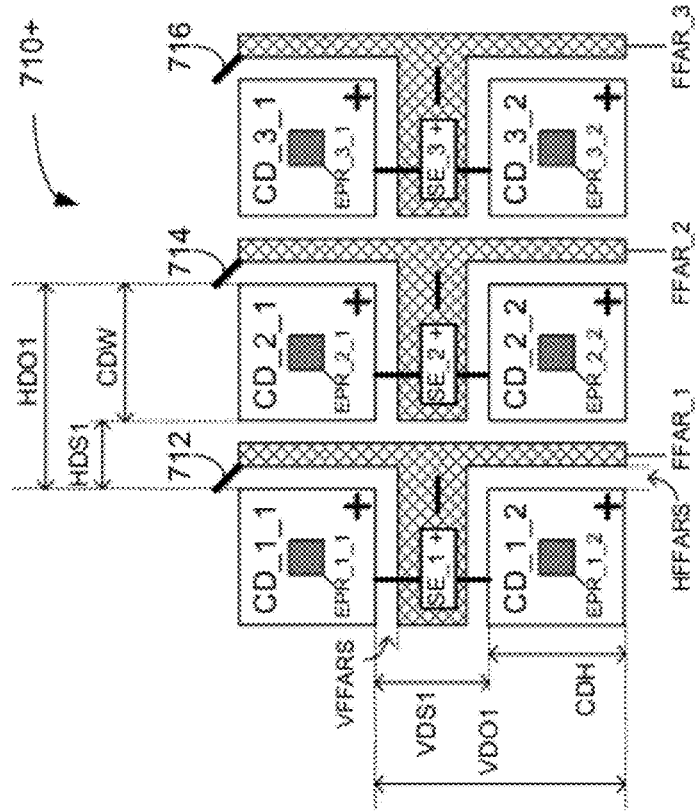

FIG. 7(a)-7(b) shows a pixel design having multiple color dots per color component that incorporate embedded polarity regions in accordance with the present invention. Specifically, FIGS. 7(a) and 7(b) show different dot polarity patterns of a pixel design 710 (labeled 710+ and 710− as described below) that is often used in displays having a switching element row inversion driving scheme. In actual operation a pixel will switch between a first dot polarity pattern and a second dot polarity pattern between each image frame. For clarity, the dot polarity pattern, in which the first color dot of the first color component has a positive polarity, is referred to as the positive dot polarity pattern. Conversely, the dot polarity pattern in which the first color dot of the first color component has a negative polarity is referred to as the negative dot polarity pattern. Specifically, in FIG. 7(a), pixel design 710 has a positive dot polarity pattern (and is thus labeled 710+) and in FIG. 7(b), pixel design 710 has a negative dot polarity pattern (and is thus labeled 710−). Furthermore, the polarity of each polarized component in the various pixel designs are indicated with "+" for positive polarity or "−" for negative polarity. However in some embodiments of the present invention, some conductors may be tied to common voltage V_com, which has a neutral polarity.

Pixel design 710 has three color components CC_1, CC_2 and CC_3 (not labeled in FIGS. 7(a)-7(b)). Each of the three color components includes two color dots. For clarity, the color dots are referenced as CD_X_Y, where X is a color component (from 1 to 3 in FIGS. 7(a)-7(b)) and Y is a dot number (from 1 to 2 in FIGS. 7(a)-7(b)). Pixel design 710 also includes a switching element for each color component (referenced as SE_1, SE_2, and SE_3) and a fringe field amplifying region for each color component (referenced as FFAR_1, FFAR_2, and FFAR_3). Switching elements SE_1, SE_2, and SE_3 are arranged in a row. Device component areas around each switching element are covered by the fringe field amplifying regions and are thus not specifically labeled in FIGS. 7(a) and 7(b). Fringe field amplifying regions FFAR_1, FFAR_2, and FFAR_3 are also arranged in a row and described in more detail in FIG. 7(c).

First color component CC_1 of pixel design 710 has two color dots CD_1_1 and CD_1_2. Color dots CD_1_1 and CD_1_2 form a column and are separated by a vertical dot pacing VDS1. In other words, color dots CD_1_1 and CD_1_2 are horizontally aligned and vertically separated by vertical dot spacing VDS1. Furthermore, color dots CD_1_1 and CD_1_2 are vertically offset by vertical dot offset VDO1 which is equal to vertical dot spacing VDS1 plus the color dot height CDH. Switching element SE_1 is located in between color dots CD_1_1 and CD_1_2 so that color dot CD_1_1 is on a first side of the row of switching elements and color dot CD_1_2 is on a second side of the row of switching elements. Switching element SE_1 is coupled to the electrodes of color dots CD_1_1 and CD_1_2 to control the voltage polarity and voltage magnitude of color dots CD_1_1 and CD_1_2.

Each color dot of color component CD_1_1 includes an embedded polarity region which would minimize any touch mura effects in the color dot. Specifically, color dots CD_1_1 and CD_1_2 include embedded polarity regions EPR_1_1 and EPR_1_2, respectively. As shown in FIG. 7(a), embedded polarity regions EPR_1_1 and EPR_1_2 are centered within color dots CD_1_1 and CD_1_2, respectively. In pixel design 710, the embedded conductor technique shown in FIGS. 6(a)-6(b) is used to form embedded polarity regions. However to reduce the complexity of the Figures, the embedded polarity region is illustrated as in FIG. 5(a) with a shaded square. However, other embodiments of the present invention can use other techniques to form embedded polarity regions, can include multiple embedded polarity regions, or can offset the embedded polarity region.

Figure 7D:
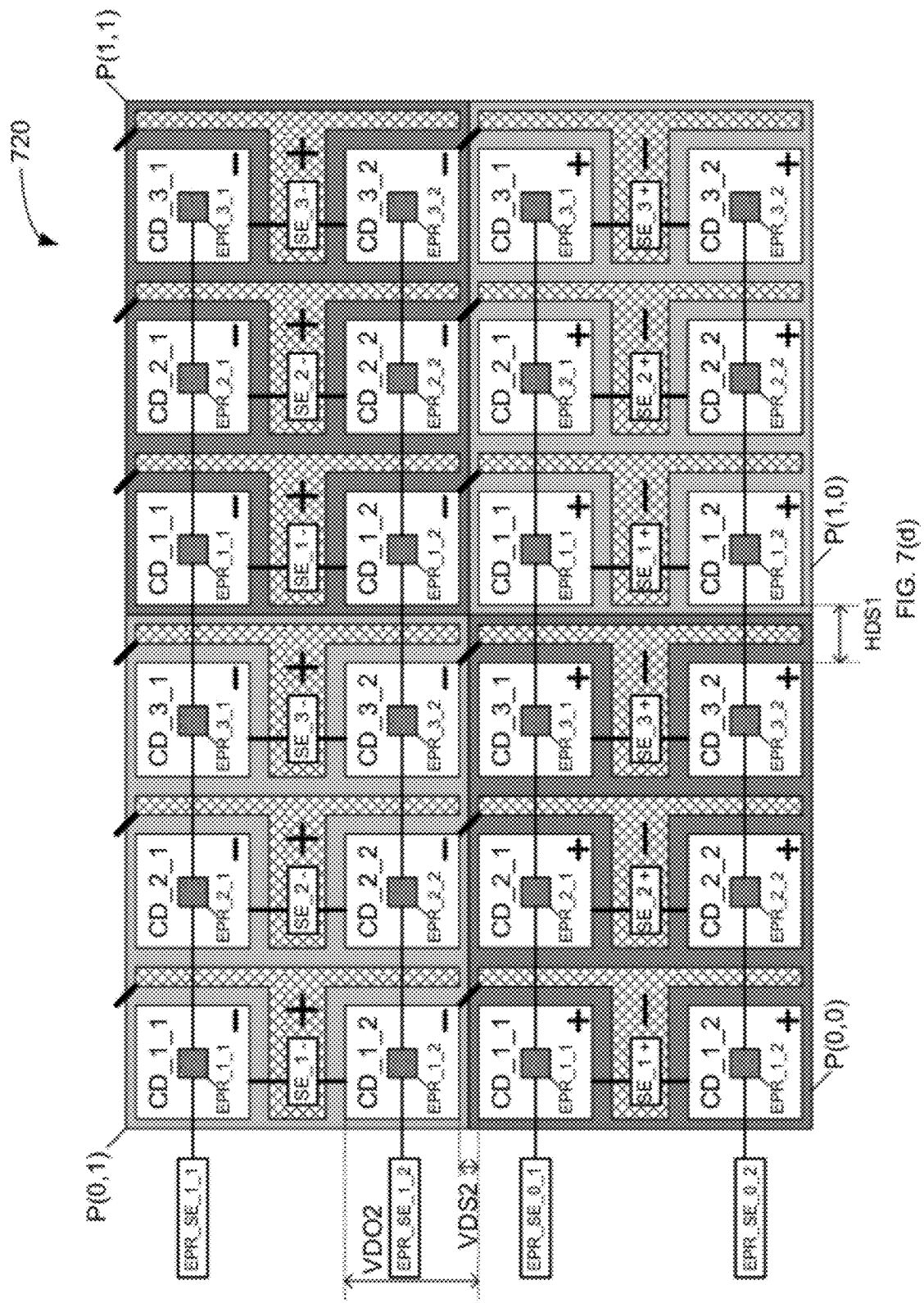
FIG. 7(d) illustrates a portion of a display in accordance with one embodiment of the present invention.

As explained above, the polarity of the embedded polarity region differs from that of the color dot. Thus, the polarity of the embedded polarity regions EPR_1_1 and EPR_1_2 are controlled by a polarity source different from switching element SE_1 (which controls the polarity of color dots CD_1_1 and CD_1_2). In some embodiments of the present invention, a display includes dedicated embedded-polarity-region switching elements to control the polarity of the embedded polarity regions (See FIG. 7(d) for one such embodiment). Other embodiments of the present invention, may couple the embedded polarity regions to other elements of the pixel that have a differing polarity. For example, in some embodiments of the present invention, embedded polarity regions EPR_1_1 and EPR_1_2 are coupled to fringe field amplifying region FFAR_1, which is described below.

Similarly, second color component CC_2 of pixel design 710 has two color dots CD_2_1 and CD_2_2. Color dots CD_2_1 and CD_2_2 form a second column and are separated by a vertical dot spacing VDS1. Thus, color dots CD_2_1 and CD_2_2 are horizontally aligned and vertically separated by vertical dot spacing VDS1. Switching element SE_2 is located in between color dots CD_2_1 and CD_2_2 so that color dot CD_2_1 is on the first side of the row of switching elements and color dot CD_2_2 is on a second side of the row of switching elements. Switching element SE_2 is coupled to the electrodes of color dots CD_2_1 and CD_2_2 to control the voltage polarity and voltage magnitude of color dots CD_2_1 and CD_2_2. Second color component CC_2 is vertically aligned with first color component CC_1 and separated from color component CC_1 by a horizontal dot spacing HDS1, thus color components CC_2 and CC_1 are horizontally offset by a horizontal dot offset HDO1, which is equal to horizontal dot spacing HDS1 plus the color dot width CDW. Specifically with regards to the color dots, color dot CD_2_1 is vertically aligned with color dots CD_1_1 and horizontally separated by horizontal dot spacing HDS1. Similarly, color dot CD_2_2 is vertically aligned with color dots CD_2_1 and horizontally separated by horizontal dot spacing HDS1. Thus color dot CD_1_1 and color dot CD_2_1 form a first row of color dots and color dot CD_1_2 and color dot CD_2_2 form a second row of color dots. Like color dots CD_1_1 and CD_1_2, Color dots CD_2_1 and CD_2_2 include embedded polarity regions EPR_2_1 and EPR_2_2, respectively.

Similarly, third color component CC_3 of pixel design 710 has two color dots CD_3_1 and CD_3_2. Color dots CD_3_1 and CD_3_2 form a third column and are separated by a vertical dot spacing VDS1. Thus, color dots CD_3_1 and CD_3_2 are horizontally aligned and vertically separated by vertical dot spacing VDS1. Switching element SE_3 is located in between color dots CD_3_1 and CD_3_2 so that color dot CD_3_1 is on the first side of the row of switching elements and color dot CD_3_2 is on a second side of the row of switching elements. Switching element SE_3 is coupled to the electrodes of color dots CD_3_1 and CD_3_2 to control the voltage polarity and voltage magnitude of color dots CD_3_1 and CD_3_2. Third color component CC_3 is vertically aligned with second color component CC_2 and separated from color component CC_2 by horizontal dot spacing HDS1, thus color components CC_3 and CC_2 are horizontally offset by a horizontal dot offset HDO1. Specifically with regards to the color dots, color dot CD_3_1 is vertically aligned with color dots CD_2_1 and horizontally separated by horizontal dot spacing HDS1. Similarly, color dot CD_3_2 is vertically aligned with color dots CD_2_2 and horizontally separated by horizontal dot spacing HDS1. Thus color dot CD_3_1 is on the first row of color dots and color dot CD_3_2 is on the second row of color dots. Like color dots CD_1_1 and CD_1_2, Color dots CD_3_1 and CD_3_2 include embedded polarity regions EPR_3_1 and EPR_3_2, respectively.

For clarity, the color dots of pixel design 710 are illustrated with color dots having the same color dot height CDH. However, some embodiments of the present invention may have color dots with different color dot heights. For example in one embodiment of the present invention that is a variant of pixel design 710, color dots CD_1_1, CD_2_1 and CD_3_1 have a smaller color dot height than color dots CD_1_2, CD_2_2, and CD_3_2. Furthermore, in many embodiments of the present invention color dots can have different shapes.

Pixel design 710 also includes fringe field amplifying regions FFAR_1, FFAR_2, and FFAR_3. FIG. 7(c) shows a more detailed view of fringe field amplifying region FFAR_1 of pixel design 710. For clarity fringe field amplifying regions FFAR_1 is conceptually divided into a vertical amplifying portion VAP and a horizontal amplifying portion HAP. In FIG. 7(c) horizontal amplifying portion HAP is vertically centered on and extends to the left of vertical amplifying portion VAP. Use of horizontal amplifying portions and vertical amplifying portions allows clearer description of the placement of fringe field amplifying region FFAR1. In most embodiments of the present invention, the electrodes of the fringe field amplifying regions are formed by one contiguous conductor. Horizontal amplifying portion HAP has a horizontal amplifying portion width HAP_W and a horizontal amplifying portion height HAP_H. Similarly, vertical amplifying portion VAP has a vertical amplifying portion width VAP_W and a vertical amplifying portion height VAP_H. Fringe field amplifying regions FFAR_2 and FFAR_3 have the same shape as fringe field amplifying region FFAR_1. In embodiments of the present invention having different sized color dots, horizontal amplifying region HAP would be located in between the color dots rather than centered on vertical amplifying portion VAP.

As shown in FIG. 7(a), fringe field amplifying regions FFAR_1, FFAR_2, and FFAR_3 are placed in between the color dots of pixel design 710. Specifically, fringe field amplifying region FFAR_1 is placed so that the horizontal amplifying portion of fringe field amplifying region FFAR_1 lies in between color dots CD_1_1 and CD_1_2 and is separated from color dots CD_1_1 and CD_1_2 by a vertical fringe field amplifying region spacing VFFARS. The vertical amplifying portion of fringe field amplifying region FFAR_1 is placed to the right of color dots CD_1_1 and CD_1_2 and is separated from color dots CD_1_1 and CD_1_2 by a horizontal fringe field amplifying region spacing HFFARS. Thus, fringe field amplifying region FFAR_1 extends along the bottom and the right side of color dot CD_1_1 and along the top and right side of color dot CD_1_2. Furthermore, this placement also causes the vertical amplifying portion of fringe field amplifying region FFAR_1 to be in between color dots CD_1_1 and CD_2_1 and in between color dots CD_1_2 and CD_2_2.

Similarly, fringe field amplifying region FFAR_2 is placed so that the horizontal amplifying portion of fringe field amplifying region FFAR_2 lies in between color dots CD_2_1 and CD_2_2 and is separated from color dots CD_2_1 and CD_2_2 by a vertical fringe field amplifying region spacing VFFARS. The vertical amplifying portion of fringe field amplifying region FFAR_2 is placed to the right of color dots CD_2_1 and CD_2_2 and is separated from color dots CD_2_1 and CD_2_2 by a horizontal fringe field amplifying region spacing HFFARS. Thus, fringe field amplifying region FFAR_1 extends along the bottom and the right side of color dot CD_2_1 and along the top and right side of color dot CD_2_2. This placement also causes the vertical amplifying portion of fringe field amplifying region FFAR_2 to be in between color dots CD_2_1 and CD_3_1 and in between color dots CD_2_2 and CD_3_2.

Fringe field amplifying region FFAR_3 is placed so that the horizontal amplifying portion of fringe field amplifying region FFAR_3 lies in between color dots CD_3_1 and CD_3_2 and is separated from color dots CD_3_1 and CD_3_2 by a vertical fringe field amplifying region spacing VFFARS. The vertical amplifying portion of fringe field amplifying region FFAR_3 is placed to the right of color dots CD_3_1 and CD_3_2 and is separated from color dots CD_3_1 and CD_3_2 by a horizontal fringe field amplifying region spacing HFFARS. Thus, fringe field amplifying region FFAR_3 extends along the bottom and the right side of color dot CD_3_1 and along the top and right side of color dot CD_3_2.

The polarities of the color dots, fringe field amplifying regions, and switching elements are shown using "+" and "−" signs. Thus, in FIG. 7(a), which shows the positive dot polarity pattern of pixel design 710+, all the switching elements (i.e. switching elements SE_1, SE_2, and SE_3); all the color dots (i.e. color dots CD_1_1, CD_1_2, CD_2_1, CD_2_2, CD_3_1, and 3_2) have positive polarity. However, all the fringe field amplifying regions (i.e. fringe field amplifying regions FFAR_1, FFAR_2, and FFAR_3) have negative polarity. As explained above, embedded polarity regions may have the same direction of polarity (i.e. positive or negative) as the color dot but have a different magnitude of polarity. Alternatively, embedded polarity regions may have different polarity (i.e. "direction of polarity") than the color dot (e.g. positive polarity for color dot polarity with negative polarity for embedded polarity regions). In addition, embedded polarity regions can have neutral polarity. In a particular embodiment of the present invention, the embedded polarity regions of pixel design 710 have different polarity than the color dots. Thus for this embodiment, embedded polarity regions EPR_1_1, EPR_1_2, EPR_2_1, EPR_2_2, EPR_3_1, and EPR_3_2 would have negative polarity in FIG. 7(a).

FIG. 7(b) shows pixel design 710 with the negative dot polarity pattern. For the negative dot polarity pattern, all the switching elements (i.e. switching elements SE_1, SE_2, and SE_3) and all the color dots (i.e. color dots CD_1_1, CD_1_2, CD_2_1, CD_2_2, CD_3_1, and 3_2) have negative polarity. However, all the fringe field amplifying regions (i.e. fringe field amplifying regions FFAR_1, FFAR_2, and FFAR_3) have positive polarity. In the particular embodiment of the present invention in which the embedded polarity regions of pixel design 710 has different polarity than the color dots, embedded polarity regions EPR_1_1, EPR_1_2, EPR_2_1, EPR_2_2, EPR_3_1, and EPR_3_2 would have positive polarity in FIG. 7(b).

Fringe fields in each of the color dots are amplified if adjacent components have opposite polarities. Pixel design 710 makes use of the fringe field amplifying regions to enhance and stabilize the formation of multiple domain in the liquid crystal structure. In general, the polarities of the polarized components are assigned so that a color dot of a first polarity has neighboring polarized components of the second polarity. For example for the positive dot polarity pattern of pixel design 710 (FIG. 7(*a*)), color dot CD_2_2 has positive polarity. However the neighboring polarized components (fringe field amplifying regions FFAR_2 and FFAR_1) have negative polarity. Thus, the fringe field of color dot CD_2_2 is amplified. Furthermore, as explained below, the polarity reversing scheme is carried out at the display level as well so that the color dot of another pixel that is placed next to color dot CD_1_2 would have negative polarity (see FIG. 7(*d*)).

Because, all the switching elements in pixel design 710 have the same polarity and the fringe field amplifying regions require the opposite polarity, the fringe field amplifying regions are driven by an external polarity source, i.e. a polarity source from outside the specific pixel of pixel design 710. Various sources of opposite polarity can be used in accordance with differing embodiments of the present invention. For example specific fringe field amplifying region switching elements may be used or switching elements of nearby pixels having an opposite dot polarity could also used to drive the fringe field amplifying regions. In the embodiments of FIGS. 7(*a*)-7(*b*), switching elements of nearby pixels having an opposite dot polarity could also used to drive the fringe field amplifying regions. Therefore, pixel design 710 includes conductor to facilitate coupling the fringe field amplifying regions to switching elements in other pixels. Specifically, a conductor 712 of a current pixel would couple the electrode of fringe field amplifying region FFAR_1 to switching element SE_1 (see FIGS. 7(*d*) and 7(*e*)) of a pixel above the current pixel. The connection to the switching element would be via the electrodes of the color dots of the pixel above the current pixel. Similarly, a conductor 714 of a current pixel would couple the electrode of fringe field amplifying region FFAR_2 to switching element SE_2 (see FIG. 7(*d*)) of a pixel above the current pixel. The connection to the switching element would be via the electrodes of the color dots of the pixel above the current pixel. A conductor 716 of a current pixel would couple the electrode of fringe field amplifying region FFAR_3 to switching element SE_3 (see FIGS. 7(*d*) and 7(*e*)) of a pixel above the current pixel. The connection to the switching element would be via the electrodes of the color dots of the pixel above the current pixel.

These connections are better shown in FIG. 7(*d*), which shows a portion of display 720 using pixels P(0, 0), P(1, 0), P(0, 1), and P(1, 1) of pixel design 710 with a switching element row inversion driving scheme. Display 720 could have thousands of rows with thousand of pixels on each row. The rows and columns would continue from the portion shown in FIG. 7(*d*) in the manner shown in FIG. 7(*d*). For clarity, the gate lines and source lines that control the switching elements are omitted in FIG. 7(*d*). Furthermore, to better illustrate each pixel, the area of each pixel is shaded; this shading is only for illustrative purposes in FIG. 7(*d*) and has no functional significance. The pixels of display 720 are arranged so that all pixels in a row have the same dot polarity pattern (positive or negative) and each successive row should alternate between positive and negative dot polarity pattern. Thus, pixels P(0, 0) and P(1, 0) in the first row (i.e. row 0) have positive dot polarity pattern and pixels P(0, 1) and P(1, 1) in the second row (i.e. row 1) have the negative dot polarity pattern. However, at the next frame the pixels will switch dot polarity patterns. Thus in general a pixel P(x, y) has a first dot polarity pattern when y is even and a second dot polarity pattern when y is odd. Internal conductors 712, 714, and 716 in pixel design 710, provide polarity to the fringe field amplifying regions. Specifically, fringe field amplifying regions of a first pixel receive voltage polarity and voltage magnitude from a second pixel. Specifically, the second pixel is the pixel above the first pixel. For example, the electrodes of fringe field amplifying region FFAR_1 of pixel P(0, 0) is coupled to switching elements SE_1 of pixel P(0, 1) via the electrodes of color dots CD_1_2 of pixel P(0, 1). Similarly, the electrodes of fringe field amplifying regions FFAR_2 and FFAR_3 of pixel P(0, 0) are coupled to switching elements SE_2, and SE_3 of pixel P(0, 1) via color dots CD_2_2, and CD_3_2 of pixel P(0, 1), respectively.

Display 720 also includes embedded-polarity-region switching elements EPR_SE_X_Y, for each row of embedded polarity regions. In FIG. 7(*d*), "X" represents the row number of the pixel, and "Y" represents the row number of embedded polarity regions within a pixel. Thus, embedded-polarity-region switching elements EPR_SE_0_1 and EPR_SE_0_2 are used for the pixels in row 0 (i.e. pixel P(0, 0) and pixel P(1, 0)). Specifically, embedded-polarity-region switching element EPR_SE_0_1 is coupled to embedded polarity regions EPR_1_1, EPR_2_1, and EPR_3_1 of pixel P(0, 0) and to embedded polarity regions EPR_1_1, EPR_2_1, and EPR_3_1 of pixel P(1, 0). Embedded-polarity-region switching element EPR_SE_0_2 is coupled to embedded polarity regions EPR_1_2, EPR_2_2, and EPR_3_2 of pixel P(0, 0) and to embedded polarity regions EPR_1_2, EPR_2_2, and EPR_3_2 of pixel P(1, 0). Likewise, embedded-polarity-region switching elements EPR_SE_1_1 and EPR_SE_1_2 are used for the pixels in row 1 (i.e. pixel P(0, 1) and pixel P(1, 1)). Specifically, embedded-polarity-region switching element EPR_SE_1_1 is coupled to embedded polarity regions EPR_1_1, EPR_2_1, and EPR_3_1 of pixel P(0, 1) and to embedded polarity regions EPR_1_1, EPR_2_1, and EPR_3_1 of pixel P(1, 1). Embedded-polarity-region switching element EPR_SE_1_2 is coupled to embedded polarity regions EPR_1_2, EPR_2_2, and EPR_3_2 of pixel P(0, 1) and to embedded polarity regions EPR_1_2, EPR_2_2, and EPR_3_2 of pixel P(1, 1). Generally, an embedded-polarity-region switching element would have different polarity as compared to the switching elements in the pixel corresponding to the embedded-polarity-region switching element. Thus, in FIG. 7(*d*), embedded-polarity-region switching elements EPR_SE_0_1 and EPR_SE_0_2 would have negative polarity. Conversely, embedded-polarity-region switching elements EPR_SE_1_1 and EPR_SE_1_2 would have positive polarity. In some embodiments of the present invention, the embedded-polarity-region switching elements would be placed in a more balanced manner. For example, in a particular embodiment of the present invention, half of the embedded-polarity-region switching elements are placed on the right side of the display and half of the embedded-polarity-region switching elements are placed on the left side of the display. In some embodiments of the present invention, the number of embedded-polarity-region switching elements can be reduced by using a single embedded polarity-region switching element for each row of pixels. Specifically, embedded-polarity-region switching elements EPR_SE_0_1 and EPR_SE_0_2 are reduce to one as embedded-polarity-region switching element EPR_SE_0, which is used for the pixels in row 0 (i.e. pixel P(0, 0) and pixel P(1, 0)). Embedded-polarity-region switching element EPR_SE_0 is coupled to embedded polarity regions EPR_1_1, EPR_2_1, EPR_3_1, EPR_1_2, EPR_2_2, and EPR_3_2 of pixel P(0, 0) and to embedded polarity regions EPR_1_1, EPR_2_1, EPR_3_1, EPR_1_2, EPR_2_2, and EPR_3_2 of pixel P(1, 0). Furthermore, embedded-polarity-region switching elements EPR_SE_1_1 and EPR_SE_1_2 are reduce to one as embedded-polarity-region switching element EPR_SE_1, which is used for the pixels in row 1 (i.e. pixel P(0, 0) and pixel P(1, 1)). Embedded-polarity-region switching element EPR_SE_1 is coupled to embedded polarity regions EPR_1_1, EPR_2_1, EPR_3_1, EPR_1_2, EPR_2_2, and EPR_3_2 of pixel P(0, 1) and to embedded polarity regions EPR_1_1, EPR_2_1, EPR_3_1, EPR_1_2, EPR_2_2, and EPR_3_2 of pixel P(1, 1).

Due to the switching of polarities on each row in display 720, if a color dot has the first polarity, any neighboring polarized components and embedded polarity regions would have the second polarity. For example, color dot CD_3_2 of pixel P(0, 1) has negative polarity while, embedded polarity region EPR_3_2 of pixel P(0, 1), color dot CD_3_1 of pixel P(0, 0), fringe field amplifying regions FFAR_2 and FFAR_3 of pixel P(0, 1) have positive polarity. In a particular embodiment of the present invention, each color dot has a width of 40 micrometers and a height of 60 micrometers. Each embedded polarity region has a width of 6 micrometers and a height of 6 micrometers Each fringe field amplifying region has a vertical amplifying portion width of 5 micrometers, a vertical amplifying portion height of 145 micrometers, a horizontal amplifying portion width of 50 micrometers, a horizontal amplifying height of 5 micrometers. Horizontal dot spacing HDS1 is 15 micrometers, vertical dot spacing VDS1 is 25 micrometers, horizontal fringe field amplifying spacing HFFARS is 5 micrometers, and vertical fringe field amplifying spacing VFFARS is 5 micrometers.

Figure 7E:
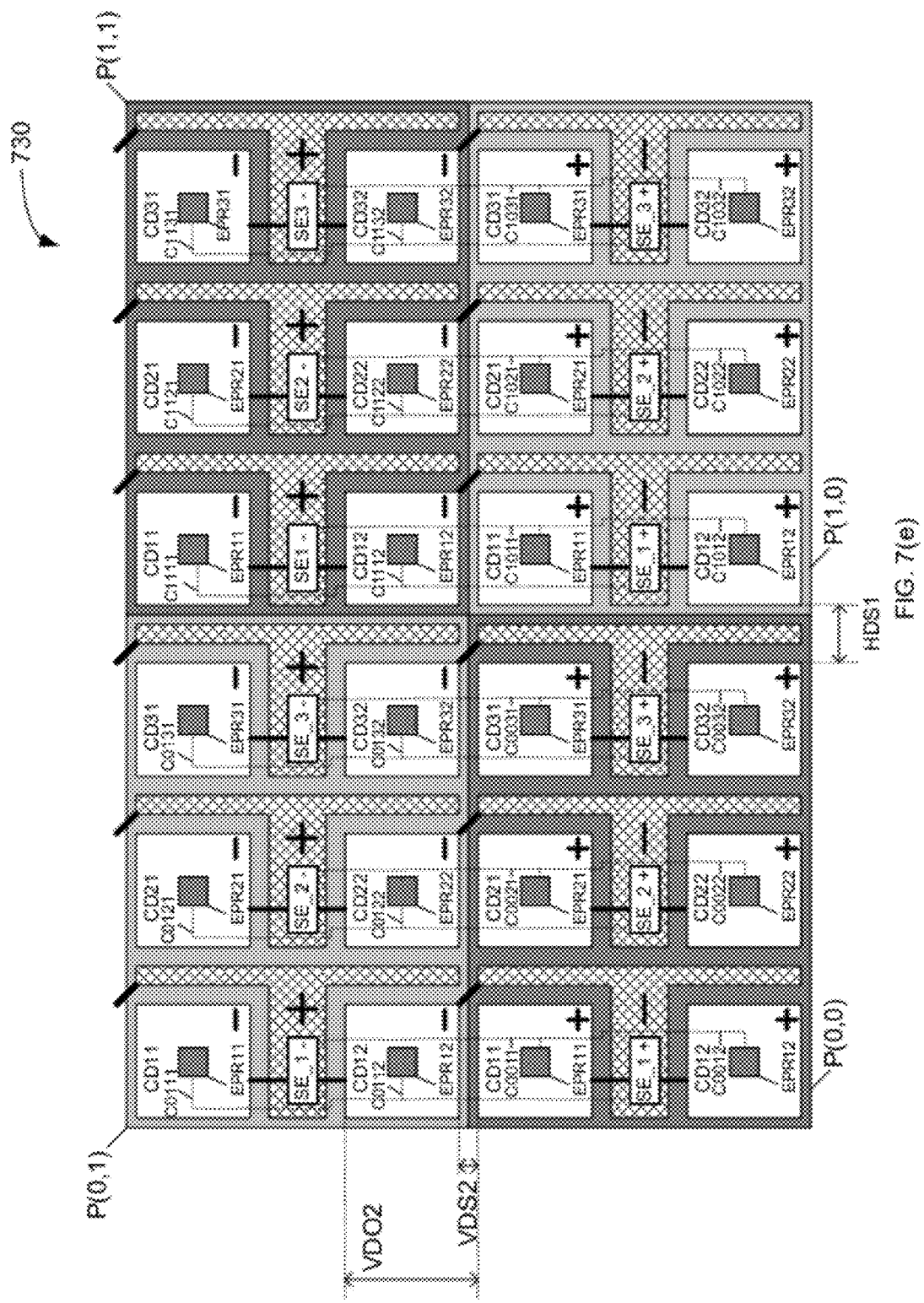
FIG. 7(e) illustrates a portion of a display in accordance with one embodiment of the present invention.

In another embodiment of the present invention, embedded polarity regions are polarized using switching elements of nearby pixels rather than having dedicated embedded polarity switching elements. FIG. 7(e) shows a portion of a display 730 using pixels P(0, 0), P(1, 0), P(0, 1), and P(1, 1) of pixel design 710 with a switching element row inversion driving scheme. Display 730 could have thousands of rows with thousand of pixels on each row. The rows and columns would continue from the portion shown in FIG. 7(e) in the manner shown in FIG. 7(e). For clarity, the gate lines and source lines that control the switching elements are omitted in FIG. 7(e). Furthermore, to better illustrate each pixel, the area of each pixel is shaded; this shading is only for illustrative purposes in FIG. 7(e) and has no functional significance. Due to space limitations color dots are labeled as CDXY as opposed to CD_X_Y and embedded polarity regions are labeled as EPRXY as opposed to EPR_X_Y.

Because display 730 and display 720 are very similar only the differences are described in detail. For example, the pixels of display 730 are arranged in the same manner as the pixels of display 720. Furthermore, the polarity of the color dots, switching elements and fringe field amplifying regions are the same. Thus like in display 720, a pixel P(x, y) in display 730 also has a first dot polarity pattern when y is even and a second dot polarity pattern when y is odd. The primary difference between display 720 and display 730 is that the polarity for the embedded polarized regions in display 730 is provided from the switching elements of nearby pixels rather than from dedicated embedded polarity switching elements which were used in display 720.

In display 730, a first pixel is paired with a second pixel, so that the embedded polarity regions of the first pixel is coupled to the switching element of the second pixel and the embedded polarity regions of the second pixel is coupled to the switching elements of the first pixel. Specifically, pixels on even numbered rows are paired with the pixel in the odd numbered row above the even numbered row. Thus in FIG. 7(e), pixel P(0, 0) is paired with Pixel P(0, 1) and pixel P(1, 0) is paired with pixel P(1, 1). In general, a pixel P(X, Y) is paired with a pixel P(X, Y+1) if Y is even. Conversely, a pixel P(x, Y) is paired with pixel P(X, Y−1) if Y is odd.

As illustrated in FIG. 7(e), in display 730 each embedded polarity regions is coupled to a switching element of paired pixel by a conductor C_I_J_X_Y (labeled with CIJXY in FIG. 7(e) due to space constraints), where I, J denotes the pixel (e.g. pixel P(I, J) containing the embedded polarity region, X is the color component, and Y denotes the color dot (e.g. color dot CD_X_Y (shortened in FIG. 7(e) as CDXY)) within the pixel. For example, conductor C0112 couples embedded polarity region EPR12 of pixel P(0, 1) to switching element SE_1 of pixel P(0, 0). The conductors for the embedded polarity regions are shown with dashed lines to indicate that the conductors are in a different plane from the color dots. Typically, the color dots are formed with ITO in a first plane and the conductors are formed with a metal layer in a second plane.

As explained above in pixels on odd numbered rows, embedded polarity elements of a first pixel are coupled to switching elements of the pixel below the first pixel. For example, embedded polarity region EPR_2_2 (labeled EPR22 in FIG. 7(e)) of pixel P(0, 1) is coupled to switching element SE_2 of pixel P(0, 0) by conductor C_0_1_2_2 (labeled C0122 in FIG. 7(e)). Similarly, embedded polarity region EPR_2_1 (labeled EPR21 in FIG. 7(e)) of pixel P(0, 1) is coupled to switching element SE_2 of pixel P(0, 0) by conductor C_0_1_2_1 (labeled C0121 in FIG. 7(e)). In general, a conductor C_I_J_X_Y, couples embedded polarity region EPR_X_Y of a pixel P(I, J) to switching element SE_X of pixel P(I, J−1), when J is an odd number.

In pixels on even numbered rows, embedded polarity elements of a first pixel are coupled to switching elements of the pixel above the first pixel. For example, embedded polarity region EPR_2_2 (labeled EPR22 in FIG. 7(e)) of pixel P(0, 0) is coupled to switching element SE_2 of pixel P(0, 1) by conductor C_0_0_2_2 (labeled C0022 in FIG. 7(e)). Similarly, embedded polarity region EPR_2_1 (labeled EPR21 in FIG. 7(e)) of pixel P(0, 0) is coupled to switching element SE_2 of pixel P(0, 1) by conductor C_0_0_2_1 (labeled C0021 in FIG. 7(e)). In general, a conductor C_I_J_X_Y, couples embedded polarity region EPR_X_Y of a pixel P(I, J) to switching element SE_X of pixel P(I, J+1), when J is an even number.

As explained above adjacent row of pixels have opposite polarity in display 730. Thus, providing polarity from switching elements in pixels from adjacent rows to embedded polarity regions as described above causes the polarity of the embedded polarity regions to be different from the polarity of the color dot. This differing polarity serves to enhance the fringe field in the color dots, thus enhance the MVA operation and reduce the touch mura effect in display 730.

FIG. 7(f) shows another embodiment of the present invention in which the embedded polarity regions receive polarity from the fringe field amplifying region. Specifically, FIG. 7(f) shows a portion of a display 740 using pixels P(0, 0), P(1, 0), P(0, 1), and P(1, 1) of pixel design 710 with a switching element row inversion driving scheme. Display 740 could have thousands of rows with thousand of pixels on each row. The rows and columns would continue from the portion shown in FIG. 7(f) in the manner shown in FIG. 7(f). For clarity, the gate lines and source lines that control the switching elements are omitted in FIG. 7(f). Furthermore, to better illustrate each pixel, the area of each pixel is shaded;

this shading is only for illustrative purposes in FIG. 7(f) and has no functional significance. Due to space limitations color dots are labeled as CDXY as opposed to CD_X_Y and embedded polarity regions are labeled as EPRXY as opposed to EPR_X_Y.

Because display 740 and display 720 are very similar only the differences are described in detail. For example, the pixels of display 740 are arranged in the same manner as the pixels of display 720. Furthermore, the polarity of the color dots, switching elements and fringe field amplifying regions are the same. Thus like in display 720, a pixel P(x, y) in display 740 also has a first dot polarity pattern when y is even and a second dot polarity pattern when y is odd. The primary difference between display 720 and display 740 is that the polarity for the embedded polarized regions in display 740 is provided from the fringe field amplifying regions rather than from dedicated embedded polarity switching elements which were used in display 720.

Specifically, as illustrated in FIG. 7(f), in display 740 each embedded polarity regions is coupled to the nearest fringe fiend amplifying region. Specifically, an embedded polarity region EPR_X_Y of a pixel P(I, J) is coupled to fringe field amplifying region FFAR_X by a conductor C_I_J_X_Y (labeled with CIJXY in FIG. 7(f) due to space constraints), where I, J denotes the pixel (e.g. pixel P(I, J), X is the color component, Y denotes the color dot (e.g. color dot CD_X_Y (shortened in FIG. 7(f) as CDXY)) within the pixel. For example, conductor C0112 couples embedded polarity region EPR12 of pixel P(0, 1) to fringe field amplifying region FFAR_1 (not specifically labeled FIG. 7(f)) of pixel P(0, 1). The conductors for the embedded polarity regions are shown with dashed lines to indicate that the conductors are in a different plane from the color dots. Typically, the color dots and fringe field amplifying regions are formed with ITO in a first plane and the conductors are formed with a metal layer in a second plane. Thus, a via (labeled V) is used to connect the fringe field amplifying regions to the conductors. In FIG. 7(f) the fringe field amplifying regions are coupled to a switching element of a neighboring pixel as explained above with respect to FIG. 7(d). However, in other embodiments of the present invention the fringe field amplifying regions may receive polarity using other methods, such as dedicated fringe field amplifying region switching elements.

As explained above the fringe field amplifying regions have an opposite polarity as compared to the color dots. Thus, providing polarity from the fringe field amplifying regions to the embedded polarity regions causes the polarity of the embedded polarity regions to be different from the polarity of the color dot. This differing polarity serves to enhance the fringe field in the color dots, thus enhance the MVA operation and reduce the touch mura effect in display 730.

As explained above, in many applications a higher pixel density is desirable. Pixels are smaller in a higher pixel density display. The optical transmission is proportional to the aperture ratio which is the ratio of the total areas of color dots to the area of color component. In general, the aperture ratio is smaller in a higher pixel density display. There is also a need to increase the aperture ratio in a normal pixel density to enlarge the brightness of the display. Thus, in some embodiments of the present invention, a high aperture ratio is achieved by combining the embedded electrode and the fringe fiend amplifier FIGS. 8(a)-8(b) shows a pixel design having multiple color dots per color component that incorporate embedded polarity regions and an embedded fringe field amplifier in accordance with some embodiments of the present invention. Specifically, FIGS. 8(a) and 8(b) show different dot polarity patterns of a pixel design 810 (labeled 810+ and 810− as described below) that is often used in displays having a switching element row inversion driving scheme. In actual operation a pixel will switch between a first dot polarity pattern and a second dot polarity pattern between each image frame.

Like pixel design 710, pixel design 810 has three color components CC_1, CC_2 and CC_3 (not labeled in FIGS. 8(a)-8(b)). Each of the three color components includes two color dots. Pixel design 810 also includes a switching element for each color component (referenced as SE_1, SE_2, and SE_3) and an embedded fringe field amplifier EFFA_1. Switching elements SE_1, SE_2, and SE_3 are arranged in a row. The color dots, embedded polarity regions, and switching elements of pixel design 810 are very similar to pixel design 710. However as described below the formation of the embedded polarity regions differs in pixel design 810 and 710. Furthermore, the color components are placed closer together because the fringe field amplifying regions in pixel design 710 are not used in pixel design 810.

First color component CC_1 of pixel design 810 has two color dots CD_1_1 and CD_1_2. Color dots CD_1_1 and CD_1_2 form a column and are separated by a vertical dot pacing VDS1. In other words, color dots CD_1_1 and CD_1_2 are horizontally aligned and vertically separated by vertical dot spacing VDS1. Furthermore, color dots CD_1_1 and CD_1_2 are vertically offset by vertical dot offset VDO1 which is equal to vertical dot spacing VDS1 plus the color dot height CDH. Switching element SE_1 is located in between color dots CD_1_1 and CD_1_2 so that color dot CD_1_1 is on a first side of the row of switching elements and color dot CD_1_2 is on a second side of the row of switching elements. Switching element SE_1 is coupled to the electrodes of color dots CD_1_1 and CD_1_2 to control the voltage polarity and voltage magnitude of color dots CD_1_1 and CD_1_2.

Each color dot of color component CD_1_1 includes an embedded polarity region which would enhance the fringe field, thus enhance the MVA operation and minimize any touch mura effects in the color dot. Specifically, color dots CD_1_1 and CD_1_2 include embedded polarity regions EPR_1_1 and EPR_1_2, respectively. As shown in FIG. 8(a), embedded polarity regions EPR_1_1 and EPR_1_2 are centered within color dots CD_1_1 and CD_1_2, respectively. In pixel design 810, the embedded conductor technique shown in FIGS. 6(a)-6(b) is expanded and combined with the fringe field amplifying region used in pixel design 710 (FIGS. 7(a)-7(b)). Specifically, an embedded fringe field amplifier EFFA_1 is used for the entire pixel in pixel design 810. Embedded fringe field amplifier EFFA_1 is described below.

For clarity, the relative positions of the various parts of a pixel design are described from the perspective of a user viewing a display that is being held in a vertical position. Thus for example, in FIG. 8(a), color dot CD_1_1 is described as being above switching element SE_1 and color dot CD_1_2 is described as being below switching element SE_1. Color dot CD_1_1 to the left of color dot CD_2_1, conversely, color dot CD_3_1 is to the right of color dot CD_2_1. Furthermore, embedded fringe field amplifiers are described as being behind the color dots. Conversely, the color dots are described as being in front of the embedded fringe field amplifiers.

Second color component CC_2 of pixel design 810 has two color dots CD_2_1 and CD_2_2. Color dots CD_2_1 and CD_2_2 form a second column and are separated by a vertical dot spacing VDS1. Thus, color dots CD_2_1 and CD_2_2 are horizontally aligned and vertically separated by vertical dot spacing VDS1. Switching element SE_2 is located in between color dots CD_2_1 and CD_2_2 so that color dot CD_2_1 is on the first side of the row of switching elements and color dot CD_2_2 is on a second side of the row of switching elements. Switching element SE_2 is coupled to the electrodes of color dots CD_2_1 and CD_2_2 to control the voltage polarity and voltage magnitude of color dots CD_2_1 and CD_2_2. Second color component CC_2 is vertically aligned with first color component CC_1 and separated from color component CC_1 by a horizontal dot spacing HDS1, thus color components CC_2 and CC_1 are horizontally offset by a horizontal dot offset HDO1, which is equal to horizontal dot spacing HDS1 plus the color dot width CDW. Specifically with regards to the color dots, color dot CD_2_1 is vertically aligned with color dots CD_1_1 and horizontally separated by horizontal dot spacing HDS1. Similarly, color dot CD_2_2 is vertically aligned with color dots CD_2_1 and horizontally separated by horizontal dot spacing HDS1. Thus color dot CD_1_1 and color dot CD_2_1 form a first row of color dots and color dot CD_1_2 and color dot CD_2_2 form a second row of color dots. Like color dots CD_1_1 and CD_1_2, Color dots CD_2_1 and CD_2_2 include embedded polarity regions EPR_2_1 and EPR_2_2, respectively. Horizontal dot spacing HDS1 of pixel design 810 is significantly smaller than horizontal dot spacing HDS1 of pixel design 710. Therefore, the size of color dots in pixel design 810 can be larger than the size of color dots in pixel design 710 with the same sized color components. Thus the aperture ratio of pixel design 810 is larger than that of pixel design 710.

Similarly, third color component CC_3 of pixel design 810 has two color dots CD_3_1 and CD_3_2. Color dots CD_3_1 and CD_3_2 form a third column and are separated by a vertical dot spacing VDS1. Thus, color dots CD_3_1 and CD_3_2 are horizontally aligned and vertically separated by vertical dot spacing VDS1. Switching element SE_3 is located in between color dots CD_3_1 and CD_3_2 so that color dot CD_3_1 is on the first side of the row of switching elements and color dot CD_3_2 is on a second side of the row of switching elements. Switching element SE_3 is coupled to the electrodes of color dots CD_3_1 and CD_3_2 to control the voltage polarity and voltage magnitude of color dots CD_3_1 and CD_3_2. Third color component CC_3 is vertically aligned with second color component CC_2 and separated from color component CC_2 by horizontal dot spacing HDS1, thus color components CC_3 and CC_2 are horizontally offset by a horizontal dot offset HDO1. Specifically with regards to the color dots, color dot CD_3_1 is vertically aligned with color dots CD_2_1 and horizontally separated by horizontal dot spacing HDS1. Similarly, color dot CD_3_2 is vertically aligned with color dots CD_2_2 and horizontally separated by horizontal dot spacing HDS1. Thus color dot CD_3_1 is on the first row of color dots and color dot CD_3_2 is on the second row of color dots. Like color dots CD_1_1 and CD_1_2, Color dots CD_3_1 and CD_3_2 include embedded polarity regions EPR_3_1 and EPR_3_2, respectively.

For clarity, the color dots of pixel design 810 are illustrated with color dots having the same color dot height CDH. However, some embodiments of the present invention may have color dots with different color dot heights. For example in one embodiment of the present invention that is a variant of pixel design 810, color dots CD_1_1, CD_2_1 and CD_3_1 have a smaller color dot height than color dots CD_1_2, CD_2_2, and CD_3_2. Furthermore, in many embodiments of the present invention color dots can have different shapes.

Pixel design 810 in includes an embedded fringe field amplifier EFFA_1 instead of fringe field amplifying regions and embedded conductors in the embedded polarity regions as compared to pixel design 710. In pixel design 810, embedded fringe field amplifier EFFA_1 is an embedded conductor that is behind the color dots but extends beyond the color dots on the left, the right, above and below the color dots. Thus, the color dots of pixel design 810 are in front of embedded fringe field amplifier EFFA_1. Specifically, embedded fringe field amplifier extends past the right edge of color dots CD_3_1 and CD_3_2 by a horizontal embedded electrode extension distance HEEED1. Although not specifically labeled, embedded fringe field amplifier EFFA_1 also extends past the left edge of color dots CD_1_1 and CD_1_2 by horizontal embedded electrode extension distance HEED1. Similarly, in pixel design 810 embedded fringe field amplifier EFFA_1 extends above color dots CD_1_1, CD_2_1, and CD_3_1 by a vertical embedded electrode extension distance VEED1 and also extends below color dots CD_1_2, CD_2_2, and CD_3_2.

The polarities of the color dots, embedded fringe field amplifiers, and switching elements are shown using "+" and "−" signs. Thus, in FIG. 8(a), which shows the positive dot polarity pattern of pixel design 810+, all the switching elements (i.e. switching elements SE_1, SE_2, and SE_3); and all the color dots (i.e. color dots CD_1_1, CD_1_2, CD_2_1, CD_2_2, CD_3_1, and 3_2) have positive polarity. However, the embedded fringe field amplifier EFFA_1 has negative polarity. Therefore, embedded polarity region EPR_1_1, EPR_2_1, and EPR_3_1 also have negative polarity (due to space constraints the polarity of the embedded polarity regions are not indicated in FIGS. 8(a) and 8(b)).

FIG. 8(b) shows pixel design 810 with the negative dot polarity pattern. For the negative dot polarity pattern, all the switching elements (i.e. switching elements SE_1, SE_2, and SE_3) and all the color dots (i.e. color dots CD_1_1, CD_1_2, CD_2_1, CD_2_2, CD_3_1, and 3_2) have negative polarity. However, embedded fringe field amplifier EFFA_1 has positive polarity. Therefore, embedded polarity region EPR_1_1, EPR_2_1, and EPR_3_1 also have negative polarity.

Fringe fields in each of the color dots are amplified different voltages are present near the edge of the color dots. Pixel design 810 makes use of the embedded fringe field amplifier to enhance and stabilize the formation of multiple domains in the liquid crystal structure. Specifically, edges of a color dot are in front of a portion of embedded fringe field amplifier EFFA_1. The overlap of the placement of the color dots and embedded fringe field amplifier EFFA_1 amplifies the fringe field of the color dots if the voltage on embedded fringe field amplifier EFFA_1 differs from the voltage of color dots. Greater amplification of the fringe field is obtained if the color dots and the embedded fringe field amplifier have opposite polarity. However, good amplification of the fringe fields of the color dot can also be obtained if the embedded fringe field amplifier is held at the common voltage (i.e. neutral polarity, see FIG. 9(a)-9(c)). In general, the polarities of the polarized components are assigned so that a color dot of a first polarity is in front of an embedded fringe field amplifier of a second polarity that extends beyond the edges of the color dot. For example for the positive dot polarity pattern of pixel design 810 (FIG. 8(a)), color dot CD_2_2 has positive polarity. However, embedded fringe field amplifier EFFA_1 has a negative polarity. Thus, the fringe field of color dot CD_2_2 is amplified.

Because, all the switching elements in pixel design 810 have the same polarity and the embedded fringe field amplifier should be a different polarity, the fringe field amplifier is driven by an external polarity source, i.e. a polarity source from outside the specific pixel of pixel design 810. Various sources of opposite polarity can be used in accordance with differing embodiments of the present invention. For example specific embedded fringe field amplifier switching elements may be used or switching elements of nearby pixels having an opposite dot polarity could also used to drive the embedded fringe field amplifier regions. In the embodiments of FIGS. 8(a)-8(b), switching elements of nearby pixels having an opposite dot polarity could also used to drive the fringe field amplifying regions. Therefore, pixel design 810 includes a conductor 812 to facilitate coupling the fringe field amplifying regions to switching elements in other pixels. Specifically, conductor 812 of a current pixel would couple the embedded fringe field amplifier to switching element SE_1 (see FIG. 8(e)) of a pixel above the current pixel. The connection to the switching element would be via the electrodes of the color dots of the pixel above the current pixel. These connections are better shown in FIG. 8(e), which shows a portion of display 820 using pixel design 810.

Figure 8C:
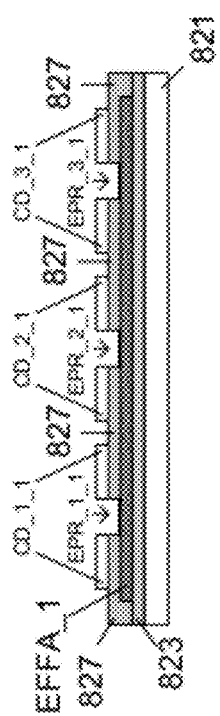

FIG. 8(c) shows a cross section of pixel design 820 along the A-A' line (FIG. 8(b)) which encompasses color dots CD_1_1, CD_2_1, CD_3_1, embedded polarity regions EPR_1_1, EPR_2_1, and EPR_3_1; and embedded fringe field amplifier EFFA_1. FIG. 8(c) is presented to demonstrate the relative placement of the color dots and the embedded fringe field amplifiers. Thus, for clarity, some layers and components that may be present in various embodiments of the present invention are not shown in FIG. 8(c). In addition, other layers and components in a display using pixel design 810 may not be present in the area of the pixel design 810 shown in FIG. 8(c). As shown in FIG. 8(c), a display using pixel design 820 includes an underlying transparent substrate 821. A first passivation layer 823 is formed on transparent substrate 821. Although not shown, a first metal layer is often formed on substrate 821 and is generally covered by first passivation layer 823. However, the first metal layer is not used in the portion of pixel design 820 illustrated in FIG. 8(c). Passivation layer 823 is made with a transparent passivation material such as the dielectric layer $SiN_x$. Generally, a layer of transparent conducting material such as ITO, or ZnO (Zinc Oxide) is formed over passivation layer 823 and etched to form embedded fringe field amplifier EFFA_1. In some embodiments of the present invention a second metal layer could be formed on passivation layer 823. A second passivation layer 827 is formed over embedded fringe field amplifier EFFA_1 and also fills the gaps left by etching process used to form embedded fringe field amplifier EFFA_1. The specific portion of pixel design 810 shown in FIG. 8(c) includes the embedded polarity regions EPR_1_1, EPR_2_1, and EPR_3_1, which are formed by etching through the middle of the color dots and passivation layer 827. Therefore, passivation layer 827 appears to be multiple segments in FIG. 8(c). The color dots are formed on top of passivation layer 827. Typically, the color dots are formed by depositing a layer of conducting material such as ITO or IZO on second passivation layer 827. The conductive layer is then patterned and etched to form the color dots. Thus, as shown in FIG. 8(c) color dots CD_1_1, CD_2_1, and CD_3_1 are on top of second passivation layer 827. Because the perspective view of FIG. 8(c) is taken where the embedded polarity regions are located, color dots CD_1_1, CD_2_1, and CD_3_1 appear as two separate segments in FIG. 8(c). However, the actual shape of the color dots are a square shape with a square hole in the center as shown in FIG. 8(a). In some embodiments of the present invention, the embedded fringe field amplifiers are formed on transparent substrate 821.

Figure 8D:
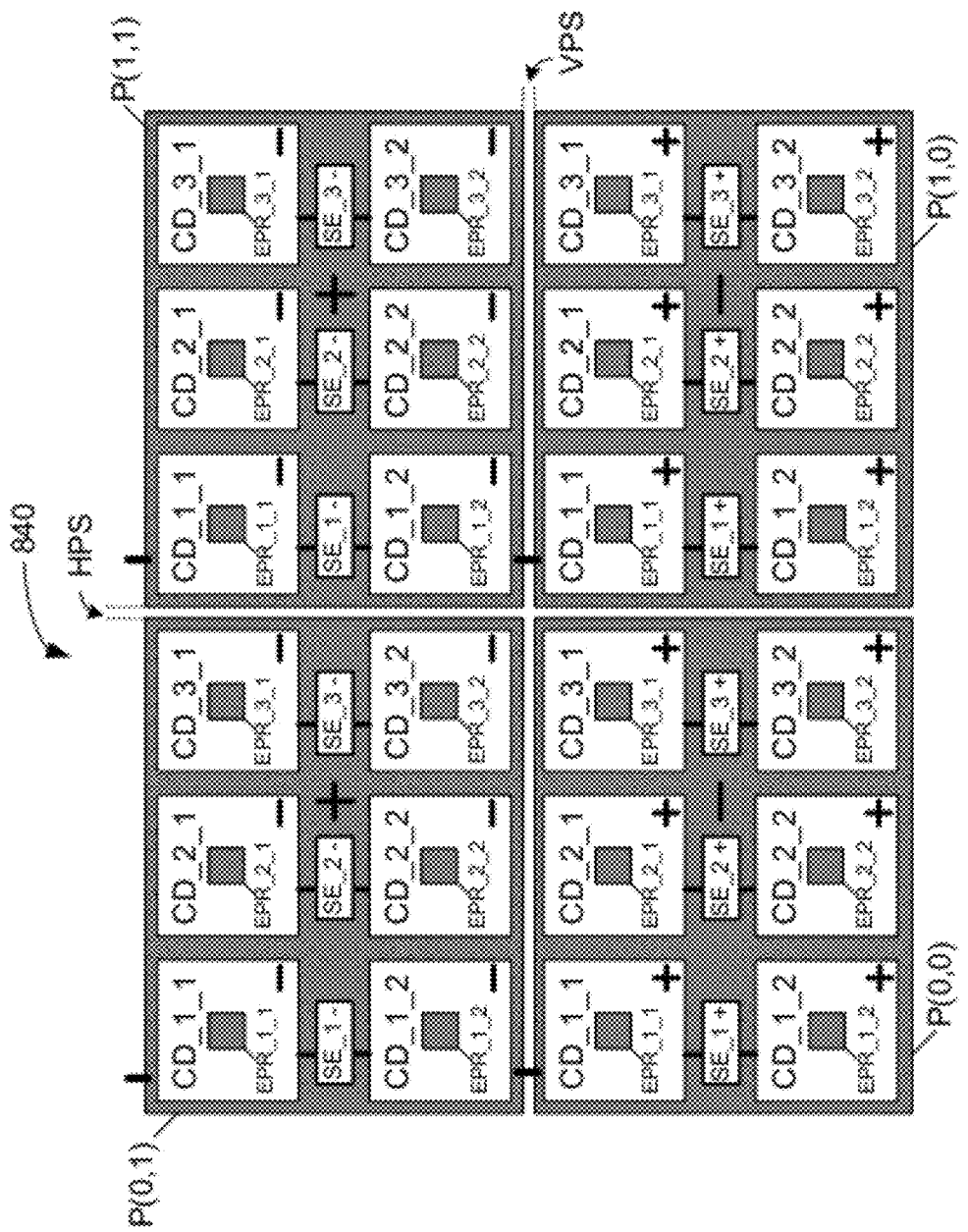
FIG. 8(d) illustrates a portion of a display in accordance with one embodiment of the present invention.

FIG. 8(d) shows a portion of display 840 having pixels P(0, 0), P(1, 0), P(0, 1), and P(1, 1) of pixel design 810. Display 840 uses a switching element row inversion driving scheme. Display 840 could have thousands of rows with thousand of pixels on each row. The rows and columns would continue from the portion shown in FIG. 8(d) in the manner shown in FIG. 8(d). For clarity, the gate lines and source lines that control the switching elements are omitted in FIG. 8(d). In display 840, pixels on the same row are separated by a horizontal pixel distance HPS and pixels in adjacent rows are separated by a vertical pixel spacing VPS. The pixels of display 840 are arranged so that all pixels in a row have the same dot polarity pattern (positive or negative) and each successive row should alternate between positive and negative dot polarity pattern. Thus, pixels P(0, 0) and P(1, 0) in the first row (i.e. row 0) have the positive dot polarity pattern and pixels P(0, 1) and P(1, 1) in the second row (i.e. row 1) have the negative dot polarity pattern. However, at the next frame the pixels will switch dot polarity patterns. Thus in general a pixel P(x, y) has a first dot polarity pattern when y is even and a second dot polarity pattern when y is odd. Internal conductor 812 in pixel design 810 provides polarity to the embedded fringe field amplifiers. Specifically, embedded fringe field amplifiers of a first pixel receive voltage polarity and voltage magnitude from a second pixel. More specifically, the second pixel is the pixel above the first pixel. For example, embedded fringe field amplifier EFFA_1 of pixel P(0, 0) is coupled to switching elements SE_1 of pixel P(0, 1) via the electrodes of color dots CD_1_2 of pixel P(0, 1).

Alternatively, in another embodiment of the present invention, a display could have embedded-fringe-field-amplifier switching elements, for each row of pixels. In a similar that embedded-polarity-region switching elements are used in FIG. 7(d). However, only one embedded-fringe-field-amplifier switching element is needed for each row of pixels.

Due to the switching of polarities on each row in display 840, if a color dot has the first polarity, the embedded fringe field amplifier surrounding the color dot would have the second polarity. For example, color dot CD_3_2 of pixel P(0, 0) has positive polarity while, embedded fringe field amplifier EFFA_1 of pixel P(0, 0) has negative polarity (from switching element SE_1 of pixel P(0, 1). In a particular embodiment of the present invention, each color dot has a width of 30 micrometers and a height of 35 micrometers. Each embedded polarity region has a width of 6 micrometers and a height of 6 micrometers Each embedded fringe field amplifier has width of 105 micrometers and a height of 105 micrometers. Horizontal dot spacing HDS1 is 10 micrometers, vertical dot spacing VDS1 is 30 micrometers, horizontal embedded electrode extension distance is 6 micrometers, and vertical embedded electrode extension distance is 6 micrometers. Furthermore, horizontal pixel spacing HPS is 6 micrometers and vertical pixel spacing VPS is 40 micrometers.

Figure 9B:
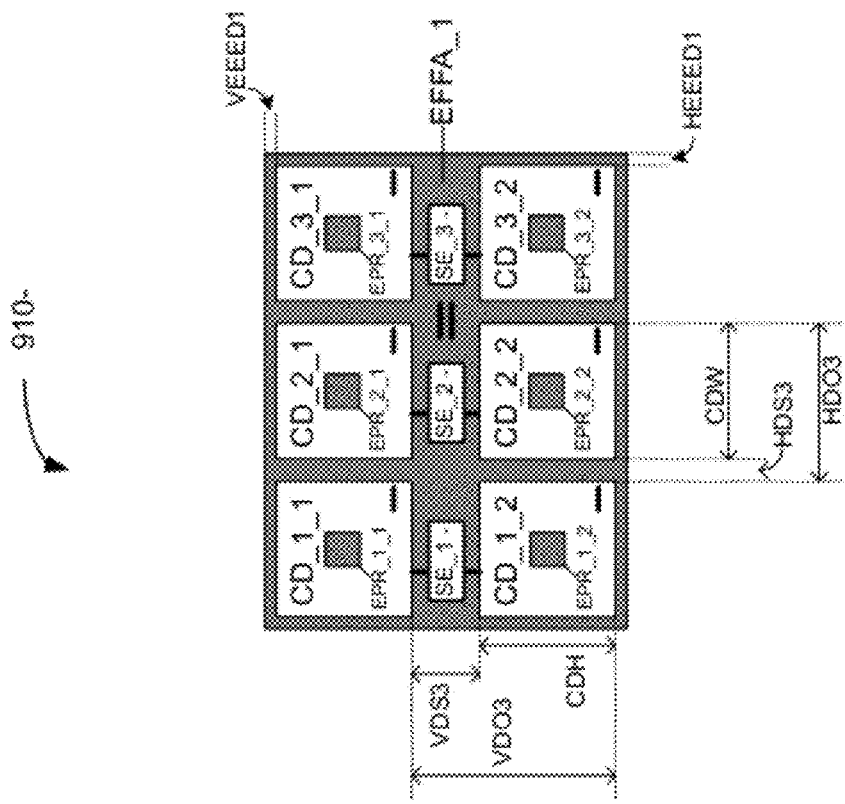
FIGS. 9(a)-9(b) illustrate a pixel design in accordance with one embodiment of the present invention.
Figure 9A:
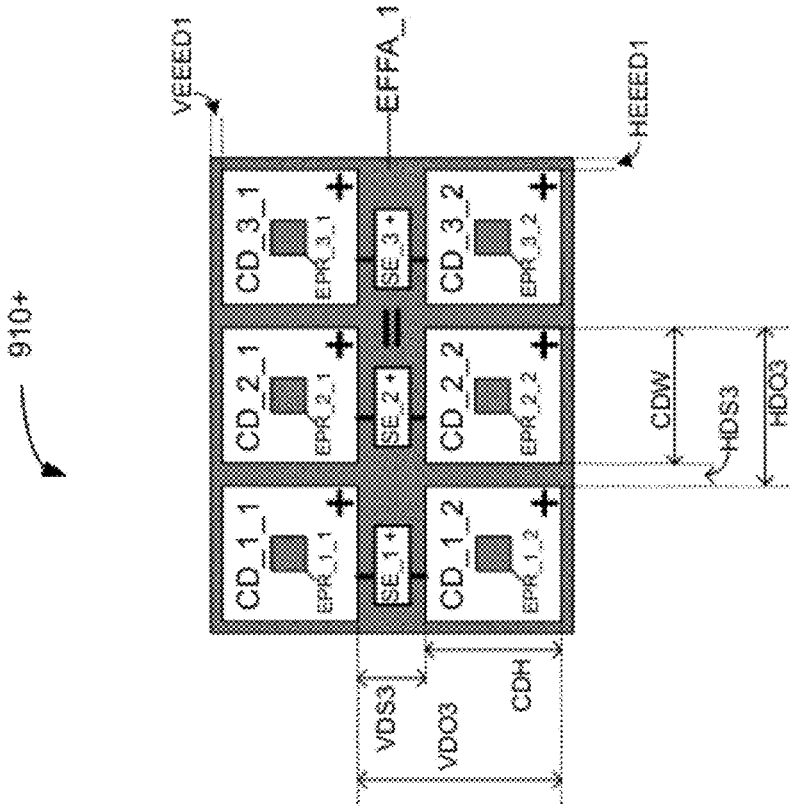

FIGS. 9(a) and 9(b) show different dot polarity patterns of a pixel design 910 (labeled 910+ and 910− as explained above) that is often used in displays having a switching element row inversion driving scheme. In actual operation a pixel will switch between a first dot polarity pattern and a second dot polarity pattern between each image frame. Pixel design 910 is almost identical to pixel design 810, therefore the description is not repeated and only the differences are described. Specifically, pixel design 910 differs from pixel design 810 in that embedded fringe field amplifier EFFA_1 is polarized to a neutral polarity as denoted by the "=". Accordingly, conductor 812 that was used in pixel design 810 to bring couple embedded fringe field amplifier EFFA_1 to a switching element of a nearby pixel is not present in pixel design 910. In most embodiments of the present invention neutral polarity is obtained from common voltage V_Com.

Figure 9C:
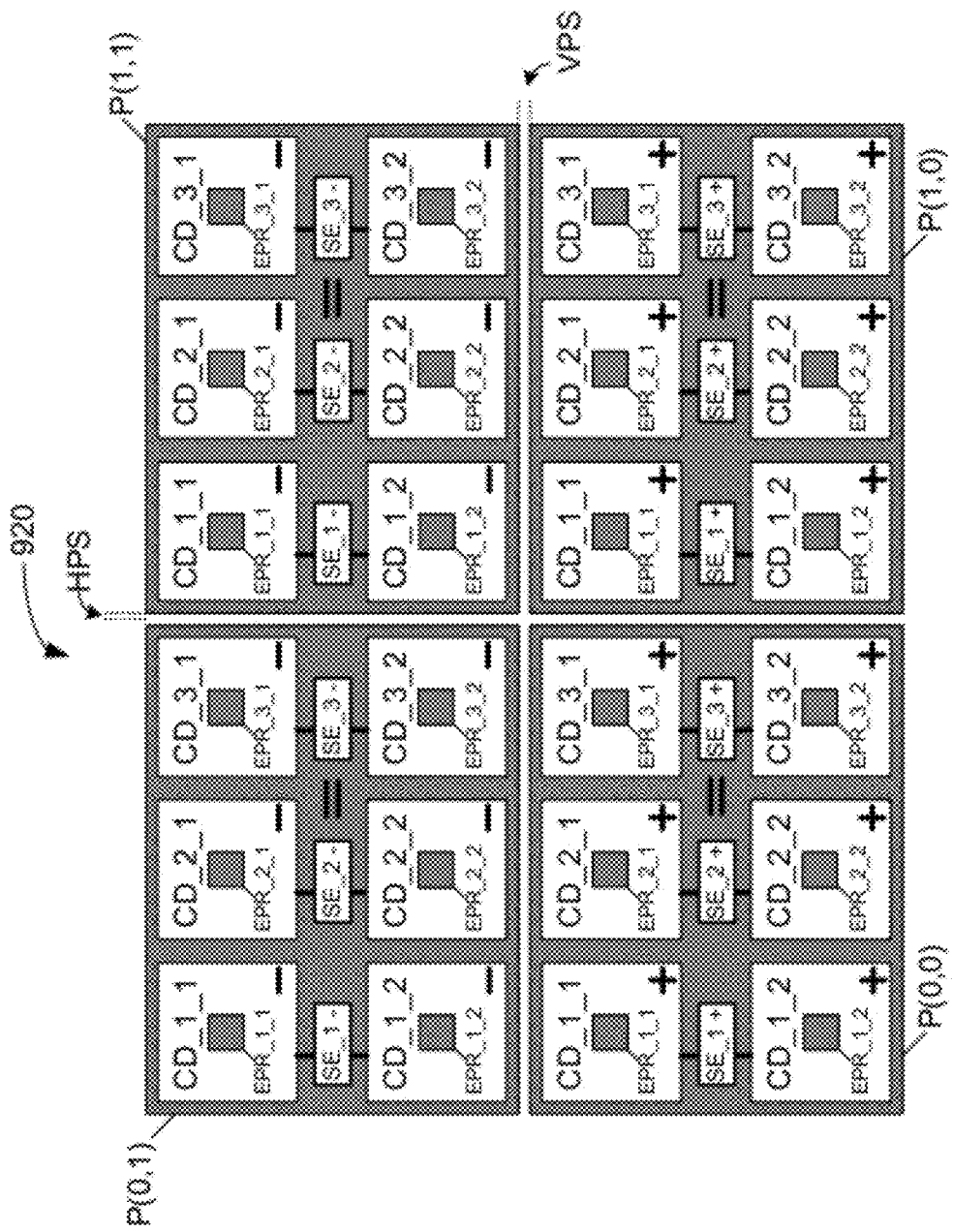
FIG. 9(c) illustrates a portion of a display in accordance with one embodiment of the present invention.

As explained above, using neutral polarity on embedded fringe field amplifier EFFA_1 amplifies the fringe field of the color dots. Thus, pixel design 910 will also have good multi-domain performance and can be used to form displays in the same way as pixel design 810. For example, FIG. 9(c) shows a portion of display 920 having pixels P(0, 0), P(1, 0), P(0, 1), and P(1, 1) of pixel design 910. Display 920 uses a switching element row inversion driving scheme. Display 920 could have thousands of rows with thousand of pixels on each row. In display 920, pixels on the same row are separated by a horizontal pixel distance HPS and pixels in adjacent rows are separated by a vertical pixel spacing VPS. The rows and columns would continue from the portion shown in FIG. 9(c) in the manner shown in FIG. 9(c). For clarity, the gate lines and source lines that control the switching elements are omitted in FIG. 9(c). The pixels of display 920 are arranged so that all pixels in a row have the same dot polarity pattern (positive or negative) and each successive row should alternate between positive and negative dot polarity pattern. Thus, pixels P(0, 0) and P(1, 0) in the first row (i.e. row 0) have the positive dot polarity pattern and pixels P(0, 1) and P(1, 1) in the second row (i.e. row 1) have the negative dot polarity pattern. However, at the next frame the pixels will switch dot polarity patterns. Thus in general a pixel P(x, y) has a first dot polarity pattern when y is even and a second dot polarity pattern when y is odd.

One benefit of using neutral polarity on embedded fringe field amplifier EFFA_1 is that the polarity of the color dots in front of the embedded fringe field amplifier can have different polarities. For example, FIGS. 10(a) and 10(b) show different dot polarity patterns of a pixel design 1010 (labeled 1010+ and 1010− as explained above) that is often used in displays having a switching element point inversion driving scheme and switching element column inversion driving scheme. In actual operation a pixel will switch between a first dot polarity pattern and a second dot polarity pattern between each image frame. Pixel design 1010 is almost identical to pixel design 910, therefore the description is not repeated and only the differences are described. Specifically, pixel design 1010 differs from pixel design 910 in that the polarity of switching element SE_2, color dots CD_2_1, color dot CD_2_2 is negative for the positive dot polarity and positive for the negative dot polarity.

Thus, in FIG. 10(a), which shows the positive dot polarity pattern of pixel design 1010+, switching elements SE_1 and SE_3, color dots CD_1_1, CD_1_2, CD_3_1 and CD_3_2 have positive polarity. However, switching element SE_2, color dots CD_2_1 and CD_2_2 have negative polarity. Embedded fringe field amplifier EFFA_1 has neutral polarity. FIG. 10(b) shows pixel design 1010 with the negative dot polarity pattern. For the negative dot polarity pattern, switching elements SE_1 and SE_3, color dots CD_1_1, CD_1_2, CD_3_1 and CD_3_2 have negative polarity. However, switching element SE_2, color dots CD_2_1 and CD_2_2 have positive polarity. Embedded fringe field amplifier EFFA_1 has neutral polarity.

Figure 10C:
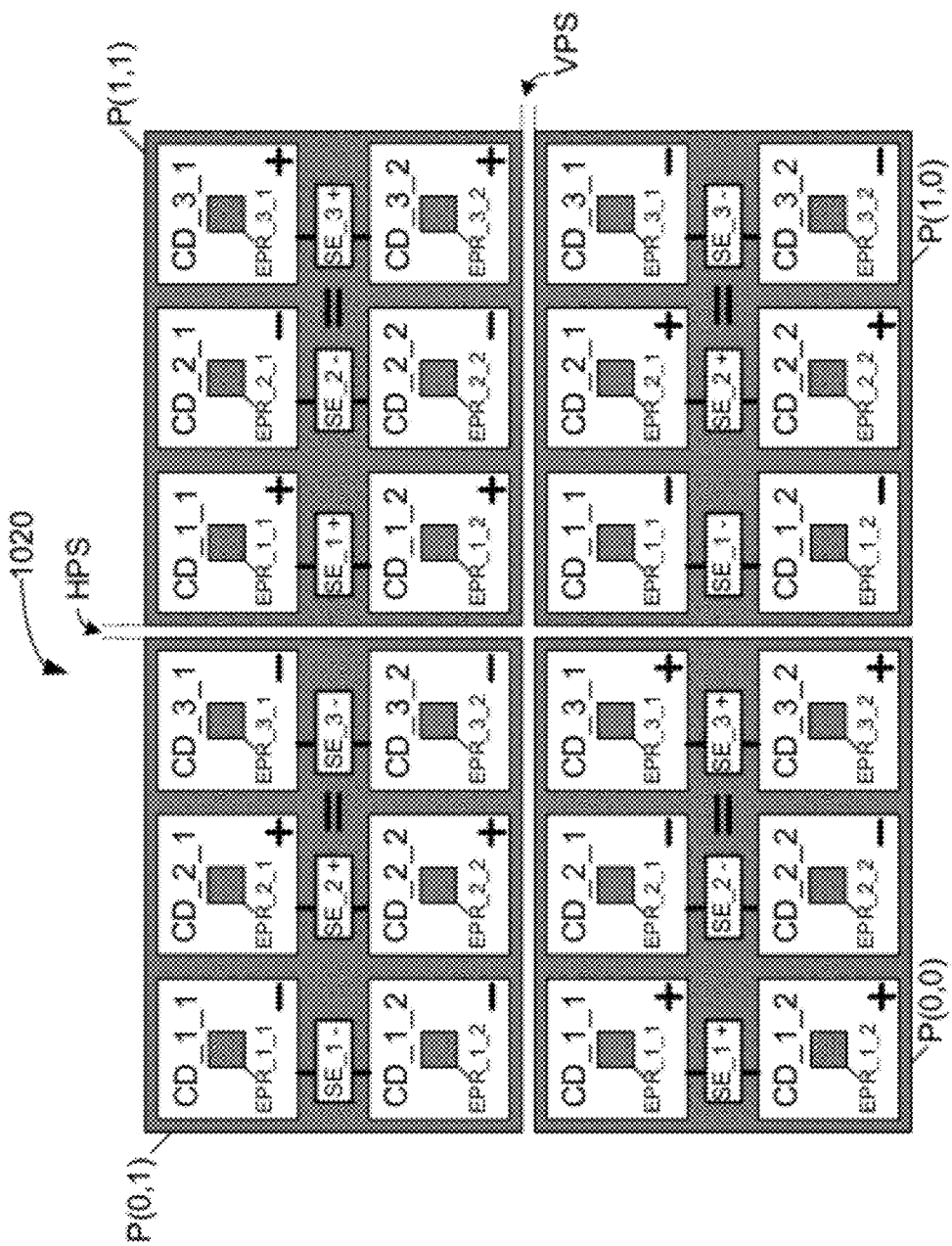
FIG. 10(c) illustrates a portion of a display in accordance with one embodiment of the present invention.

FIG. 10(c) shows a portion of display 1020 having pixels P(0, 0), P(1, 0), P(0, 1), and P(1, 1) of pixel design 1010. Display 1020 uses a switching element point inversion driving scheme. Display 1020 could have thousands of rows with thousand of pixels on each row. In display 1020, pixels on the same row are separated by a horizontal pixel distance HPS and pixels in adjacent rows are separated by a vertical pixel spacing VPS. The rows and columns would continue from the portion shown in FIG. 10(c) in the manner shown in FIG. 10(c). For clarity, the gate lines and source lines that control the switching elements are omitted in FIG. 10(c). In display 1020 the pixels are arranged so that pixels in a row alternate dot polarity patterns (positive or negative) and pixels in a column also alternate between positive and negative dot polarity pattern. Thus, pixels P(0, 0) and P(1, 1) have positive dot polarity pattern and pixels P(0, 1) and P(1, 0) have the negative dot polarity pattern. However, at the next frame the pixels will switch dot polarity patterns. Thus in general a pixel P(x, y) has a first dot polarity pattern when x+y is even and a second dot polarity pattern when x+y is odd.

Figure 10D:
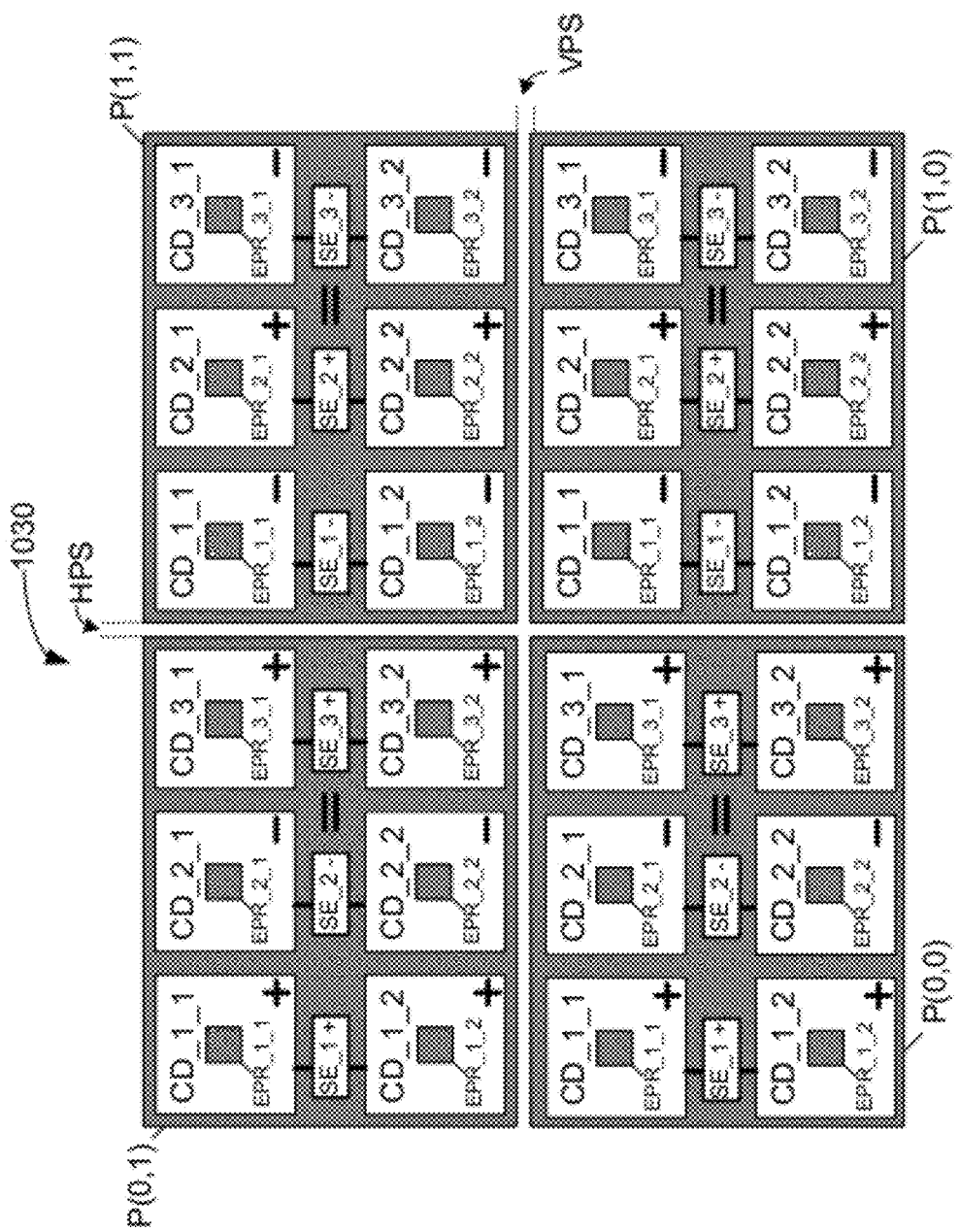
FIG. 10(d) illustrates a portion of a display in accordance with one embodiment of the present invention.

Pixel design 1010 can also be used in displays using switching element column inversion driving scheme. FIG. 10(d) shows a portion of display 1030 having pixels P(0, 0), P(1, 0), P(0, 1), and P(1, 1) of pixel design 1010. Display 1030 could have thousands of rows with thousand of pixels on each row. In display 1030, pixels on the same row are separated by a horizontal pixel distance HPS and pixels in adjacent rows are separated by a vertical pixel spacing VPS. The rows and columns would continue from the portion shown in FIG. 10(d) in the manner shown in FIG. 10(d). For clarity, the gate lines and source lines that control the switching elements are omitted in FIG. 10(d). In display 1030 the pixels are arranged so that pixels in a row alternate dot polarity patterns (positive or negative) and pixels in a column have the same dot polarity pattern. Thus, pixels P(0, 0) and P(0, 1) have positive dot polarity pattern and pixels P(1, 0) and P(1, 1) have the negative dot polarity pattern. However, at the next frame the pixels will switch dot polarity patterns. Thus in general a pixel P(x, y) has a first dot polarity pattern when x is even and a second dot polarity pattern when x is odd.

In many portable LCD applications, power consumption needs to be reduced to conserve battery life. FIGS. 11(a) and 11(b) shows a pixel design having multiple color dots per color component that incorporate embedded polarity regions and multiple embedded fringe field amplifier in accordance with some embodiments of the present invention. Specifically, FIGS. 11(a) and 11(b) show different dot polarity patterns of a pixel design 1110 (labeled 1110+ and 1110− as described below) that is often used in displays having a switching element row inversion driving scheme. In actual operation a pixel will switch between a first dot polarity pattern and a second dot polarity pattern between each image frame.

Like pixel design 810, pixel design 1110 has three color components CC_1, CC_2 and CC_3 (not labeled in FIGS. 11(a)-11(b)). Each of the three color components includes two color dots. Pixel design 1110 also includes a switching element for each color component (referenced as SE_1, SE_2, and SE_3) and an embedded fringe field amplifier for each color component (referenced as EFFA_1, EFFA_2, and EFFA_3). Switching elements SE_1, SE_2, and SE_3 are arranged in a row. Embedded fringe field Amplifiers EFFA_1, EFFA_2, EFFA_3 are also arranged in a row. The color dots, embedded polarity regions, and switching elements of pixel design 1110 are very similar to pixel design 810. However as described below the formation of the embedded polarity regions differs in pixel design 1110 and 810.

First color component CC_1 of pixel design 1110 has two color dots CD_1_1 and CD_1_2. Color dots CD_1_1 and CD_1_2 form a column and are separated by a vertical dot pacing VDS1. In other words, color dots CD_1_1 and CD_1_2 are horizontally aligned and vertically separated by vertical dot spacing VDS1. Furthermore, color dots CD_1_1 and CD_1_2 are vertically offset by vertical dot offset VDO1 which is equal to vertical dot spacing VDS1 plus the color dot height CDH. Switching element SE_1 is located in between color dots CD_1_1 and CD_1_2 so that color dot CD_1_1 is on a first side of the row of switching elements and color dot CD_1_2 is on a second side of the row of switching elements. Switching element SE_1 is coupled to the electrodes of color dots CD_1_1 and CD_1_2 to control the voltage polarity and voltage magnitude of color dots CD_1_1 and CD_1_2.

Each color dot of color component CD_1_1 includes an embedded polarity region which would enhance the fringe field, thus enhance the MVA operation and minimize any touch mura effects in the color dot. Specifically, color dots CD_1_1 and CD_1_2 include embedded polarity regions EPR_1_1 and EPR_1_2, respectively. As shown in FIG. 11($a$), embedded polarity regions EPR_1_1 and EPR_1_2 are centered within color dots CD_1_1 and CD_1_2, respectively. In pixel design 1110, the embedded conductor technique shown in FIGS. 6($a$)-6($b$) is expanded and combined with the fringe field amplifying region used in pixel design 710 (FIGS. 7($a$)-7($b$)). Specifically, an embedded fringe field amplifier is used for each color component in pixel design 1110.

For clarity, the relative positions of the various parts of a pixel design are described from the perspective of a user viewing a display that is being held in a vertical position. Thus for example, in FIG. 11($a$), color dot CD_1_1 is described as being above switching element SE_1 and color dot CD_1_2 is described as being below switching element SE_1. Color dot CD_1_1 to the left of color dot CD_2_1, conversely, color dot CD_3_1 is to the right of color dot CD_2_1. Furthermore, embedded fringe field amplifiers are described as being behind the color dots. Conversely, the color dots are described as being in front of the embedded fringe field amplifiers.

Second color component CC_2 of pixel design 1110 has two color dots CD_2_1 and CD_2_2. Color dots CD_2_1 and CD_2_2 form a second column and are separated by a vertical dot spacing VDS1. Thus, color dots CD_2_1 and CD_2_2 are horizontally aligned and vertically separated by vertical dot spacing VDS1. Switching element SE_2 is located in between color dots CD_2_1 and CD_2_2 so that color dot CD_2_1 is on the first side of the row of switching elements and color dot CD_2_2 is on a second side of the row of switching elements. Switching element SE_2 is coupled to the electrodes of color dots CD_2_1 and CD_2_2 to control the voltage polarity and voltage magnitude of color dots CD_2_1 and CD_2_2. Second color component CC_2 is vertically aligned with first color component CC_1 and separated from color component CC_1 by a horizontal dot spacing HDS1, thus color components CC_2 and CC_1 are horizontally offset by a horizontal dot offset HDO1, which is equal to horizontal dot spacing HDS1 plus the color dot width CDW. Specifically with regards to the color dots, color dot CD_2_1 is vertically aligned with color dots CD_1_1 and horizontally separated by horizontal dot spacing HDS1. Similarly, color dot CD_2_2 is vertically aligned with color dots CD_2_1 and horizontally separated by horizontal dot spacing HDS1. Thus color dot CD_1_1 and color dot CD_2_1 form a first row of color dots and color dot CD_1_2 and color dot CD_2_2 form a second row of color dots. Like color dots CD_1_1 and CD_1_2, Color dots CD_2_1 and CD_2_2 include embedded polarity regions EPR_2_1 and EPR_2_2, respectively.

Similarly, third color component CC_3 of pixel design 1110 has two color dots CD_3_1 and CD_3_2. Color dots CD_3_1 and CD_3_2 form a third column and are separated by a vertical dot spacing VDS1. Thus, color dots CD_3_1 and CD_3_2 are horizontally aligned and vertically separated by vertical dot spacing VDS1. Switching element SE_3 is located in between color dots CD_3_1 and CD_3_2 so that color dot CD_3_1 is on the first side of the row of switching elements and color dot CD_3_2 is on a second side of the row of switching elements. Switching element SE_3 is coupled to the electrodes of color dots CD_3_1 and CD_3_2 to control the voltage polarity and voltage magnitude of color dots CD_3_1 and CD_3_2. Third color component CC_3 is vertically aligned with second color component CC_2 and separated from color component CC_2 by horizontal dot spacing HDS1, thus color components CC_3 and CC_2 are horizontally offset by a horizontal dot offset HDO1. Specifically with regards to the color dots, color dot CD_3_1 is vertically aligned with color dots CD_2_1 and horizontally separated by horizontal dot spacing HDS1. Similarly, color dot CD_3_2 is vertically aligned with color dots CD_2_2 and horizontally separated by horizontal dot spacing HDS1. Thus color dot CD_3_1 is on the first row of color dots and color dot CD_3_2 is on the second row of color dots. Like color dots CD_1_1 and CD_1_2, Color dots CD_3_1 and CD_3_2 include embedded polarity regions EPR_3_1 and EPR_3_2, respectively.

For clarity, the color dots of pixel design 1110 are illustrated with color dots having the same color dot height CDH. However, some embodiments of the present invention may have color dots with different color dot heights. For example in one embodiment of the present invention that is a variant of pixel design 1110, color dots CD_1_1, CD_2_1 and CD_3_1 have a smaller color dot height than color dots CD_1_2, CD_2_2, and CD_3_2. Furthermore, in many embodiments of the present invention color dots can have different shapes.

Pixel design 1110 in includes embedded fringe field amplifiers EFFA instead of fringe field amplifying regions and embedded conductors in the embedded polarity regions as compared to pixel design 710. Specifically, pixel design 1110 includes embedded fringe field amplifier EFFA_1, EFFA_2, and EFFA_3. As shown in FIG. 11($a$), embedded fringe field amplifiers EFFA_1, EFFA_2, and EFFA_3 are placed behind the color dots of pixel design 1110. Specifically, embedded fringe field amplifier EFFA_1 is placed so that color dot CD_1_1 and color CD_1_2 and switching element SE_1 are in front of embedded fringe field amplifier EFFA_1. However, the embedded fringe field amplifier EFFA_1 extends past the left side and right side of color dots CD_1_1 and CD_1_2 by a horizontal embedded electrode extension distance HEEED1. Similarly, the embedded fringe field amplifier EFFA_1 extends past the top of color dot CD_1_1 and the bottom of color dot CD_1_2 by a vertical embedded electrode extension distance VEEED1. Thus, the edges of the color dot CD_1_1 and CD_1_2 are in front of portions of embedded fringe field amplifier EFFA_1. Similarly, embedded fringe field amplifier EFFA_2 is placed so that color dot CD_2_1 and color CD_2_2 and switching element SE_2 are in front of embedded fringe field amplifier EFFA_2. However, embedded fringe field amplifier EFFA_2 extends past the left side and right side of color dots CD_2_1 and CD_2_2 by a horizontal embedded electrode extension distance HEEED1. Similarly, the embedded fringe field amplifier EFFA_2 extends past the top of color dot CD_2_1 and the bottom of color dot CD_2_2 by a vertical embedded electrode extension distance VEEED1. Thus, the edges of the color dot CD_2_1 and CD_2_2 are in front of portions of embedded fringe field amplifier EFFA_2. Furthermore, embedded fringe field amplifier EFFA_2 is vertically aligned with embedded fringe field amplifier EFFA_1 and separated from embedded fringe field amplifier EFFA_1 by a horizontal embedded electrode spacing HEES1.

Similarly, embedded fringe field amplifier EFFA_3 is placed so that color dot CD_3_1 and color CD_3_2 and switching element SE_3 are in front of embedded fringe field amplifier EFFA_3. However, embedded fringe field amplifier EFFA_3 extends past the left side and right side of color dots CD_3_1 and CD_3_2 by a horizontal embedded electrode extension distance HEEED1. Similarly, the embedded fringe field amplifier EFFA_3 extends past the top color dot CD_3_1 and the bottom of color dot CD_3_2 by a vertical embedded electrode extension distance VEEED1. Thus, the edges of the color dot CD_3_1 and CD_3_2 are in front of portions of embedded fringe field amplifier EFFA_3. Furthermore, embedded fringe field amplifier EFFA_3 is vertically aligned with embedded fringe field amplifier EFFA_2 and separated from embedded fringe field amplifier EFFA_2 by a horizontal embedded electrode spacing HEES1. An electrode 1116 is used to couple embedded fringe field amplifier EFFA_1 to a voltage source.

The polarities of the color dots, embedded fringe field amplifiers, and switching elements are shown using "+" and "−" signs. Thus, in FIG. 11(a), which shows the positive dot polarity pattern of pixel design 1110+, all the switching elements (i.e. switching elements SE_1, SE_2, and SE_3); and all the color dots (i.e. color dots CD_1_1, CD_1_2, CD_2_1, CD_2_2, CD_3_1, and 3_2) have positive polarity. However, embedded fringe field amplifiers EFFA_1, EFFA_2, and EFFA_3 have negative polarity. Therefore, embedded polarity region EPR_1_1, EPR_2_1, and EPR_3_1 also have negative polarity (due to space constraints the polarity of the embedded polarity regions are not indicated in FIGS. 11(a) and 11(b)).

FIG. 11(b) shows pixel design 1110 with the negative dot polarity pattern. For the negative dot polarity pattern, all the switching elements (i.e. switching elements SE_1, SE_2, and SE_3) and all the color dots (i.e. color dots CD_1_1, CD_1_2, CD_2_1, CD_2_2, CD_3_1, and 3_2) have negative polarity. However, embedded fringe field amplifiers EFFA_1, EFFA_2, and EFFA_3 have positive polarity. Therefore, embedded polarity region EPR_1_1, EPR_2_1, and EPR_3_1 also have negative polarity.

Fringe fields in each of the color dots are amplified because different voltages are present near the edge of the color dots. Pixel design 1110 makes use of the embedded fringe field amplifier to enhance and stabilize the formation of multiple domains in the liquid crystal structure. Specifically, edges of a color dot are in front of a portion of an embedded fringe field amplifier. The overlap of the placement of the color dots and embedded fringe field amplifiers amplifies the fringe field of the color dots when the voltage on embedded fringe field amplifier EFFA_1 differs from the voltage of the color dots. Greater amplification of the fringe field is obtained if the color dots and the embedded fringe field amplifier have opposite polarity. However, good amplification of the fringe fields of the color dot can also be obtained if the embedded fringe field amplifier is held at the common voltage (i.e. neutral polarity). In general, the polarities of the polarized components are assigned so that a color dot of a first polarity is in front of an embedded fringe field amplifier of a second polarity that extends beyond the edges of the color dot. For example for the positive dot polarity pattern of pixel design 1110 (FIG. 11(a)), color dot CD_2_2 has positive polarity. However, embedded fringe field amplifier EFFA_2 has a negative polarity. Thus, the fringe field of color dot CD_2_2 is amplified.

Because, all the switching elements in pixel design 1110 have the same polarity and the embedded fringe field amplifier should be a different polarity, the fringe field amplifier is driven by an external polarity source, i.e. a polarity source from outside the specific pixel of pixel design 1110. Various sources of opposite polarity can be used in accordance with differing embodiments of the present invention. For example specific embedded fringe field amplifier switching elements may be used or switching elements of nearby pixels having an opposite dot polarity could also used to drive the embedded fringe field amplifier regions. In the embodiments of FIGS. 11(a)-11(b), switching elements of nearby pixels having an opposite dot polarity could also used to drive the fringe field amplifying regions. Therefore, pixel design 1110 includes a conductors 1112, 1114, and 1116 to facilitate coupling the fringe field amplifying regions to switching elements in other pixels. An electrode 1112 is used to couple embedded fringe field amplifier EFFA_1 to a voltage source. Generally, electrode 1112 is coupled to color dot CD_1_2 of a pixel located above the current pixel in switching element row inversion driving scheme displays (See FIG. 11(d)). An electrode 1114 is used to couple embedded fringe field amplifier EFFA_2 to a voltage source. Generally, electrode 1114 is coupled to color dot CD_2_2 of a pixel located above the current pixel in switching element row inversion driving scheme displays (see FIG. 11(d)). An electrode 1116 is used to couple embedded fringe field amplifier EFFA_1 to a voltage source. Generally, electrode 1116 is coupled to color dot CD_3_2 of a pixel located above the current pixel in switching element point row driving scheme displays (See FIG. 11(d))

Figure 11C:
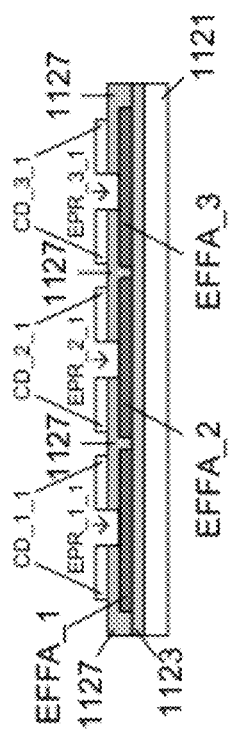

FIG. 11(c) shows a cross section of pixel design 1110 along the A-A' line (FIG. 11(b)) which encompasses color dots CD_1_1, CD_2_1, CD_3_1, embedded polarity regions EPR_1_1, EPR_2_1, and EPR_3_1; and embedded fringe field amplifiers EFFA_1, EFFA_2, and EFFA_3. FIG. 11(c) is presented to demonstrate the relative placement of the color dots and the embedded fringe field amplifiers. Thus, for clarity, some layers and components that may be present in various embodiments of the present invention are not shown in FIG. 11(c). In addition, other layers and components in a display using pixel design 1110 may not be present in the area of the pixel design 1110 shown in FIG. 11(c). As shown in FIG. 11(c), a display using pixel design 1110 includes an underlying transparent substrate 1121. A first passivation layer 1123 is formed on transparent substrate 1121. Although not shown, a first metal layer is often formed on substrate 1121 and is generally covered by first passivation layer 1123. However, the first metal layer is not used in the portion of pixel design 1120 illustrated in FIG. 11(c). Passivation layer 1123 is made with a transparent passivation material such as the dielectric layer $SiN_x$. Generally, a layer of transparent conducting material such as ITO, or ZnO is formed over passivation layer 1123 and etched to form embedded fringe field amplifiers EFFA_1, EFFA_2, and EFFA_3. In some embodiments of the present invention a second metal layer could be formed on passivation layer 1123. A second passivation layer 1127 is formed over embedded fringe field amplifier EFFA_1 and also fills the gaps left by etching process used to form embedded fringe field amplifiers EFFA_1, EFFA_2, and EFFA_3. The specific portion of pixel design 1110 shown in FIG. 11(c) includes the embedded polarity regions EPR_1_1, EPR_2_1, and EPR_3_1, which are formed by etching through the middle of the color dots and passivation layer 1127. Therefore, passivation layer 1127 appears to be multiple segments in FIG. 11(c). The color dots are formed on top of passivation layer 1127. Typically, the color dots are formed by depositing a layer of conducting material such as ITO or IZO on second passivation layer 1127. The conductive layer is then patterned and etched to form the color dots. Thus, as shown in FIG. 11(c) color dots CD_1_1, CD_2_1, and CD_3_1 are on top of second passivation layer 1127. Because the perspective view of FIG. 11(c) is taken where the embedded polarity regions are located, color dots CD_1_1, CD_2_1, and CD_3_1 appear as two separate segments in FIG. 11(c). However, the actual shape of the color dots are a square shape with a square hole in the center as shown in FIG. 11(a). In some embodiments of the present invention, the embedded fringe field amplifiers are formed on transparent substrate 1121.

FIG. 11(d) shows a portion of display 1140 having pixels P(0, 0), P(1, 0), P(0, 1), and P(1, 1) of pixel design 1110. Display 1140 uses a switching element row inversion driving scheme. Display 1140 could have thousands of rows with thousand of pixels on each row. The rows and columns would continue from the portion shown in FIG. 11(d) in the manner shown in FIG. 11(d). For clarity, the gate lines and source lines that control the switching elements are omitted in FIG. 11(d). In display 1140, pixels on the same row are separated by a horizontal pixel distance HPS and pixels in adjacent rows are separated by a vertical pixel spacing VPS. The pixels of display 1140 are arranged so that all pixels in a row have the same dot polarity pattern (positive or negative) and each successive row should alternate between positive and negative dot polarity pattern. Thus, pixels P(0, 0) and P(1, 0) in the first row (i.e. row 0) have the positive dot polarity pattern and pixels P(0, 1) and P(1, 1) in the second row (i.e. row 1) have the negative dot polarity pattern. However, at the next frame the pixels will switch dot polarity patterns. Thus in general a pixel P(x, y) has a first dot polarity pattern when y is even and a second dot polarity pattern when y is odd. Internal conductor 1112 in pixel design 1110 provides polarity to the embedded fringe field amplifiers. Specifically, embedded fringe field amplifiers of a first pixel receive voltage polarity and voltage magnitude from a second pixel. More specifically, the second pixel is the pixel above the first pixel. For example, embedded fringe field amplifier EFFA_1 of pixel P(0, 0) is coupled to switching elements SE_1 of pixel P(0, 1) via the electrodes of color dots CD_1_2 of pixel P(0, 1).

Alternatively, in another embodiment of the present invention, a display could have embedded-fringe-field-amplifier switching elements, for each row of pixels. In a similar that embedded-polarity-region switching elements are used in FIG. 7(d). However, only one embedded-fringe-field-amplifier switching element is needed for each row of pixels.

Due to the switching of polarities on each row in display 1140, if a color dot has the first polarity, the embedded fringe field amplifier surrounding the color dot would have the second polarity. For example, color dot CD_3_2 of pixel P(0, 0) has positive polarity while, embedded fringe field amplifier EFFA_1 of pixel P(0, 0) has negative polarity (from switching element SE_1 of pixel P(0, 1). In a particular embodiment of the present invention, each color dot has a width of 30 micrometers and a height of 35 micrometers. Each embedded polarity region has a width of 6 micrometers and a height of 6 micrometers Each embedded fringe field amplifier has width of 105 micrometers and a height of 105 micrometers. Horizontal dot spacing HDS1 is 10 micrometers, vertical dot spacing VDS1 is 30 micrometers, horizontal embedded electrode extension distance is 6 micrometers, and vertical embedded electrode extension distance is 6 micrometers. Furthermore, horizontal pixel spacing HPS is micrometers and vertical pixel spacing VPS is micrometers.

Pixel design 1110 can easily be modified for use with displays having switching element column inversion driving schemes and switching element point inversion driving schemes. FIGS. 11(e) and 11(f) show different dot polarity patterns of a pixel design 1120 (labeled 1120+ and 1120−). in actual operation a pixel will switch between a first dot polarity pattern and a second dot polarity pattern between each image frame. Pixel design 1120 is almost identical to pixel design 1110, therefore the description is not repeated and only the differences are described. Specifically, pixel design 1120 differs from pixel design 1110 in that the polarity of switching element SE_2, color dots CD_2_1, color dot CD_2_2 is negative for the positive dot polarity and positive for the negative dot polarity. In addition the polarity of embedded fringe field amplifier EFFA_2 is positive for the positive dot polarity and negative for the negative dot polarity.

Thus, in FIG. 11(e), which shows the positive dot polarity pattern of pixel design 1120+, switching elements SE_1 and SE_3, color dots CD_1_1, CD_1_2, CD_3_1 and CD_3_2, and embedded fringe field amplifier EFFA_2 have positive polarity. However, switching element SE_2, color dots CD_2_1 and CD_2_2, and embedded fringe field amplifiers EFFA_1 and EFFA_3 have negative polarity. FIG. 11(f) shows pixel design 1120 with the negative dot polarity pattern. For the negative dot polarity pattern, switching elements SE_1 and SE_3, color dots CD_1_1, CD_1_2, CD_3_1 and CD_3_2, and embedded fringe field amplifier EFFA_2 have negative polarity. However, switching element SE_2, color dots CD_2_1 and CD_2_2, and embedded fringe field amplifiers EFFA_1 and EFFA_3 have positive polarity. Pixel Design 1120 could also be modified to use neutral polarity for the embedded fringe field amplifiers.

In addition to the polarity changes, electrodes 1112, 1114, and 1116 may be modified as compared to pixel design 1110. Generally, electrode 1112 is coupled to color dot CD_1_2 of a pixel located above the current pixel in switching element point inversion driving scheme displays (See FIG. 11(g)). However in switching element column inversion driving scheme displays, electrode 1112 is coupled to color dot CD_2_1 of the current pixel (See FIG. 11(h)). However other embodiments of the present invention, in switching element column inversion driving scheme displays, electrode 1112 is coupled to color dot CD_3_2 of a pixel above and to the left of the current pixel. Generally, electrode 1114 is coupled to color dot CD_2_2 of a pixel located above the current pixel in switching element point inversion driving scheme displays (See FIG. 11(g)). However in switching element column inversion driving scheme displays, electrode 1114 is coupled to color dot CD_3_1 of the current pixel (See FIG. 11(h)). However other embodiments of the present invention, in switching element column inversion driving scheme displays, electrode 1114 is coupled to color dot CD_1_2 of a pixel above and to the left of the current pixel. Generally, electrode 1116 is coupled to color dot CD_3_2 of a pixel located above the current pixel in switching element point inversion driving scheme displays (See FIG. 11(g)). However in switching element column inversion driving scheme displays, electrode 1116 is coupled to color dot CD_1_1 of a pixel to the right of the current pixel (See FIG. 11(h). However in other embodiments of the present invention using switching element column inversion driving scheme displays, electrode 1116 is coupled to color dot CD_2_2 of a pixel above and to the left of the current pixel.

Figure 11G:
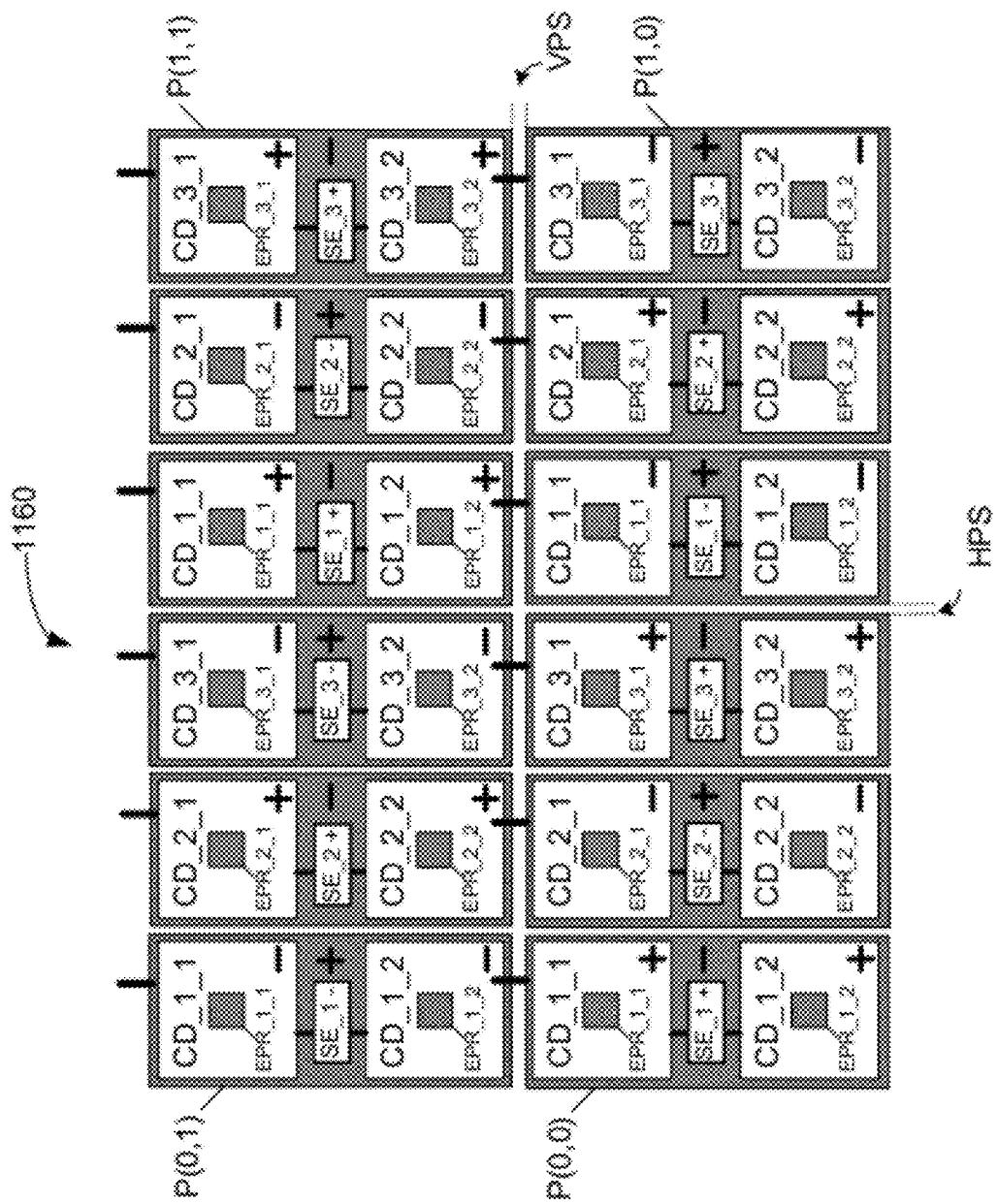
FIG. 11(g) illustrates a portion of a display in accordance with one embodiment of the present invention.

FIG. 11(g) shows a portion of display 1160 having pixels P(0, 0), P(1, 0), P(0, 1), and P(1, 1) of pixel design 1120. Display 1160 uses a switching element point inversion driving scheme. Display 1160 could have thousands of rows with thousand of pixels on each row. In display 1160, pixels on the same row are separated by a horizontal pixel distance HPS and pixels in adjacent rows are separated by a vertical pixel spacing VPS. The rows and columns would continue from the portion shown in FIG. 11(g) in the manner shown in FIG. 11(g). For clarity, the gate lines and source lines that control the switching elements are omitted in FIG. 11(g). In display 1160 the pixels are arranged so that pixels in a row alternate dot polarity patterns (positive or negative) and pixels in a column also alternate between positive and negative dot polarity pattern. Thus, pixels P(0, 0) and P(1, 1) have positive dot polarity pattern and pixels P(0, 1) and P(1, 0) have the negative dot polarity pattern. However, at the next frame the pixels will switch dot polarity patterns. Thus in general a pixel P(x, y) has a first dot polarity pattern when x+y is even and a second dot polarity pattern when x+y is odd.

Pixel design 1120 can also be used in displays using switching element column inversion driving scheme. FIG. 11(h) shows a portion of display 1180 having pixels P(0, 0), P(1, 0), P(0, 1), and P(1, 1) of pixel design 1120. Display 1180 could have thousands of rows with thousand of pixels on each row. In display 1180, pixels on the same row are separated by a horizontal pixel distance HPS and pixels in adjacent rows are separated by a vertical pixel spacing VPS. The rows and columns would continue from the portion shown in FIG. 11(h) in the manner shown in FIG. 11(h). For clarity, the gate lines and source lines that control the switching elements are omitted in FIG. 11(h). In display 1180 the pixels are arranged so that pixels in a row alternate dot polarity patterns (positive or negative) and pixels in a column have the same dot polarity pattern. Thus, pixels P(0, 0) and P(0, 1) have positive dot polarity pattern and pixels P(1, 0) and P(1, 1) have the negative dot polarity pattern. However, at the next frame the pixels will switch dot polarity patterns. Thus in general a pixel P(x, y) has a first dot polarity pattern when x is even and a second dot polarity pattern when x is odd.

The use of embedded fringe field amplifiers is not limited to pixel designs having embedded polarity regions. Furthermore, many embodiments of the present invention use multiple embedded fringe field amplifiers a pixel. For example, FIGS. 12(a) and 12(b) show different dot polarity patterns of a pixel design 1210 (labeled 1210+ and 1210−) that includes three embedded fringe field amplifiers but does not include embedded polarity regions in the color dots. Pixel design 1210 is often used in displays having a switching element point inversion driving scheme or switching element column inversion driving scheme. In actual operation a pixel will switch between a first dot polarity pattern and a second dot polarity pattern between each image frame.

Figure 1B:
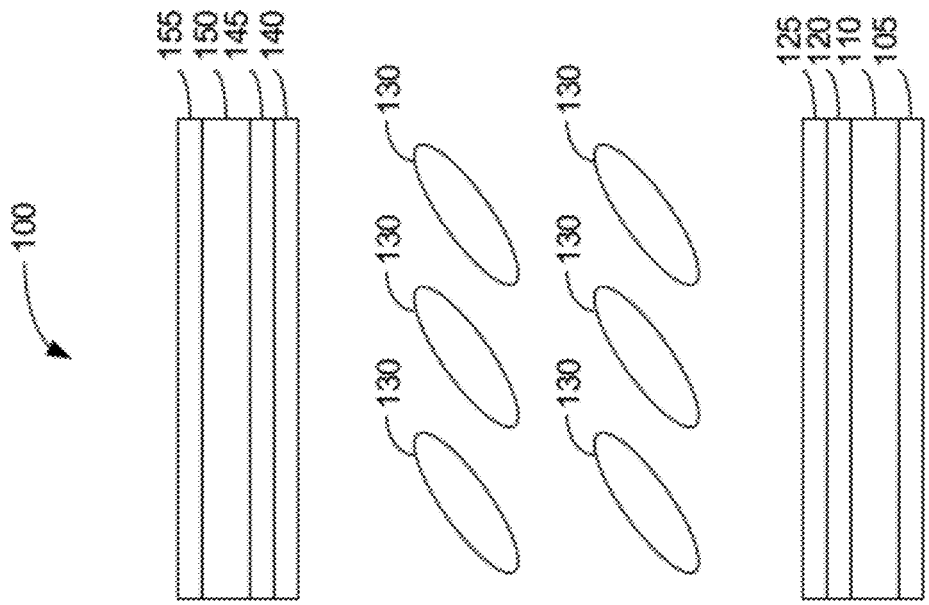
FIGS. 1(a)-1(c) are three illustrations of a pixel of a conventional single domain vertical alignment LCD.
Figure 1A:
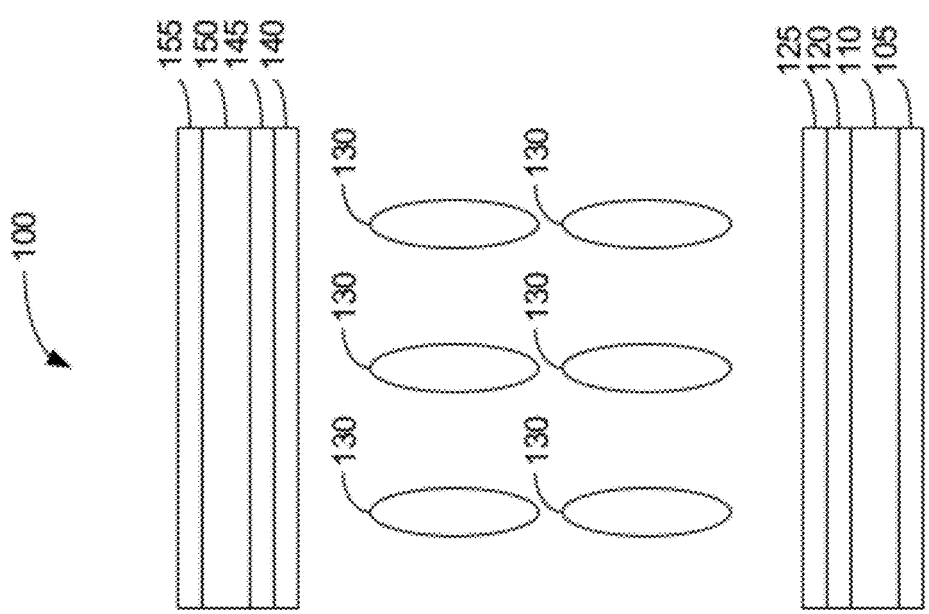
Figure 1C:
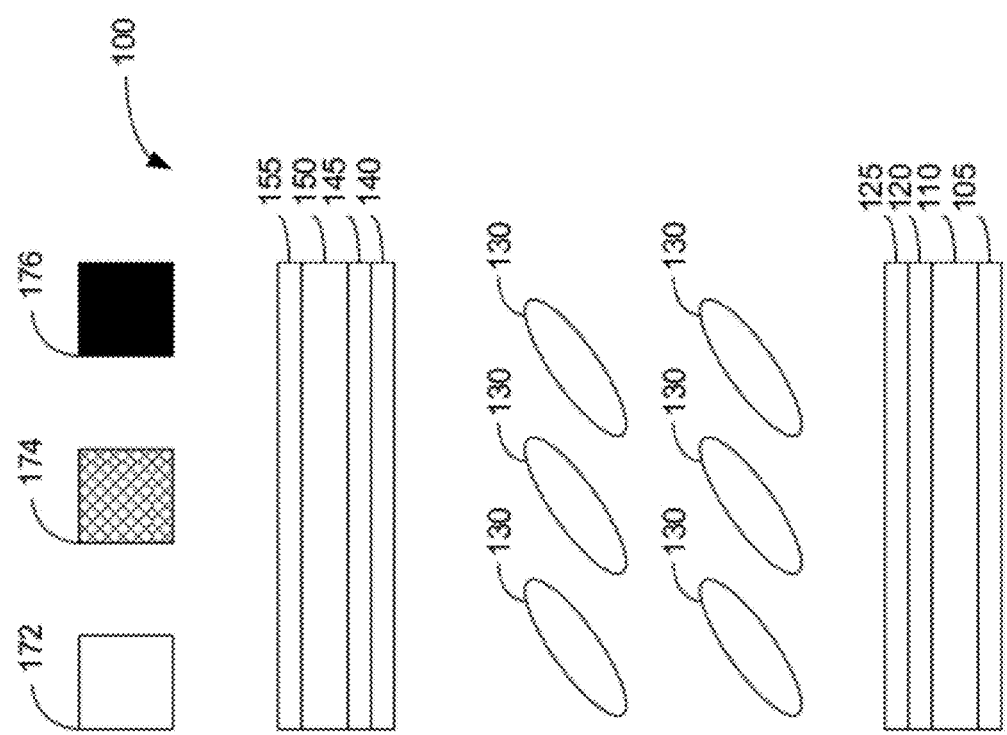
Figure 2:
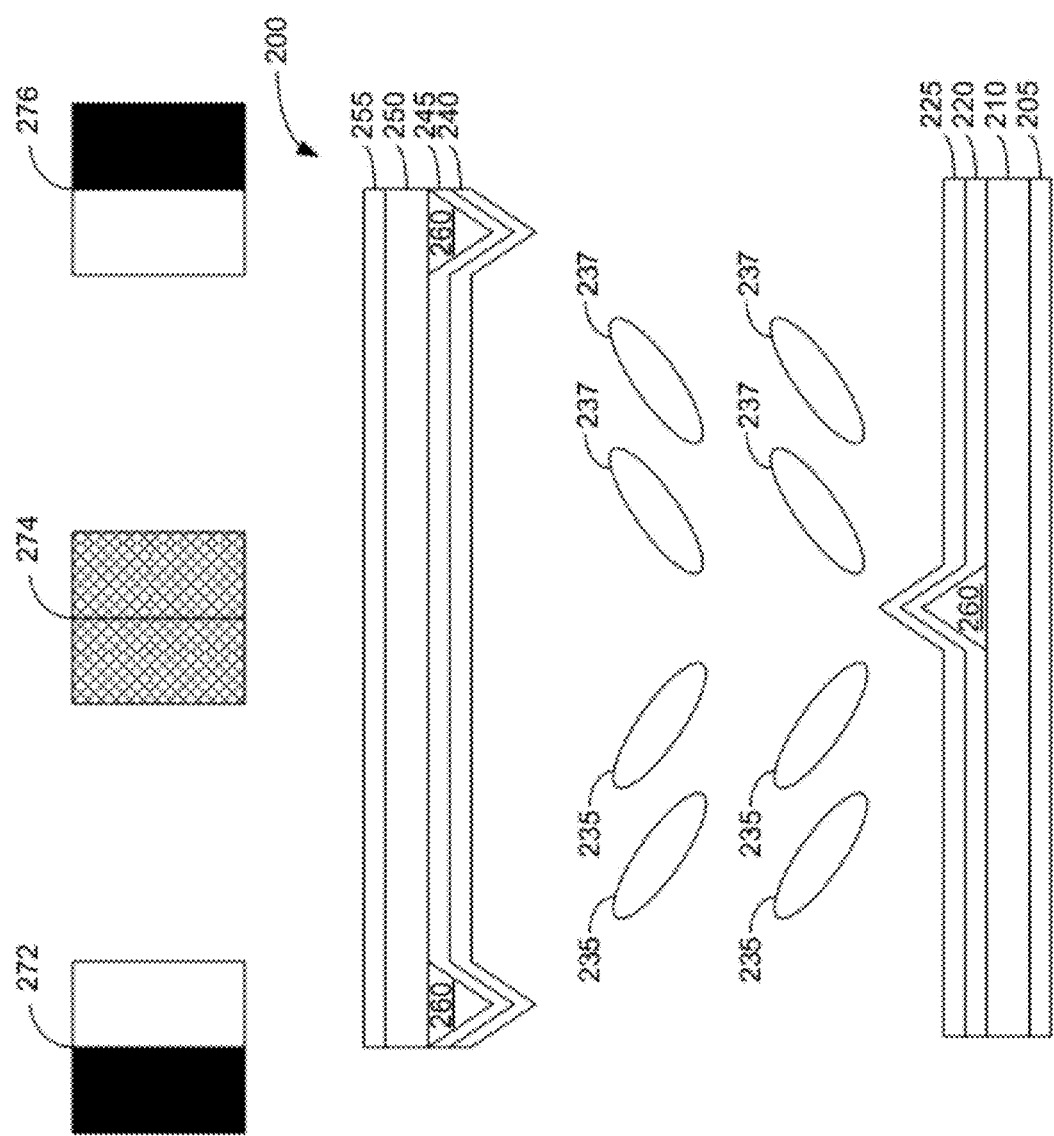
FIG. 2 is an illustration of a pixel of a conventional multi-domain vertical alignment LCD.
Figure 3B:
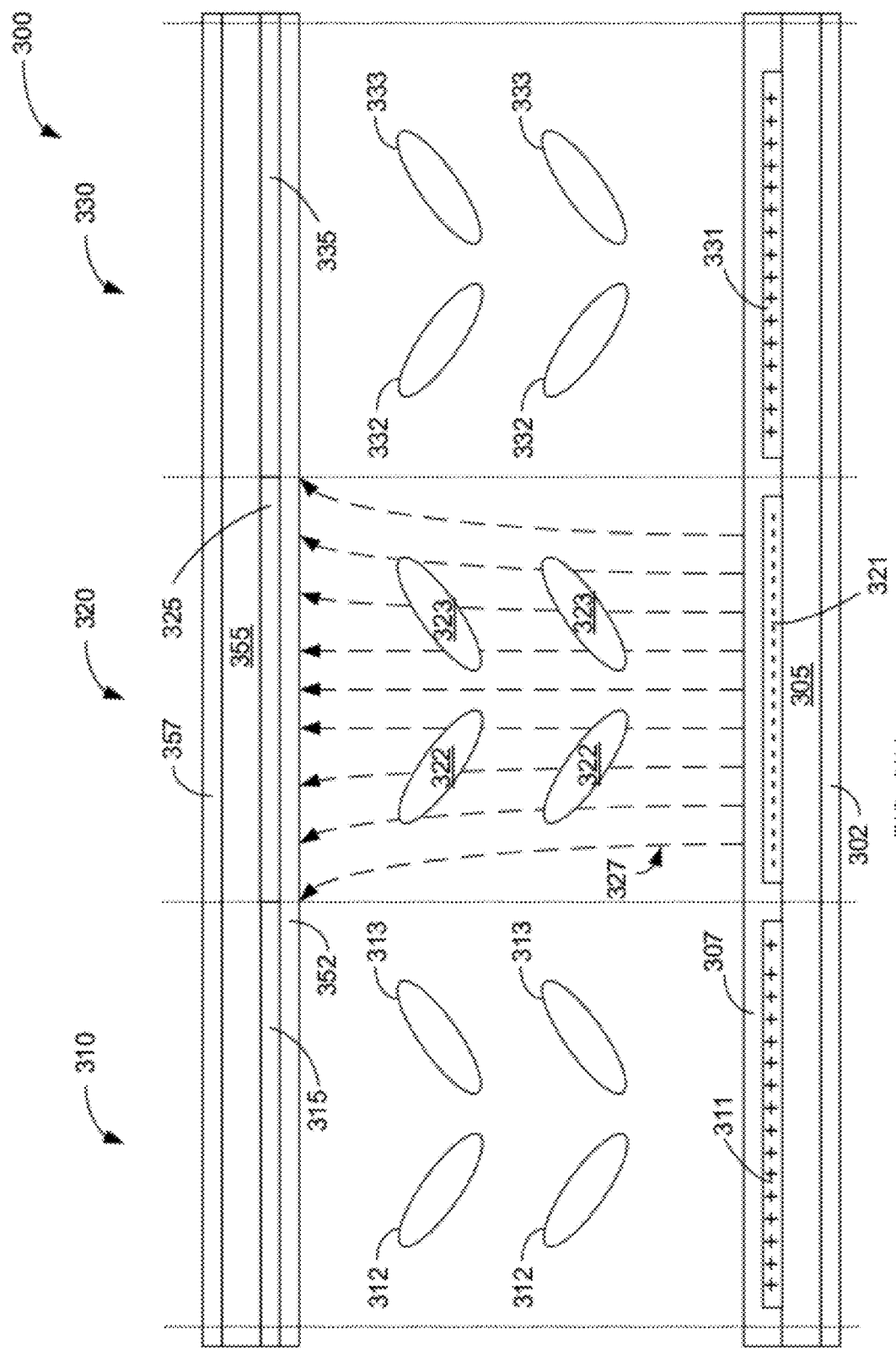

Pixel design 1210 has three color components CC_1, CC_2 and CC_3 (not labeled in FIGS. 12(a)-11(b)). Each of the three color components includes two color dots. For clarity, the color dots are referenced as CD_X_Y, where X is a color component (from 1 to 3 in FIGS. 12(a)-1(b)) and Y is a dot number (from 1 to 2 in FIGS. 12(a)-1(b)). Pixel design 1210 also includes a switching element for each color component (referenced as SE_1, SE_2, and SE_3) and an embedded fringe field amplifier for each color component (referenced as EFFA_1, EFFA_2, and EFFA_3). Switching elements SE_1, SE_2, and SE_3 are arranged in a row. Embedded fringe field amplifier EFFA_1, EFFA_2, and EFFA_3 are also arranged in a row.

First color component CC_1 of pixel design 1210 has two color dots CD_1_1 and CD_1_2. Color dots CD_1_1 and CD_1_2 form a column and are separated by a vertical dot pacing VDS1. In other words, color dots CD_1_1 and CD_1_2 are horizontally aligned and vertically separated by vertical dot spacing VDS1. Furthermore, color dots CD_1_1 and CD_1_2 are vertically offset by vertical dot offset VDO1 which is equal to vertical dot spacing VDS1 plus the color dot height CDH. Switching element SE_1 is located above color dots CD_1_1. Switching element SE_1 is coupled to the electrodes of color dots CD_1_1 and CD_1_2 to control the voltage polarity and voltage magnitude of color dots CD_1_1 and CD_1_2.

Similarly, second color component CC_2 of pixel design 1210 has two color dots CD_2_1 and CD_2_2. Color dots CD_2_1 and CD_2_2 form a second column and are separated by a vertical dot spacing VDS1. Thus, color dots CD_2_1 and CD_2_2 are horizontally aligned and vertically separated by vertical dot spacing VDS1. Switching element SE_2 is located above color dots CD_2_1. Switching element SE_2 is coupled to the electrodes of color dots CD_2_1 and CD_2_2 to control the voltage polarity and voltage magnitude of color dots CD_2_1 and CD_2_2. Second color component CC_2 is vertically aligned with first color component CC_1 and separated from color component CC_1 by a horizontal dot spacing HDS1, thus color components CC_2 and CC_1 are horizontally offset by a horizontal dot offset HDO1, which is equal to horizontal dot spacing HDS1 plus the color dot width CDW. Specifically with regards to the color dots, color dot CD_2_1 is vertically aligned with color dots CD_1_1 and horizontally separated by horizontal dot spacing HDS1. Similarly, color dot CD_2_2 is vertically aligned with color dots CD_2_1 and horizontally separated by horizontal dot spacing HDS1. Thus color dot CD_1_1 and color dot CD_2_1 form a first row of color dots and color dot CD_1_2 and color dot CD_2_2 form a second row of color dots.

Similarly, third color component CC_3 of pixel design 1210 has two color dots CD_3_1 and CD_3_2. Color dots CD_3_1 and CD_3_2 form a third column and are separated by a vertical dot spacing VDS1. Thus, color dots CD_3_1 and CD_3_2 are horizontally aligned and vertically separated by vertical dot spacing VDS1. Switching element SE_3 is located above color dot CD_3_1. Switching element SE_3 is coupled to the electrodes of color dots CD_3_1 and CD_3_2 to control the voltage polarity and voltage magnitude of color dots CD_3_1 and CD_3_2. Third color component CC_3 is vertically aligned with second color component CC_2 and separated from color component CC_2 by horizontal dot spacing HDS1, thus color components CC_3 and CC_2 are horizontally offset by a horizontal dot offset HDO1. Specifically with regards to the color dots, color dot CD_3_1 is vertically aligned with color dots CD_2_1 and horizontally separated by horizontal dot spacing HDS1. Similarly, color dot CD_3_2 is vertically aligned with color dots CD_2_2 and horizontally separated by horizontal dot spacing HDS1. Thus color dot CD_3_1 is on the first row of color dots and color dot CD_3_2 is on the second row of color dots.

For clarity, the color dots of pixel design 1210 are illustrated with color dots having the same color dot height CDH. However, some embodiments of the present invention may have color dots with different color dot heights. For example in one embodiment of the present invention that is a variant of pixel design 1210, color dots CD_1_1, CD_2_1 and CD_3_1 have a smaller color dot height than color dots CD_1_2, CD_2_2, and CD_3_2. Furthermore, in many embodiments of the present invention color dots can have different shapes.

Figure 12C:
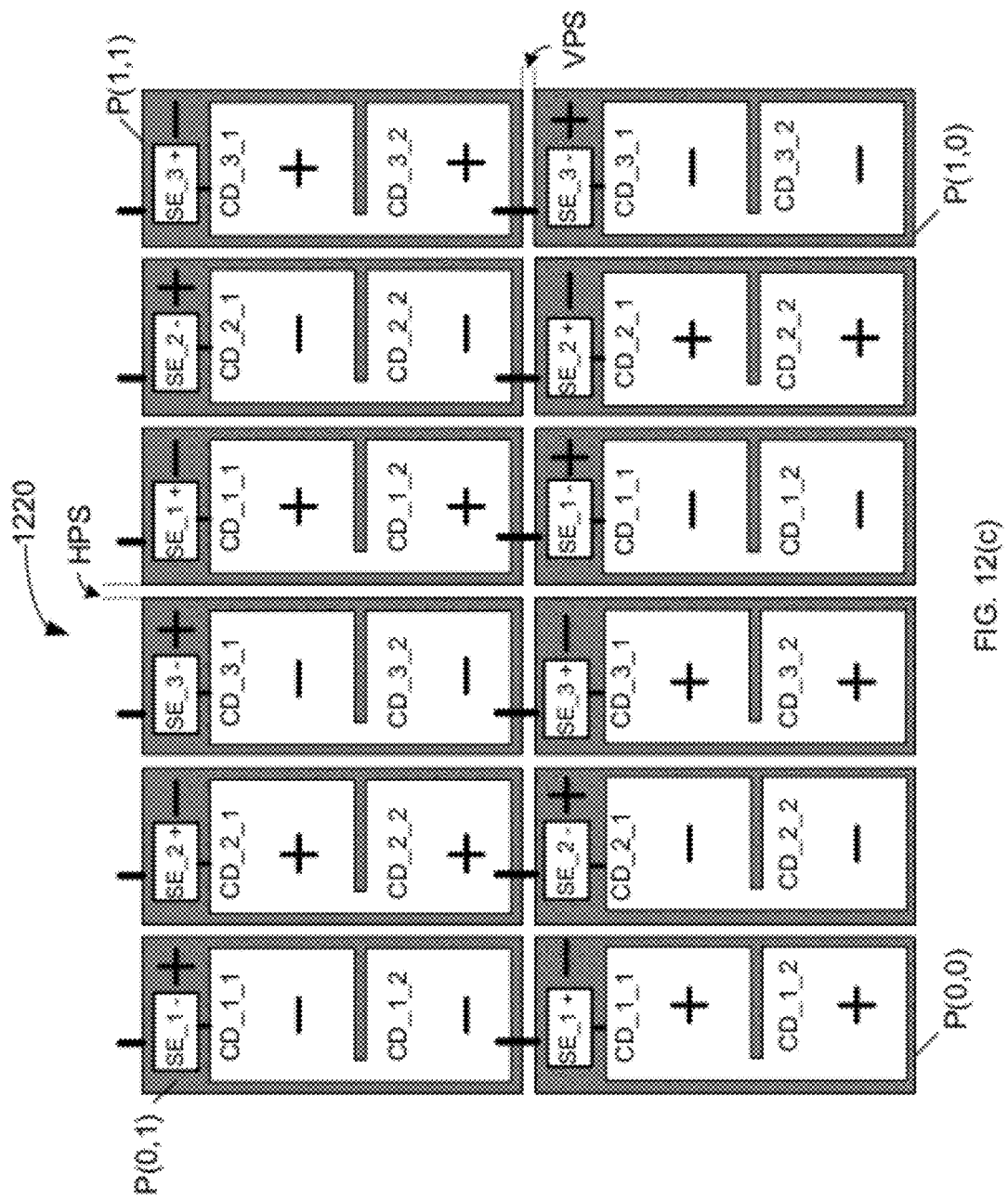
FIG. 12(c) illustrates a portion of a display in accordance with one embodiment of the present invention.
Figure 12D:
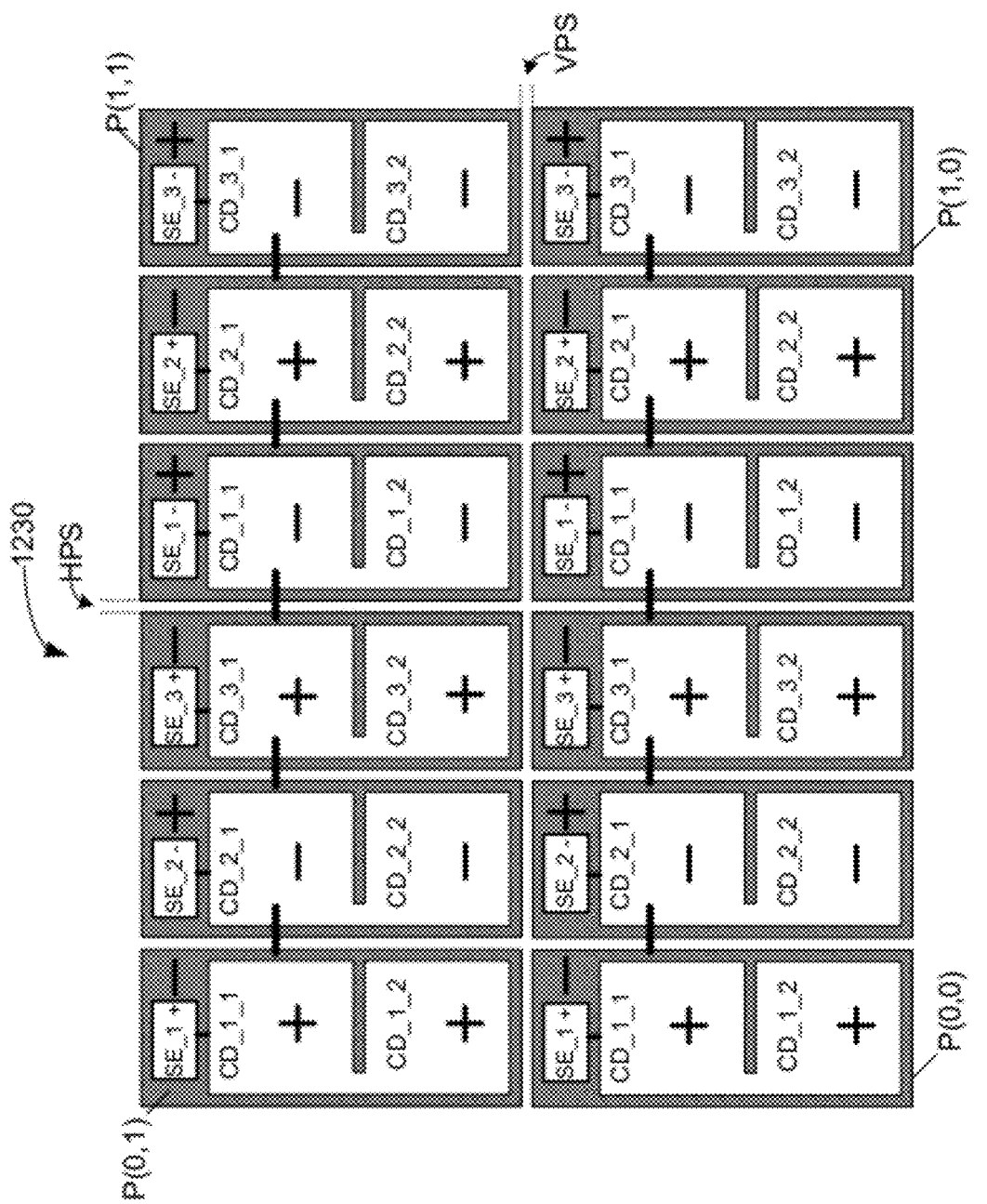
FIG. 12(d) illustrates a portion of a display in accordance with one embodiment of the present invention.

Pixel design 1210 also includes embedded fringe field amplifier EFFA_1, EFFA_2, and EFFA_3. As shown in FIG. 12(a), embedded fringe field amplifiers EFFA_1, EFFA_2, and EFFA_3 are placed behind the color dots of pixel design 1210. Specifically, embedded fringe field amplifier EFFA_1 is placed so that color dot CD_1_1 and color CD_1_2 and switching element SE_1 are in front of embedded fringe field amplifier EFFA_1. However, the embedded fringe field amplifier EFFA_1 extends past the left side and right side of color dots CD_1_1 and CD_1_2 by a horizontal embedded electrode extension distance HEEED1. Similarly, the embedded fringe field amplifier EFFA_1 extends past the top of switching element SE_1 and the bottom of color dot CD_1_2 by a vertical embedded electrode extension distance VEEED1. Thus, the edges of the color dot CD_1_1 and CD_1_2 are in front of portions of embedded fringe field amplifier EFFA_1. An electrode 1212 is used to couple embedded fringe field amplifier EFFA_1 to a voltage source. Generally, electrode 1212 is coupled to color dot CD_1_2 of a pixel located above the current pixel in switching element point inversion driving scheme displays (See FIG. 12(c)). However in switching element column inversion driving scheme displays, electrode 1212 is coupled to color dot CD_3_2 of a pixel above and to the left of the current pixel (See FIG. 12(d), pixel (1, 0)).

Similarly, embedded fringe field amplifier EFFA_2 is placed so that color dot CD_2_1 and color CD_2_2 and switching element SE_2 are in front of embedded fringe field amplifier EFFA_2. However, embedded fringe field amplifier EFFA_2 extends past the left side and right side of color dots CD_2_1 and CD_2_2 by a horizontal embedded electrode extension distance HEEED1. Similarly, the embedded fringe field amplifier EFFA_2 extends past the top of switching element SE_2 and the bottom of color dot CD_2_2 by a vertical embedded electrode extension distance VEEED1. Thus, the edges of the color dot CD_2_1 and CD_2_2 are in front of portions of embedded fringe field amplifier EFFA_2. Furthermore, embedded fringe field amplifier EFFA_2 is vertically aligned with embedded fringe field amplifier EFFA_1 and separated from embedded fringe field amplifier EFFA_1 by a horizontal embedded electrode spacing HEES1. An electrode 1214 is used to couple embedded fringe field amplifier EFFA_1 to a voltage source. Generally, electrode 1214 is coupled to color dot CD_2_2 of a pixel located above the current pixel in switching element point inversion driving scheme displays (See FIG. 12(c)). However in switching element column inversion driving scheme displays, electrode 1214 is coupled to color dot CD_1_2 of a pixel above the current pixel (See FIG. 12(d), pixel (1, 0)).

Similarly, embedded fringe field amplifier EFFA_3 is placed so that color dot CD_3_1 and color CD_3_2 and switching element SE_3 are in front of embedded fringe field amplifier EFFA_3. However, embedded fringe field amplifier EFFA_3 extends past the left side and right side of color dots CD_3_1 and CD_3_2 by a horizontal embedded electrode extension distance HEEED1. Similarly, the embedded fringe field amplifier EFFA_3 extends past the top of switching element SE_3 and the bottom of color dot CD_3_2 by a vertical embedded electrode extension distance VEEED1. Thus, the edges of the color dot CD_3_1 and CD_3_2 are in front of portions of embedded fringe field amplifier EFFA_3. Furthermore, embedded fringe field amplifier EFFA_3 is vertically aligned with embedded fringe field amplifier EFFA_2 and separated from embedded fringe field amplifier EFFA_2 by a horizontal embedded electrode spacing HEES1. An electrode 1216 is used to couple embedded fringe field amplifier EFFA_1 to a voltage source. Generally, electrode 1216 is coupled to color dot CD_3_2 of a pixel located above the current pixel in switching element point inversion driving scheme displays (See FIG. 12(c)). However in switching element column inversion driving scheme displays, electrode 1216 is coupled to color dot CD_2_2 of a pixel above the current pixel (See FIG. 12(d), pixel (1, 0)).

The polarities of the color dots, embedded fringe field amplifiers regions, and switching elements are shown using "+" and "−" signs. Thus, in FIG. 12(a) which shows the positive dot polarity pattern of pixel design 1210+, switching elements SE_1 and SE_3, color dots CD_1_1, CD_1_2, CD_3_1 and CD_3_2, and Embedded fringe field amplifier EFFA_2 have positive polarity. However, switching element SE_2, color dots CD_2_1 and CD_2_2, and Embedded fringe field amplifiers EFFA_1 and EFFA_3 have negative polarity. FIG. 10(b) shows pixel design 1010 with the negative dot polarity pattern. For the negative dot polarity pattern, switching elements SE_1 and SE_3, color dots CD_1_1, CD_1_2, CD_3_1 and CD_3_2, and Embedded fringe field amplifier EFFA_2 have negative polarity. However, switching element SE_2, color dots CD_2_1 and CD_2_2, and Embedded fringe field amplifiers EFFA_1 and EFFA_3 have positive polarity. Other embodiments of the present invention may use a neutral polarity for embedded fringe field amplifiers EFFA_1, EFFA_2, and EFFA_3. For example, in a particular embodiment of the present invention, embedded fringe field amplifiers EFFA_1, EFFA_2, and EFFA_3 is coupled to common voltage V_com.

FIG. 12(c) shows a portion of display 1220 having pixels P(0, 0), P(1, 0), P(0, 1), and P(1, 1) of pixel design 1010. Display 1020 uses a switching element point inversion driving scheme. Display 1220 could have thousands of rows with thousand of pixels on each row. In display 1220, pixels on the same row are separated by a horizontal pixel distance HPS and pixels in adjacent rows are separated by a vertical pixel spacing VPS. The rows and columns would continue from the portion shown in FIG. 12(c) in the manner shown in FIG. 12(c). For clarity, the gate lines and source lines that control the switching elements are omitted in FIG. 12(c). In display 1220 the pixels are arranged so that pixels in a row alternate dot polarity patterns (positive or negative) and pixels in a column also alternate between positive and negative dot polarity pattern. Thus, pixels P(0, 0) and P(1, 1) have positive dot polarity pattern and pixels P(0, 1) and P(1, 0) have the negative dot polarity pattern. However, at the next frame the pixels will switch dot polarity patterns. Thus in general a pixel P(x, y) has a first dot polarity pattern when x+y is even and a second dot polarity pattern when x+y is odd.

Pixel design 1210 can also be used in displays using switching element column inversion driving scheme. FIG. 12(*d*) shows a portion of display 1230 having pixels P(0, 0), P(1, 0), P(0, 1), and P(1, 1) of pixel design 1210. Display 1230 could have thousands of rows with thousand of pixels on each row. In display 1030, pixels on the same row are separated by a horizontal pixel distance HPS and pixels in adjacent rows are separated by a vertical pixel spacing VPS. The rows and columns would continue from the portion shown in FIG. 12(*d*) in the manner shown in FIG. 12(*d*). For clarity, the gate lines and source lines that control the switching elements are omitted in FIG. 12(*d*). In display 1230 the pixels are arranged so that pixels in a row alternate dot polarity patterns (positive or negative) and pixels in a column have the same dot polarity pattern. Thus, pixels P(0, 0) and P(0, 1) have positive dot polarity pattern and pixels P(1, 0) and P(1, 1) have the negative dot polarity pattern. However, at the next frame the pixels will switch dot polarity patterns. Thus in general a pixel P(x, y) has a first dot polarity pattern when x is even and a second dot polarity pattern when x is odd.

Figures 13A, 13B:
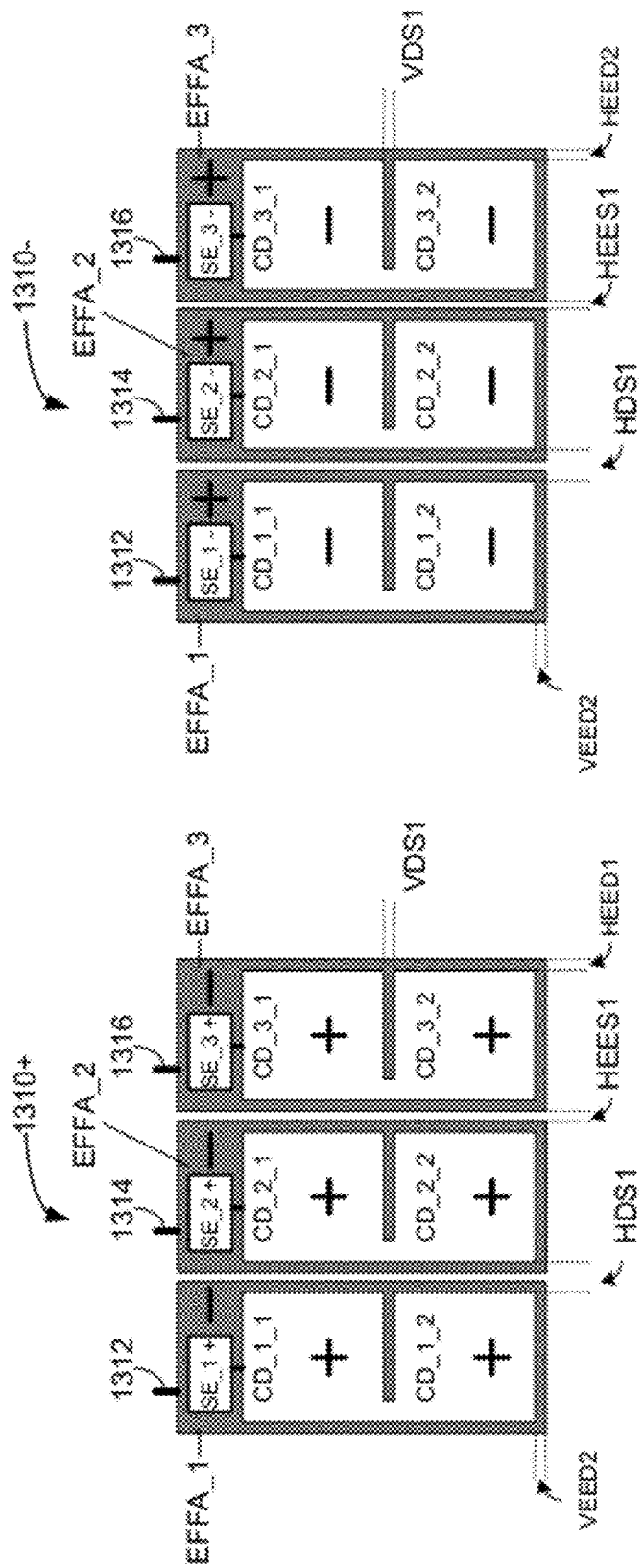
FIGS. 13(a)-13(b) illustrate a pixel design in accordance with one embodiment of the present invention.
Figure 13C:
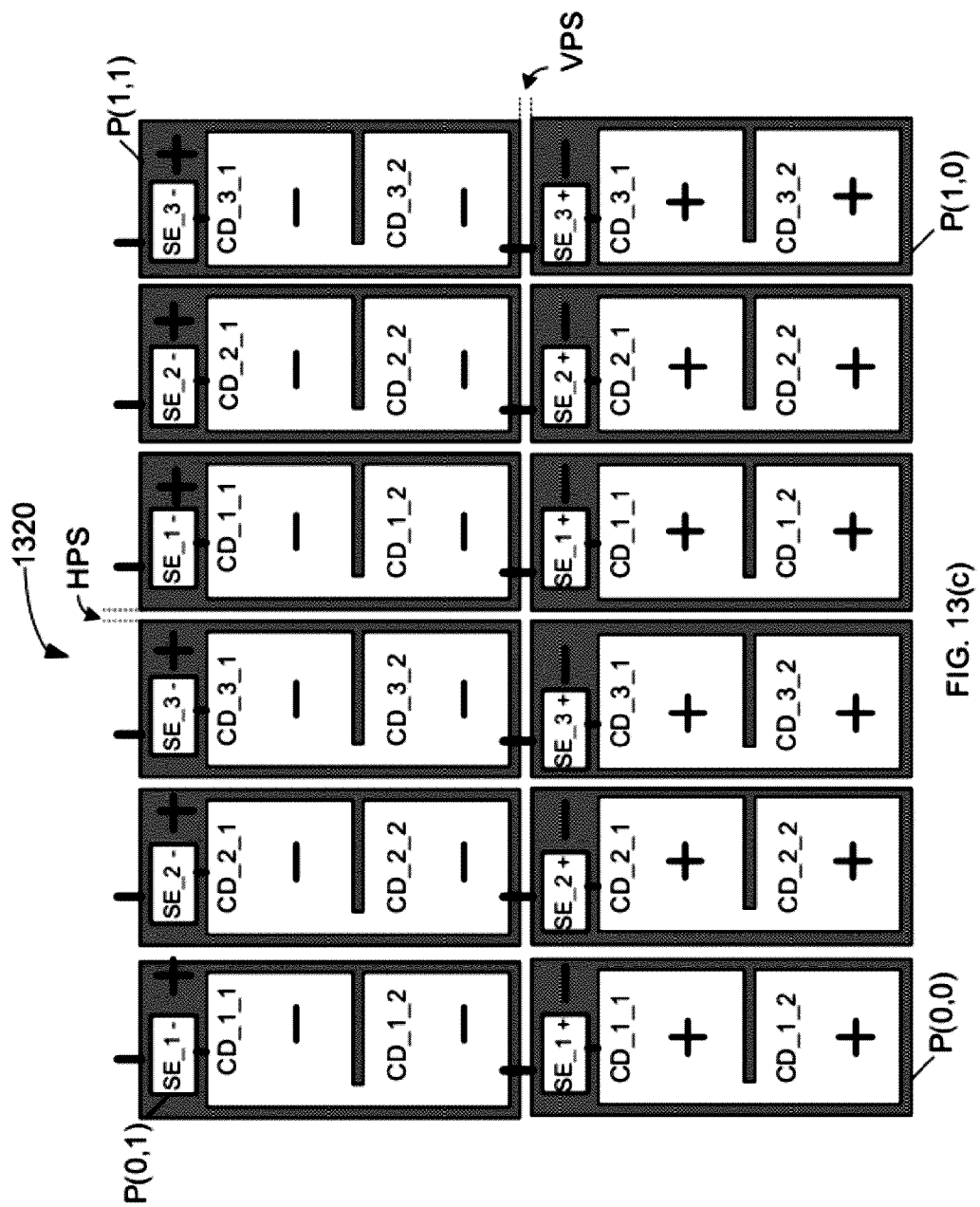
FIG. 13(c) illustrates a portion of a display in accordance with one embodiment of the present invention.

FIGS. 13(*a*) and 13(*b*) show different dot polarity patterns of a pixel design 1310 (labeled 1310+ and 1310−) that can be used with displays having switching element row inversion driving schemes. The layout of pixel design 1310 is the same as pixel design 1210, therefore the description is not repeated. However, the polarity of embedded fringe field amplifier EFFA_2, switching element SE_2 and color dots CD_2_1 and CD_2_2 are reversed in pixel design 1310 as compared to pixel design 1210. Thus, in FIG. 1010(*a*), which shows the positive dot polarity pattern of pixel design 1310+, switching elements SE_1, SE_2 and SE_3, color dots CD_1_1, CD_1_2, CD_2_1, CD_2_2, CD_3_1 and CD_3_2 have positive polarity. However, embedded fringe field amplifiers EFFA_1, EFFA_2, and EFFA_3 have negative polarity. FIG. 13(*b*) shows pixel design 1310 with the negative dot polarity pattern. For the negative dot polarity pattern, switching elements SE_1, SE_2 and SE_3, color dots CD_1_1, CD_1_2, CD_2_1, CD_2_2, CD_3_1 and CD_3_2 have negative polarity. However, embedded fringe field amplifiers EFFA_1, EFFA_2, and EFFA_3 have positive polarity. In another embodiments of the present invention, embedded fringe field amplifiers EFFA_1, EFFA_2, and EFFA_3 have neutral polarity.

FIG. 13(*c*) shows a portion of display 1320 having pixels P(0, 0), P(1, 0), P(0, 1), and P(1, 1) of pixel design 1310. Display 1320 uses a switching element row inversion driving scheme. Display 1320 could have thousands of rows with thousand of pixels on each row. In display 1320, pixels on the same row are separated by a horizontal pixel distance HPS and pixels in adjacent rows are separated by a vertical pixel spacing VPS. The rows and columns would continue from the portion shown in FIG. 13(*c*) in the manner shown in FIG. 13(*c*). For clarity, the gate lines and source lines that control the switching elements are omitted in FIG. 13(*c*). The pixels of display 1320 are arranged so that all pixels in a row have the same dot polarity pattern (positive or negative) and each successive row should alternate between positive and negative dot polarity pattern. Thus, pixels P(0, 0) and P(1, 0) in the first row (i.e. row 0) have the positive dot polarity pattern and pixels P(0, 1) and P(1, 1) in the second row (i.e. row 1) have the negative dot polarity pattern. However, at the next frame the pixels will switch dot polarity patterns. Thus in general a pixel P(x, y) has a first dot polarity pattern when y is even and a second dot polarity pattern when y is odd.

One disadvantage of including embedded fringe field amplifiers is that extra energy is required to polarize the embedded fringe field amplifiers. This extra energy requirement is proportional to the size of the embedded fringe field amplifiers. Therefore, many embodiments of the present invention replace the rectangular embedded fringe field amplifiers with embedded fringe field amplifiers having a smaller area. Because the embedded fringe field amplifiers are used to amplify fringe fields at the edges of the color dots, the portions of the embedded fringe field amplifiers that produces the most amplification of the fringe fields are the portions near the edge of the color dots. Thus, the portions of embedded fringe field amplifiers behind the middle of the color dots can be eliminated. Thus for example, one embodiment of the present invention uses the embedded fringe field amplifiers of FIG. 14 in place of the rectangular embedded fringe field amplifiers shown above.

Figure 14:
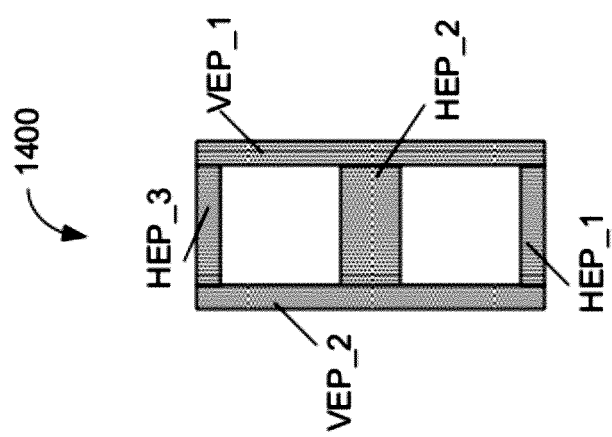
FIG. 14 illustrates an embedded fringe field amplifier.

FIG. 14 shows an embedded fringe field amplifier 1400. For clarity embedded fringe field amplifiers 1400 is conceptually divided into vertical embedded portions and horizontal embedded portions. Specifically embedded fringe field amplifier 1400 includes two vertical embedded portions VEP_1 and VEP_2 and three horizontal embedded portions HEP_1, HEP_2, and HEP_3. The location of the vertical embedded portions and horizontal embedded portions are described for the situation where embedded fringe field amplifier 1400 is being used in place of embedded fringe field amplifier EFFA_1 of pixel design 13(*a*). Vertical embedded portions VEP_1 is located behind the right edge of color dots CD_1_1 and CD_1_2 (FIG. 13(*a*)). Vertical embedded portion VEP_2 is located behind the left edge of color dots CD_1_1 and CD_1_2 (FIG. 13(*a*)). Horizontal embedded portion HEP_1 is located behind the bottom edge of color dot CD_1_2; horizontal embedded portion HEP_2 is located behind the upper edge of color dot CD_1_2 and the lower edge of color dot CD_1_1; and horizontal embedded portion HEP_3 is located behind the upper edge of color dot CD_1_1. As illustrated in FIG. 14, horizontal embedded portion HEP_2 is wider than horizontal embedded portions HEP_1 and HEP_3. The additional width of horizontal embedded portion HEP_2 serves two purposes. First, horizontal embedded portion HEP_2 is wider simply because it located behind both behind the upper edge of color dot CD_1_2 and the lower edge of color dot CD_1_1 to amplify the fringe field of both color dots CD_1_1 and CD_1-2. Secondly, horizontal embedded portion HEP_2 can be used as a storage capacitor for color dots CD_1_1 and CD_1_2. A larger area provides greater charge storing capacity. In a particular embodiment of the present invention, color dot CD_1_1 has a width (horizontal) of 28 micrometers and a length (vertical) of 30 micrometers, color dot cd_1_2 has a width of 28 micrometers and a height of 30 micrometers, horizontal embedded portion HEP_1 has a width of 30 micrometers and a height of 3 micrometers; horizontal embedded portion HEP_2 has a width of 28 micrometers and a height of 5 micrometers; horizontal embedded portion HEP_3 has a width of 15 micrometers and a height of 3 micrometers; vertical embedded portion VEP_1 has a width of 3 micrometers and a height of 95 micrometers; and vertical embedded portion VEP_2 has a width of 3 micrometers and a height of 80 micrometers.

Another advantage of using embedded fringe field amplifiers that only go along the edges of the color dot is that the embedded fringe field amplifiers do not need to form using a transparent conductive material. Thus, non-transparent material such as the metal layers that are used for other parts of the display (e.g. switching elements, source lines, and data lines) can be used to form embedded fringe field amplifiers 1400 (as well as other embedded fringe field amplifiers described below). Thus, embodiments of the present invention can be made using a single ITO layer rather than two ITO layers. Reducing the number of layers reduces the cost of manufacturing a display because the number of process steps and the number of masks is reduced.

Figure 15:
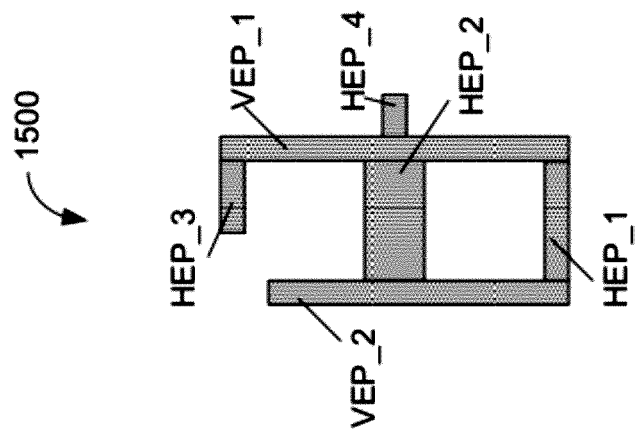
FIG. 15 illustrates an embedded fringe field amplifier.

As explained above, in some embodiments of the present invention, the layer used to form embedded fringe field amplifier is also used within a switching element. Thus for these embodiments, the embedded fringe field amplifiers do not extend to the switching elements. FIG. 15 shows an embedded fringe field amplifier 1500, which does not extend to the switching elements. For clarity embedded fringe field amplifiers 1500 is conceptually divided into vertical embedded portions and horizontal embedded portions. Specifically embedded fringe field amplifier 1500 includes two vertical embedded portions VEP_1 and VEP_2, three horizontal embedded portions HEP_1, HEP_2, and HEP_3, and an optional fourth horizontal portion HEP_4. The location of the vertical embedded portions and horizontal embedded portions are described for the situation where embedded fringe field amplifier 1500 is being used in place of embedded fringe field amplifier EFFA_1 of pixel design 13(*a*). Vertical embedded portions VEP_1 is located behind the right edge of color dots CD_1_1 and CD_1_2 (FIG. 13(*a*)). Vertical embedded portion VEP_2 is located behind the left edge of color dots CD_1_2 and behind part of the left edge of color dot CD_1_1 (FIG. 13(*a*)). Specifically, vertical embedded portion VEP_2 does not extend to the top of left corner of color dot CD_1_1 where switching element SE_1 is located. Horizontal embedded portion HEP_1 is located behind the bottom edge of color dot CD_1_2; horizontal embedded portion HEP_2 is located behind the upper edge of color dot CD_1_2 and the lower edge of color dot CD_1_1; and horizontal embedded portion HEP_3 is located behind part of the upper edge of color dot CD_1_1. Specifically, horizontal embedded portion HEP_3 does not extend to the top left corner of color dot CD_1_1 where switching element SE_1 is located. For the same reasons explained above for horizontal embedded portion HEP_3 of embedded fringe field amplifier 1400, horizontal embedded portion HEP_2 of embedded fringe field amplifier 1500 is wider than horizontal embedded portions HEP_1 and HEP_3. Embedded fringe field amplifier 1500 is shown with the optional horizontal embedded portion HEP_4 which extends from the right edge of vertical embedded portion VEP_1 a small distance to the right. Vertically, horizontal embedded portion HEP_4 is centered on horizontal embedded portion HEP_2. Horizontal embedded portion HEP_4 is used to couple a first embedded fringe field amplifier to a second embedded fringe field amplifier to the right of the first embedded fringe field amplifier. Thus, horizontal embedded portion HEP_4 is only used when the first embedded fringe field amplifier and the second embedded fringe field amplifier are to have the same polarity. For example, in pixels that use a neutral polarity for the embedded fringe field amplifiers, including horizontal embedded portion HEP_4 would make it easy to provide neutral polarity to all of the embedded fringe field amplifiers. In a particular embodiment of the present invention, color dot CD_1_1 has a width (horizontal) of 28 micrometers and a length (vertical) of 30 micrometers, color dot cd_1_2 has a width of 28 micrometers and a height of 30 micrometers, horizontal embedded portion HEP_1 has a width of 28 micrometers and a height of 3 micrometers; horizontal embedded portion HEP_2 has a width of 28 micrometers and a height of 5 micrometers; horizontal embedded portion HEP_3 has a width of 15 micrometers and a height of 3 micrometers; horizontal embedded portion HEP_4 has a width of 15 micrometers and a height of 12 micrometers; vertical embedded portion VEP_1 has a width of 3 micrometers and a height of 95 micrometers; and vertical embedded portion VEP_2 has a width of 3 micrometers and a height of 80 micrometers.

Figure 16:
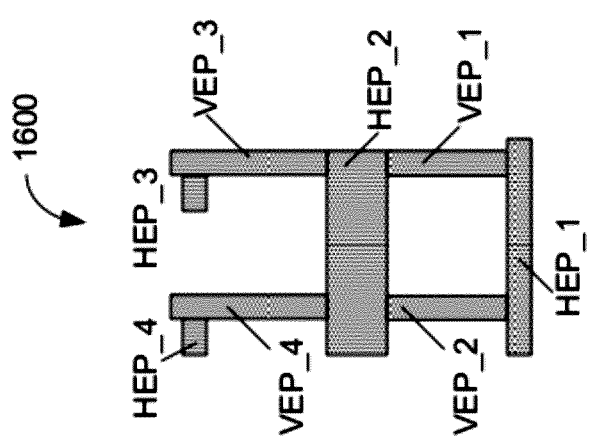
FIG. 16 illustrates an embedded fringe field amplifier.
Figure 17:
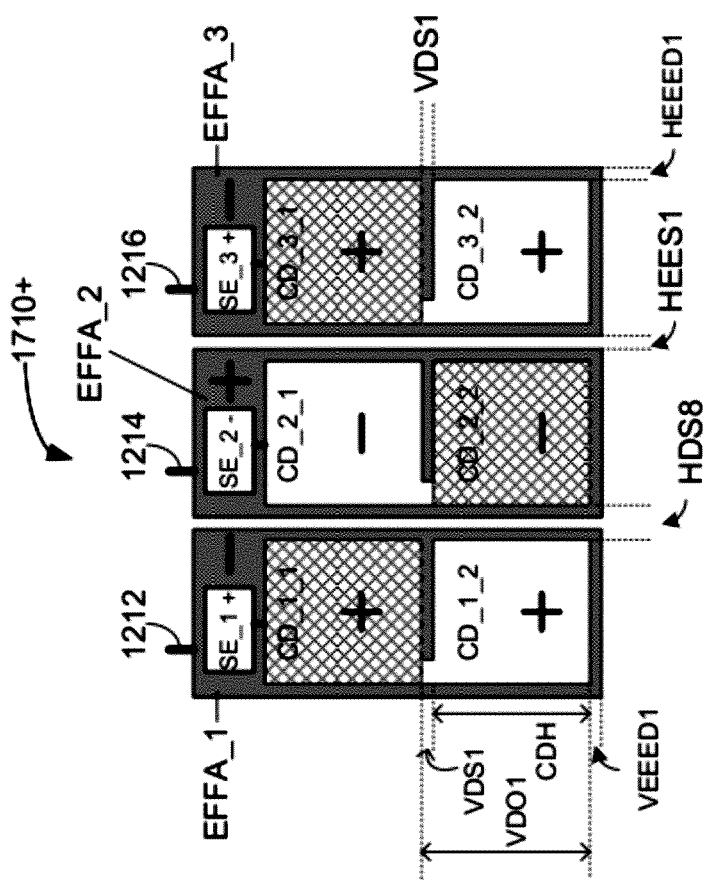
FIG. 17 illustrates a transflective pixel design in accordance with one embodiment of the present invention.

In addition to amplifying fringe fields, embedded fringe field amplifiers can also be used to improve cell gap uniformity and to reduce liquid crystal influence of other parts of the display such as photo spacers. FIG. 16 shows an embedded fringe field amplifier 1600 in accordance with another embodiment of the present invention that also improves cell gap uniformity and reduces the influence of photo spacers on the liquid crystals. For clarity embedded fringe field amplifiers 1600 is conceptually divided into vertical embedded portions and horizontal embedded portions. Specifically embedded fringe field amplifier 1600 includes four vertical embedded portions VEP_1, VEP_2, VEP_3, VEP_4 and four horizontal embedded portions HEP_1, HEP_2, HEP_3, and HEP_4. The location of the vertical embedded portions and horizontal embedded portions are described for the situation where embedded fringe field amplifier 1500 is being used in place of embedded fringe field amplifier EFFA_1 of pixel design 13(*a*). Vertical embedded portions VEP_1 is located behind the right edge of color dots CD_1_2 (FIG. 13(*a*)). Vertical embedded portion VEP_2 is located behind the left edge of color dots CD_1_2 (FIG. 13(*a*)). Vertical embedded portions VEP_3 is located behind the right edge of color dots CD_1_1 (FIG. 13(*a*)). Vertical embedded portion VEP_4 is located behind the left edge of color dots CD_1_1 (FIG. 13(*a*)). Horizontal embedded portion HEP_1 is located behind the bottom edge of color dot CD_1_2 and also extends slightly to the right of vertical embedded portion VEP_1 and slightly to the left of vertical extended portion VEP_2. The portions of horizontal embedded portion HEP_1 extending beyond vertical embedded portions beyond vertical embedded portion VEP1 and VEP2 increases cell gap uniformity. Horizontal embedded portion HEP_2 is located behind the upper edge of color dot CD_1_2 and the lower edge of color dot CD_1_1. Horizontal embedded portion HEP_2 extends to the left of vertical embedded portions VEP_2 and VEP_4 to improve cell gap uniformity. Horizontal embedded portion HEP_3 is located behind part of the upper edge of color dot CD_1_1. Specifically, horizontal embedded portion HEP_3 does not extend to the top left corner of color dot CD_1_1 where switching element SE_1 is located. Horizontal embedded portion HEP_4, which is included to improve cell gap uniformity, extends to the left of vertical embedded portion VEP_4 and is approximately vertically aligned with horizontal embedded portion HEP_3. For the same reasons explained above for horizontal embedded portion HEP_2 of embedded fringe field amplifier 1400, horizontal embedded portion HEP_2 of embedded fringe field amplifier 1600 is wider than horizontal embedded portions HEP_1, HEP_3, HEP_4. In a particular embodiment of the present invention, color dot CD_1_1 has a width (horizontal) of 28 micrometers and a length (vertical) of 30 micrometers, color dot cd_1_2 has a width of 28 micrometers and a height of 30 micrometers, horizontal embedded portion HEP_1 has a width of 32 micrometers and a height of 3 micrometers;

horizontal embedded portion HEP_2 has a width of 32 micrometers and a height of 5 micrometers; horizontal embedded portion HEP_3 has a width of 15 micrometers and a height of 3 micrometers; horizontal embedded portion HEP_4 has a width of 15 micrometers and a height of 3 micrometers; vertical embedded portion VEP_1 has a width of 3 micrometers and a height of 28 micrometers; vertical embedded portion VEP_2 has a width of 3 micrometers and a height of 28 micrometers; vertical embedded portion VEP_3 has a width of 3 micrometers and a height of 28 micrometers; vertical embedded portion VEP_4 has a width of 3 micrometers and a height of 28 micrometers;

The pixel designs described above can also be modified for use in transflective displays, which provide better performance in bright settings, such as outdoors on a sunny day. In accordance with some embodiments of the present invention, a subset of the color dots are made with a reflective material rather than a transparent material. FIG. 17 shows a pixel design 1710 that is designed for transflective display. Pixel design 1710 is almost identical to pixel design 1210. Therefore, on the differences are described. Specifically, in pixel design 1210, color dots CD_1_1, CD_2_2, and CD_3_1 are formed reflective color dots, as illustrated by using hashing in color dots CD_1_1, CD_2_2, and CD_3_3. Reflective color dots use a reflective material such as aluminum instead of a transparent material. The other color dots, the switching elements, the embedded polarity regions are otherwise identical to pixel design 1210, including the polarity of the polarized components. Thus pixel design 1710 can be used in the various displays described above that use pixel design 1210. In other embodiments of the present invention, a different subset of color dots is selected to be reflective color dots, For example, color dots CD_1_2, CD_2_1, and color dots CD_3_2 could be reflective color dots while color dots CD_1_1, CD_2_2, and CD_3_1 could be transmissive color dots. In general, the reflective color dots should be dispersed evenly throughout a display to provide uniform performance across the display. Similarly, other pixel designs described above can also be modified to use reflective color dots.

Figure 18:
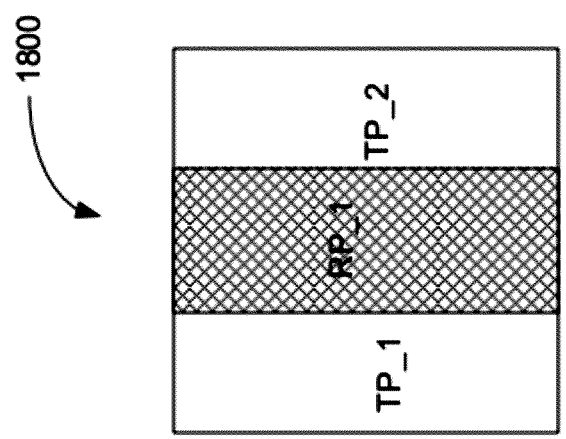
FIG. 18 illustrates a transflective color dot in accordance with one embodiment of the present invention.

FIG. 18 illustrates a transflective color dot 1800 in accordance with one embodiments of the present invention. Transflective color dots can be used in place of the normal transmissive color dots to convert a normal transmissive display into a transflective display. Thus, the transflective color dots described herein could be used to modify any of the pixel designs described above. Specifically, transflective color dot 1800 includes two rectangular transmissive portions TP_1 and TP_2 separated by a reflective portion RP_1. For clarity, reflective portion RP_1 is drawn with hashing. Transmissive portions are made with a transparent conductive material such as ITO. Reflective portions are made with a reflective conductive material, such as Aluminum. In some embodiments of the present invention, transparent portions TP_1 and TP_2 and reflective portions RP_1 are the same size. In other embodiments of the present invention reflective portion RP_1 is larger than transparent portions TP_1 and TP_2. In other embodiments of the present invention, other transflective color dots are used. Generally, a transflective color dot will have one or more transparent portions and one or more reflective portions. The ratio of the area of the transparent portions and the reflective portions generally vary between 3:1 and 1:1. Generally, a higher ratio of reflective area provides better performance when ambient lightning is bright such as in outdoor settings during daytime.

Other modification to displays using reflective color dots or transflective color dots can be made to improve the performance of the display. For example, the color filter over reflective color dots and reflective portions of transflective color dots can be reduced because the reflective light passes through the color filter twice (once on the way to the reflective color dot and once on the way out back to the viewer of the display). For example, in one embodiment of the present invention, the thickness of the color filter over a reflective color dot is only half the thickness of the color filter over a transmissive color dot. In other embodiments of the present invention the color filter over reflective color dots (or reflective portions of transflective color dots are reduced more than 50% to improve brightness.

In the various embodiments of the present invention, novel structures and methods have been described for creating a multi-domain vertical alignment liquid crystal display without the use of physical features on the substrate. The various embodiments of the structures and methods of this invention that are described above are illustrative only of the principles of this invention and are not intended to limit the scope of the invention to the particular embodiment described. For example, in view of this disclosure those skilled in the art can define other pixel definitions, embedded polarity regions, embedded fringe field amplifiers, field reduction layers, insulating layers, passivation layer, conducting layers, voids, dot polarity patterns, pixel designs, color components, polarity extension regions, polarities, fringe fields, electrodes, substrates, films, color dots, reflective color dots, transflective color dots and so forth, and use these alternative features to create a method or system according to the principles of this invention. Thus, the invention is limited only by the following claims.

What is claimed is:

1. A pixel of a display comprising:
   a first color component on a first substrate having a first first-component color dot having a first edge and a second edge; and a second first-component color dot;
   a first switching element coupled to the first first-component color dot;
   a first embedded fringe field amplifier, wherein every portion of the first first-component color dot and every portion of the second first-component color dot are directly in front of a portion of the first embedded fringe field amplifier;
   a plurality of vertically aligned liquid crystals;
   a common electrode held at a common voltage on a second substrate, wherein the plurality of vertically aligned liquid crystals is located between the first substrate and the second substrate;
   wherein the first switching element is in between the first first-component color dot and the second first-component color dot.

2. The pixel of claim 1, further comprising:
   a second color component on the first substrate having a first second-component color dot;
   a second switching element coupled to the first second-component color dot; and
   a second embedded fringe field amplifier, wherein every portion of the first second-component color dot is directly in front of a portion of the second embedded fringe field amplifier.

3. The pixel of claim 2, further comprising:
   a third color component on the first substrate having a first third-component color dot;
   a third switching element coupled to the first third-component color dot; and a third embedded fringe field amplifier, wherein every portion of the first third-component color dot is directly in front of a portion of the third embedded fringe field amplifier.

4. The pixel of claim 3, wherein the first switching element, the second switching element, and the third switching element have a first direction of polarity.

5. The pixel of claim 4, wherein the first embedded fringe field amplifier, the second embedded fringe field amplifier, and the third embedded fringe field amplifier have a neutral polarity.

6. The pixel of claim 4, wherein the first embedded fringe field amplifier, the second embedded fringe field amplifier, and the third embedded fringe field amplifier have a second direction of polarity when the first switching element, the second switching element, and the third switching element have the first direction of polarity.

7. The pixel of claim 3,
wherein the first switching element and the third switching element have a first direction of polarity; and
wherein the second switching element has a second direction of polarity.

8. The pixel of claim 7, wherein the first embedded fringe field amplifier, the second embedded fringe field amplifier, and the third embedded fringe field amplifier have a neutral polarity.

9. The pixel of claim 7,
wherein the first embedded fringe field amplifier and the third embedded fringe field amplifier have the second direction of polarity; and
wherein the second embedded fringe field amplifier has the first direction of polarity.

10. The pixel of claim 3, wherein the first first-component color dot is a transparent color dot and the second first-component color dot is a reflective color dot.

11. The pixel of claim 3,
wherein the second color component further comprises a second second-component color dot coupled to the second switching element; and
wherein every portion of the second second-component color dot is directly in front of a portion of the second embedded fringe field amplifier.

12. The pixel of claim 11,
wherein the third color component further comprises a second third-component color dot coupled to the third switching element; and
wherein every portion of the second third-component color dot is directly in front of a portion of the third embedded fringe field amplifier.

13. The pixel of claim 12, wherein the first first-component color dot, the first second-component color dot, and the first third-component color dot form a first row of color dots.

14. The pixel of claim 13, wherein the second first-component color dot, the second second-component color dot, and the second third-component color dot form a second row of color dots.

15. The pixel of claim 12:
wherein the first first-component color dot is a reflective color dot;

wherein the second second-component color dot is a reflective color dot; and
wherein the first third-component color dot is a reflective color dot.

16. The pixel of claim 15:
wherein the second first-component color dot is a transparent color dot;
wherein the first second-component color dot is a transparent color dot; and
wherein the second third-component color dot is a transparent color dot.

17. The pixel of claim 12:
wherein the first first-component color dot is a transflective color dot;
wherein the second second-component color dot is a transflective color dot; and
wherein the first third-component color dot is a transflective color dot.

18. The pixel of claim 17:
wherein the second first-component color dot is a transflective color dot;
wherein the first second-component color dot is a transflective color dot; and
wherein the second third-component color dot is a transflective color dot.

19. The pixel of claim 12, wherein the first switching element, the second switching element, and the third switching element have a first direction of polarity.

20. The pixel of claim 19, wherein the first embedded fringe field amplifier, the second embedded fringe field amplifier, and the third embedded fringe field amplifier have a neutral polarity.

21. The pixel of claim 19, wherein the first embedded fringe field amplifier, the second embedded fringe field amplifier, and the third embedded fringe field amplifier have a second direction of polarity.

22. The pixel of claim 12,
wherein the first switching element and the third switching element have a first direction of polarity, and
wherein the second switching element has a second direction of polarity.

23. The pixel of claim 22, wherein the first embedded fringe field amplifier, the second embedded fringe field amplifier, and the third embedded fringe field amplifier have a neutral polarity.

24. The pixel of claim 22,
wherein the first embedded fringe field amplifier and the third embedded fringe field amplifier have the second direction of polarity; and
wherein the second embedded fringe field amplifier has the first direction of polarity.

25. The pixel of claim 1, wherein the first first-component color dot is a transflective color dot.

26. The pixel of claim 1, wherein the first embedded fringe field amplifier is made using a transparent material.

27. The pixel of claim 1, wherein the first embedded fringe field amplifier is made using a non-transparent material.

* * * * *